(12) United States Patent
Tomioka et al.

(10) Patent No.: US 6,821,328 B2
(45) Date of Patent: Nov. 23, 2004

(54) LIQUID COMPOSITION, INK SET, METHOD OF FORMING COLORED PORTION IN RECORDING MEDIUM AND INK-JET RECORDING APPARATUS

(75) Inventors: Hiroshi Tomioka, Tokyo (JP); Yutaka Kurabayashi, Tokyo (JP); Masao Kato, Tochigi (JP); Makiko Endo, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/136,353

(22) Filed: May 2, 2002

(65) Prior Publication Data
US 2003/0070581 A1 Apr. 17, 2003

(30) Foreign Application Priority Data
May 10, 2001 (JP) ........................................ 2001-140441

(51) Int. Cl.[7] .............................................. C09D 11/00
(52) U.S. Cl. .................................. 106/31.33; 106/31.6
(58) Field of Search ........................... 106/31.33, 31.6, 106/31.65; 347/100

(56) References Cited

U.S. PATENT DOCUMENTS

| 4,202,870 A | 5/1980 | Weber et al. ............... 423/630 |
| 4,242,271 A | 12/1980 | Weber et al. ......... 260/448 AD |

(List continued on next page.)

FOREIGN PATENT DOCUMENTS

| CN | 1353150 A | 6/2002 | |
| EP | 1 099 731 A2 | 5/2001 | |
| EP | 1099733 A1 * | 5/2001 | ........... C09D/11/00 |
| EP | 1 106 658 A2 | 6/2001 | |
| EP | 1 197 533 A1 | 4/2002 | |

| JP | 55-65269 | 5/1980 |
| JP | 55-66976 | 5/1980 |
| JP | 55-150396 | 11/1980 |
| JP | 61-59911 | 3/1986 |
| JP | 61-59914 | 3/1986 |
| JP | 61-59912 | 12/1986 |
| JP | 63-22681 | 1/1988 |

(List continued on next page.)

OTHER PUBLICATIONS

Roček, et al., Institute of Chemical Process Fundamentals, Czechoslovak Academy of Scienc s, "Porous Structure of Aluminum Hydroxide and its Content of Pseudoboehmite", Applied Catalysis, 74, Elsevier Science Publishers B.V., (1991), pp. 29–36, no month available.

Barrett et al., The Journal of the American Chemical Society, "The Determination of Pore Volume and Area Distributions in Porous Substances. I. Computations from Nitrogen Isotherms", vol. LXXIII, Jan.–Mar. 1951, pp. 373–380.

"Surface Science", Gakkai Shuppan Center (Japan Scientific Societies Press) pp 326–327, (Kenji Tamaru, ed.) (1985), no month available.

* cited by examiner

Primary Examiner—Mark L. Bell
Assistant Examiner—Veronica F. Faison
(74) Attorney, Agent, or Firm—Fitzpatrick, Cella, Harper & Scinto

(57) ABSTRACT

The present invention relates to a liquid composition for use in forming a colored portion by imparting it together with an ink containing a colorant to a recording medium. The liquid composition includes at least a solvent and fine particles reactive with the colorant, in which the fine particles in the liquid composition have an average particle diameter in a range of 30 to 200 nm, and a 10% cumulative value of scattering intensity of 10 nm or more and 90% cumulative value of scattering intensity of 300 nm or less, when measured by a dynamic light scattering method.

39 Claims, 12 Drawing Sheets

U.S. PATENT DOCUMENTS

| | | | |
|---|---|---|---|
| 4,433,048 A | 2/1984 | Solberg et al. | 430/434 |
| 4,694,302 A | 9/1987 | Hackleman et al. | 346/1.1 |
| 5,549,740 A | 8/1996 | Takahashi et al. | 106/20 R |
| 5,618,338 A | 4/1997 | Kurabayashi et al. | 106/26 R |
| 5,623,294 A | 4/1997 | Takizawa et al. | 347/98 |
| 5,624,484 A * | 4/1997 | Takahashi et al. | 106/31.75 |
| 5,640,187 A | 6/1997 | Kashiwazaki et al. | 347/101 |
| 5,734,403 A | 3/1998 | Suga et al. | 347/101 |
| 5,792,249 A | 8/1998 | Shirota et al. | 106/31.27 |
| 5,835,116 A | 11/1998 | Sato et al. | 347/98 |
| 5,985,975 A | 11/1999 | Kurabayashi et al. | 524/462 |
| 6,027,210 A | 2/2000 | Kurabayashi et al. | 347/100 |
| 6,238,045 B1 | 5/2001 | Ono et al. | 347/96 |
| 6,299,675 B1 * | 10/2001 | Ono et al. | 106/31.27 |
| 6,460,989 B1 * | 10/2002 | Yano et al. | 347/101 |
| 6,517,199 B1 * | 2/2003 | Tomioka et al. | 347/101 |
| 6,536,890 B1 * | 3/2003 | Kato et al. | 347/100 |
| 6,538,047 B1 * | 3/2003 | Miyabayashi | 523/160 |
| 2002/0062762 A1 * | 5/2002 | Tomioka et al. | 106/31.33 |
| 2003/0007051 A1 * | 1/2003 | Takahashi et al. | 347/100 |
| 2003/0067525 A1 * | 4/2003 | Goto et al. | 347/100 |
| 2003/0079643 A1 * | 5/2003 | Tomioka et al. | 106/31.27 |
| 2003/0103121 A1 * | 6/2003 | Tomioka et al. | 347/100 |

FOREIGN PATENT DOCUMENTS

| | | |
|---|---|---|
| JP | 63-60783 | 3/1988 |
| JP | 63-299971 | 12/1988 |
| JP | 64-9279 | 1/1989 |
| JP | 64-63185 | 3/1989 |
| JP | 4-259590 | 9/1992 |
| JP | 5-16015 B2 | 3/1993 |
| JP | 6-92010 | 4/1994 |
| JP | 8-72393 | 3/1996 |
| JP | 8-224955 | 9/1996 |
| JP | 10-146991 A | 6/1998 |
| JP | 2000-34432 | 2/2000 |

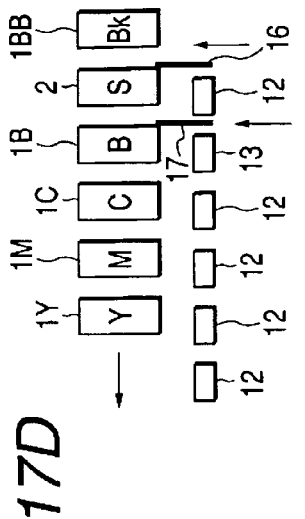
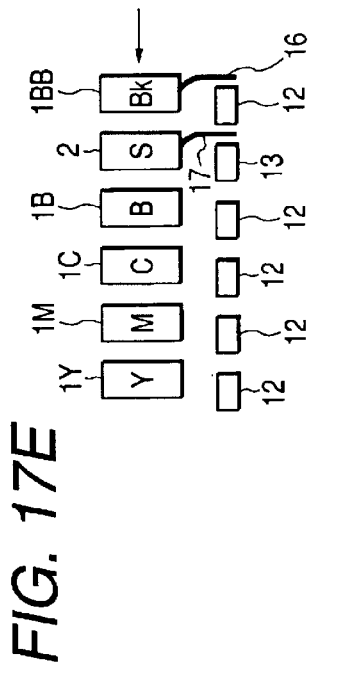
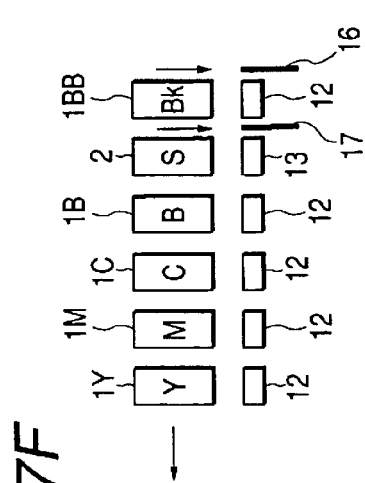
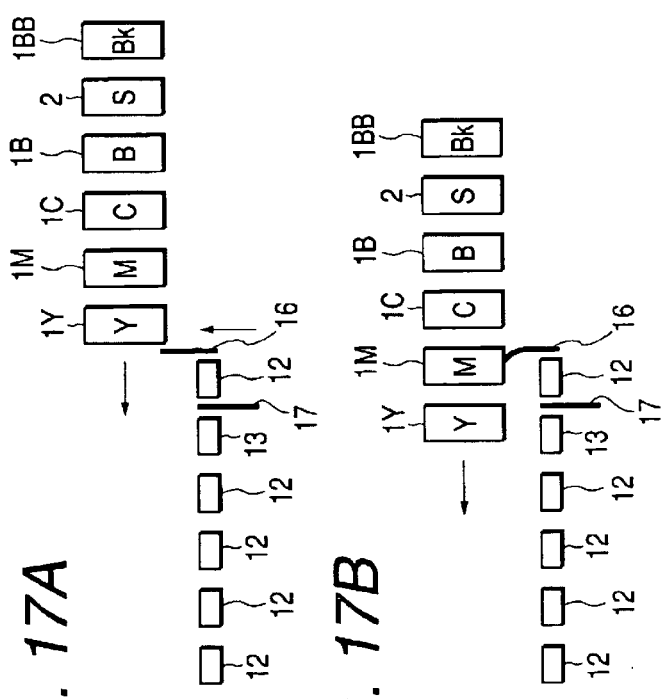
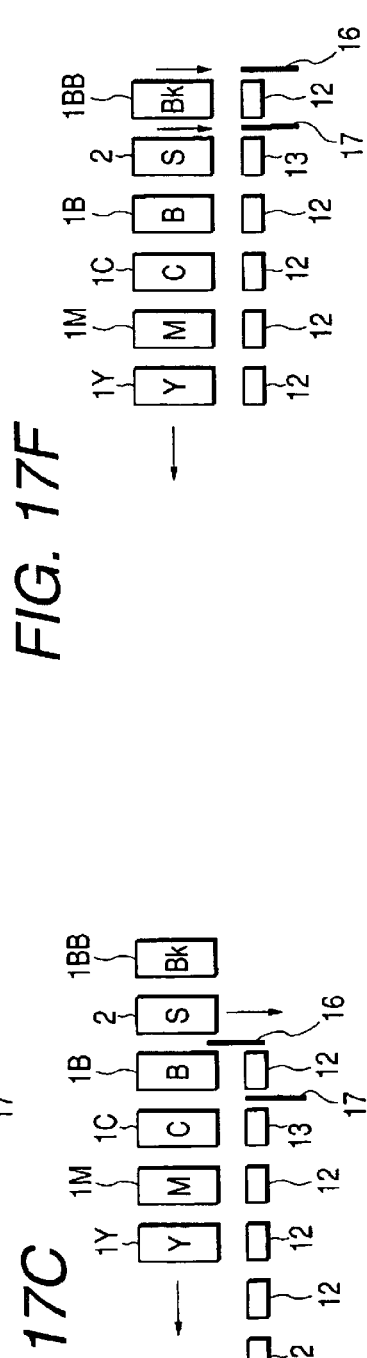
FIG. 17A  FIG. 17B  FIG. 17C  FIG. 17D  FIG. 17E  FIG. 17F

LIQUID COMPOSITION, INK SET, METHOD OF FORMING COLORED PORTION IN RECORDING MEDIUM AND INK-JET RECORDING APPARATUS

BACKGROUND OF THE INVENTION

1. Field of the Invention

The present invention relates to a technique of providing images excellent in coloring property and homogeneity of color, and particularly to a liquid composition, which is most suitable for use in the formation of images making good use of an ink-jet recording system, and an ink set using the liquid composition, and a method of forming a colored portion on a recording medium and an ink-jet recording apparatus using this ink set.

2. Related Background Art

An ink-jet recording method is a system in which recording is conducted by ejecting an ink to apply the ink to a recording medium such as paper. For example, according to the ink-jet recording method disclosed in JP 61-59911 B, JP 61-59912 B and JP 61-59914 B, in which an electrothermal converter is used as an ejecting-energy supply means to apply thermal energy to an ink so as to generate bubbles, thereby ejecting droplets of the ink, the formation of a high-density multi-orifice in a recording head can be realized with ease, and high-resolution and high-quality images can be recorded at high speed.

However, the conventional inks used in the ink-jet recording method generally comprise water and a colorant as principal components, and include additionally a water-soluble high boiling solvent such as glycol for the purpose of preventing drying of the inks within nozzles, clogging at orifices, and the like. When such an ink has been used to conduct recording on a recording medium, therefore, there have been brought about problems that fixability cannot be sufficiently achieved, and image irregularity occurs, which appears to be attributed to the uneven distribution of a filler and a sizing agent on the surface of recording paper as the recording medium. On the other hand, in recent years, there has been an increasing demand for high image quality for ink-jet recording articles on the same level as that of silver halide photography, and thus, technical requirements for increasing the image density of an ink-jet recorded image, broadening the color reproduction range and further increasing the homogeneity of color of recorded articles have been becoming higher.

Under the circumstances, various proposals have been made with a view to stabilizing an ink-jet recording method and improving the quality of recorded articles obtained by an ink-jet recording method. One of the proposals for the recording medium is a method of coating the surface of the base paper of a recording medium with fillers or sizing agents. For example, a technique of coating a base paper with porous fine particles that adsorb a colorant as a filler to form an ink-receiving layer comprising the porous fine particles has been disclosed and a coated paper for ink-jet printing has been put on the market as a recording material utilizing such techniques.

In order to stabilize an ink-jet recording method and increase the quality of recorded articles obtained by an ink-jet recording method, various proposals have been heretofore made. Some of typical examples thereof have been classified and summarized as described below.

(1) Method of Internally Adding a Volatile Solvent or a Penetrating Solvent to an Ink JP 55-65269 A discloses the addition of a compound capable of enhancing penetrability, such as a surfactant, into inks as a means for facilitating fixability of the inks. Besides, JP 55-66976 A discloses the use of inks comprising a volatile solvent as a principal component.

(2) Method of Mixing a Liquid Composition that Reacts with an Ink on a Recording Medium In order to improve image density and water resistance and inhibit bleeding, there have been proposed methods in which a liquid composition, which can make the quality of images better, is applied to a recording medium prior to or after the jetting of an ink for forming recording images. For example, JP 63-60783 A discloses a method in which after a liquid composition containing a basic polymer is applied to a recording medium, an ink containing an anionic dye is applied thereto, thereby conducting recording. JP 63-22681 A discloses a recording method in which a first liquid composition containing a reactive chemical species and a second liquid composition containing a compound reacting with the reactive chemical species are mixed on a recording medium. Further, JP 63-299971 A discloses a method in which a liquid composition containing an organic compound having two or more cationic groups per molecule is applied to a recording medium, and recording is then conducted with inks containing an anionic dye. JP 64-9279 A discloses a method in which after an acidic liquid composition containing succinic acid or the like is applied to a recording medium, an ink containing an anionic dye is applied thereto, thereby conducting recording.

Further, JP 64-63185 A discloses a method in which a liquid composition, which insolubilizes dyes, is applied to a paper prior to application of an ink. Further, JP 8-224955 A discloses a method in which a liquid composition containing cationic substances having different molecular weight distribution regions is used in combination with an ink containing anionic compound. JP 8-72393 A discloses a method in which a liquid composition containing a cationic substance and finely divided cellulose is used in combination with an ink. They each describe that images having high image density, good printing quality and water resistance, and also good color reproducibility and inhibition of bleeding can be obtained. In addition, JP 55-150396 A discloses a method in which after recording with a dye ink on a recording medium is performed, a water resistance imparting agent that forms a lake with the dye is provided, imparting water resistance to recorded images.

(3) Method of Mixing an Ink with a Fine-particle-containing Liquid Composition on a Recording Medium JP 4-259590 A discloses a method in which after imparting a colorless liquid containing colorless fine particles composed of an inorganic substance onto a recording medium, a non-aqueous recording liquid is applied to the recording medium. JP 6-92010 A discloses a method in which after imparting a solution containing fine particles or a solution containing fine particles and a binder polymer onto a recording medium, an ink containing a pigment, a water-soluble resin, a water-soluble solvent and water is applied thereto. JP 2000-34432 A discloses a recording material that includes a liquid composition containing water-insoluble fine particles and an ink. They each describe that images with good printing quality and coloring property can be obtained.

SUMMARY OF THE INVENTION

The inventors of the present invention have made extensive studies on various types of ink-jet recording techniques such as those as described above and as a result they have found that although the above-mentioned techniques exhibit excellent effects for respective technical problems, in some cases other ink-jet recording properties will be traded away. For example, a recording medium obtained by coating a surface of the base paper of a recording medium (hereinafter, referred to as "coated paper") with fillers or sizing agents has been recognized as a technique capable of forming images with high quality.

Generally, in order to obtain images with high saturation, it is known that the colorant must remain on the surface of a recording medium in a monomolecular state without forming aggregates. The porous fine particles of a coated paper have such a function. However, to provide high image density and high saturation of image, it is essential to form an ink-receiving layer thick enough to shield the base paper with a large amount of porous fine particles relative to the colorant in the ink. This causes a problem that the texture of the base paper will be lost. The inventors supposed that the necessity of an ink-receiving layer so thick as to cause loss of the texture of the base paper would be attributable to inefficient adsorption of the colorant on the porous fine particles.

Taking an example of a coated paper having one ink-receiving layer, explanation will be made as below. FIG. 9 is a schematic cross-sectional view showing a coated paper in the vicinity of the surface thereof. In FIG. 9, reference numeral 901 denotes a base paper and 903 denotes an ink-receiving layer. Generally, the ink-receiving layer 903 has porous fine particles 905 and an adhesive 907 immobilizing them. When an ink is given, the ink penetrates into the interstices between the porous fine particles 905 by capillary action to form an ink-penetrated portion 909. As shown in FIG. 9, the porous fine particles 905 exist in the ink-receiving layer locally in different densities so that the manner of penetration of the ink will differ from place to place. As a result, during the process of penetration of the ink, the colorant cannot uniformly contact the surface of the porous fine particles so that the colorant cannot be efficiently adsorbed on the porous fine particles.

Further, there are portions where the adhesive 907 prevents the penetration of ink, thus generating portions that do not contribute to color development. That is, in conventional coated papers, the colorant cannot be efficiently adsorbed in a monomolecular state in spite of the amount of the porous fine particles, with the result that a large amount of porous fine particles is necessary in order to obtain images with high quality so that the texture of the base paper is deteriorated.

Further studies by the inventors revealed that although the use of the technique (1) described above improves fixability of ink to the recording medium, in some cases a reduction in image density and a reduction in color reproduction range, which is considered to be important for recording on a paper or recording of color images, might occur. Further, the inventors' studies indicated that the technique (2) described above enabled the colorant in an ink to remain on the surface of a recording medium, thus providing a recorded article with high image density but presumably due to agglomeration of the colorant on the surface of the recording medium it could not in some cases provide sufficient color reproduction range or saturation. Further, although the conventional technique described in (3) above achieved improvement of the surface state of the recording medium by imparting a solution containing fine particles, it could not provide images with high precision and saturation as on a coated paper. Furthermore, in particular in the case of non-aqueous recording solution, there are some limitations on the choice of the colorant and the record imparting method and this problem remains to be solved. As described above, the conventional methods have respective problems to be solved and hence the inventors have come to have a recognition that development of new ink-jet recording technique is necessary for providing ink-jet recorded articles with much higher quality than has been demanded in recent years. The present invention has been accomplished based on this recognition.

Therefore, an object of the present invention is to provide a liquid composition for use in providing high quality ink-jet recorded articles having a much broader color reproduction range and excellent color homogeneity and also a liquid composition that is excellent in reliability in printing, specifically excellent in storage stability for prolonged time in a low temperature or high temperature environment, in preventing the clogging of the ejecting head, and in durability of the head surface against the wiping upon suction recovery. Another object of the present invention is to provide a method of forming a colored portion on a recording medium that can form on a paper an excellent ink-jet recorded article having a much broader color reproduction range, excellent color homogeneity, less occurrence of stripy unevenness in a solid printed portion and that is excellent in reliability in printing, specifically excellent in storage stability for prolonged time in a low temperature or high temperature environment, in preventing the clogging of the ejecting head, and in durability of the head surface against the wiping upon suction recovery.

Further, another object of the present invention is to provide a liquid composition that can form an excellent ink-jet recorded article having a much broader color reproduction range, excellent color homogeneity, less occurrence of stripy unevenness in a solid printed portion and that is excellent in reliability in printing, specifically excellent in storage stability for prolonged time in a low temperature or high temperature environment, in preventing the clogging of the ejecting head, and in durability of the head surface against the wiping upon suction recovery, an ink set containing such a liquid composition in combination with an ink, and a method of forming a colored portion on a recording medium and an ink-jet recording apparatus using such an ink set.

The above-mentioned object will be achieved according to the following aspects of the present invention. Thus, the present invention relates to a liquid composition for use in forming on a recording medium a colored portion by imparting the liquid composition together with an ink containing a colorant to the recording medium, comprising at least a solvent and fine particles reactive with the colorant, wherein the fine particles in the liquid composition have an average particle diameter in a range of 30 to 200 nm, and a 10% cumulative value of scattering intensity of 10 nm or more and 90% cumulative value of scattering intensity of 300 nm or less, when measured by a dynamic light scattering method. Also, the present invention relates to an ink set comprising at least an ink containing a colorant and a liquid composition containing fine particles reactive with the colorant independently, wherein the liquid composition is the liquid composition described above. Also, the present invention relates to a method of forming a colored portion on a recording medium, comprising at least the steps of:

(i) imparting an ink containing a colorant to the recording medium; and (ii) imparting the above-described liquid composition to the recording medium. Further, the present invention relates to an ink-jet recording apparatus comprising:

an ink-containing unit containing an ink containing a colorant;

a first recording unit provided with an ink-jet head for ejecting the ink;

a liquid-composition-containing unit containing the above-described liquid composition; and a second recording unit provided with an ink-jet head for ejecting the liquid composition.

The inventors have made extensive studies with a view to solving the problems of the prior art as described above and as a result they have found that use of a dispersion in a solvent of fine particles having the action of adsorbing a colorant in a monomolecular state in order to have the colorant efficiently adsorbed on or combined with the fine particles, together with an ink in a liquid state allows reaction of the colorant and fine particles in a liquid-liquid state, resulting in an improved image density and saturation. The present invention has been accomplished based on this finding. Herein, the term "reaction" or "reactive" in the phraseology "fine particles reactive with the colorant" or "reaction between the colorant and fine particles" means besides covalent bond between the colorant and fine particles, ionic bonds, physical chemical adsorption, absorption, adherence and other interactions therebetween.

BRIEF DESCRIPTION OF THE DRAWINGS

FIG. 4A showing the movement of each head from the print region side to the home position and elevation of each blade for ink, FIG. 4B showing the wiping of a print head, FIG. 4C showing the wiping of a liquid composition-ejecting head, and FIG. 4D showing the lowering of each blade;

FIG. 14CP is an enlarged view of aggregates formed in the seep of forming a colored portion;

FIGS. 17A, 17B, 17C, 17D, 17E and 17F are schematic views showing the wiping action of the ink-jet printing apparatus shown in FIG. 16, FIG. 17A showing the elevation of the blade for ink, FIG. 17B showing the wiping of the print head, FIG. 17C showing the lowering of the blade for ink, FIG. 17D showing the elevation of both blades after the liquid composition is arranged in a proper position, FIG. 17E showing the wiping of the head for the liquid composition and the second black ink, and FIG. 17F showing the lowering of both blades.

DETAILED DESCRIPTION OF THE PREFERRED EMBODIMENTS

Figure 1:
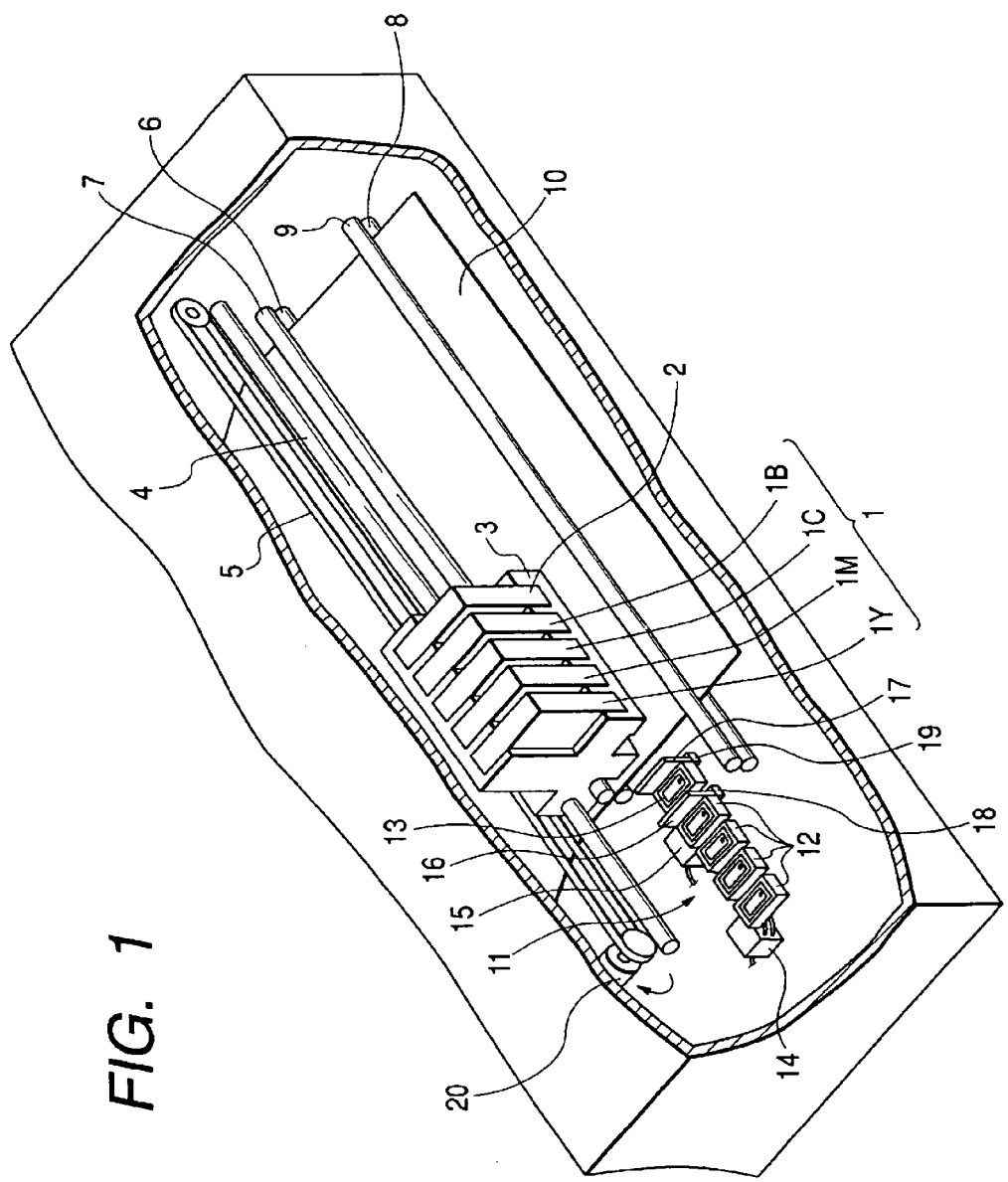
FIG. 1 is a partially broken perspective view schematically showing an ink-jet printing apparatus to which the present invention has been applied.

Next, the present invention will be described in more detail by referring to preferred embodiments.

The liquid composition according to one embodiment of the present invention is a liquid composition that is imparted to a recording medium together with an ink containing a colorant to form a colored portion thereon as described above, in which the liquid composition contains at least a solvent and fine particles reactive with the colorant, and the fine particles have an average particle size in a range of 30 to 200 nm in the liquid composition as measured by a dynamic light scattering method and a 10% cumulative value of scattering intensity of 20 nm or more and 90% cumulative value of 300 nm or less.

A preferred embodiment of the method of forming a colored portion on a recording medium by using such a liquid composition includes (i) a step of imparting an ink containing a colorant to a recording medium and (ii) a step of imparting the above-mentioned liquid composition to the recording medium, and arranging such that the ink and the liquid composition are imparted so that they can contact with each other in a liquid state on the surface of the recording medium.

Further, an embodiment of the ink set that can achieve the above-mentioned object of the present invention includes a combination of an ink containing a colorant and the above-mentioned liquid composition of the present invention. By adopting such an embodiment, the liquid composition can exhibit excellent storage stability and an ink-jet recorded article that has a much broader color reproduction range, excellent color homogeneity and less stripy unevenness in the solid printed portion can be obtained stably.

The ink and liquid composition themselves used in recording in this case are very simple in construction as described above and in addition as fine particles contained in the liquid composition, reactive with the colorant in the ink, those having a specified particle size distribution are used, with the result that not only the storage stability of ink but also that of the liquid composition used in combination with such an ink can be excellent. Further, when forming images by using them, the clogging at orifices of ejecting head is very effectively inhibited and occurrence of flaws on the surface of the head (orifice surface) is very effectively inhibited, so that excellent image durability can be obtained. As a result, according to the present invention, such an effect that ink-jet recording with high quality and high reliability can be stably performed can be obtained.

Although the reason why the present invention can provide such excellent effects as described above is not clear, the inventors' presumption is as follows. That is, the inventors have made study on an image forming process using an ink set having an ink containing a colorant and a liquid composition containing fine particles reactive with the colorant, particularly on the mechanism of formation of aggregates of the fine particles on the surface of a recording medium or on the surface of a recording medium and in the vicinity thereof when the both are mixed on the recording medium.

First, the mechanism will be explained by referring to FIGS. 13 and 14. Here, explanation will be made of an example in which a aqueous ink containing a water-soluble dye having an anionic group (anionic dye) is used as an ink and an aqueous liquid composition containing fine particles whose surface is cationically charged are dispersed as a liquid composition to be combined with the ink.

Prior to explanation, definitions of some terms will be made. The term "monomolecular state" as used herein refers to the state where a colorant such as a dye or pigment maintains substantially a dissolved or dispersed state in an ink. In this case, if the colorant causes more or less aggregation, such state is also included by the term "monomolecular state" as long as the saturation is not decreased. For example, it is preferred that dyes are monomolecular and for other colorants than dyes, "monomolecular state" is used for the sake of convenience.

Figure 13:
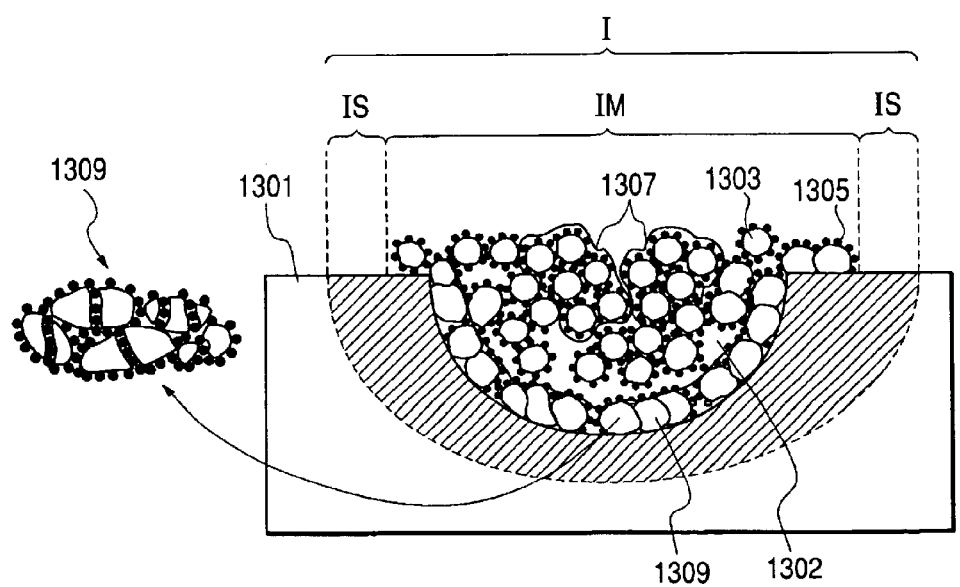
FIG. 13 is a schematic cross-sectional view illustrating the state of the colored portion of ink-jet image of the present invention.

FIG. 13 is an outline cross-sectional view schematically showing the state of a colored portion I of a recording image formed based on the above-mentioned mechanism is constituted by a main image portion IM and its peripheral portion IS. In FIG. 13, reference numeral 1301 denotes a recording medium, and 1302 denotes space formed between fibers of the recording medium. Further, 1303 designates a schematic illustration of fine particles on which a colorant 1305 chemically adsorbs. As shown in FIG. 13, in the ink-jet recording images of the present invention, the main image portion IM is constituted by the fine particles 1303 having uniformly adsorbed to the surface thereof the colorant 1305 in a state of monomolecule or in a state close to monomolecule (herein after referred to as "monomolecular state"), and aggregates 1307 of such fine particles that maintain the monomolecular state of the colorant. 1309 denotes aggregates of fine particles per se, existing in the vicinity of the fibers of the recording medium in the main image portion IM. The main image portion IM is formed by a process of physical or chemical adsorption of the fine particles 1303 on the fibers of the recording medium and a process of adsorption of the colorant 1305 and fine particles 1303 in a liquid-liquid state. Therefore, the developing characteristics of the colorant itself is less deteriorated and in addition, images with high image density and high saturation having a broad color reproduction range comparable to that of a coated paper can be formed even on a recording medium into which inks easily penetrate, such as paper.

On the other hand, the colorant 1305 that was not adsorbed on the surface of fine particles and remained in the ink penetrates into the recording medium 1301 in the transverse direction and in the direction of depth, so that the ink forms minute spots in the peripheral portion IS. Thus, the colorant remains in the vicinity of the surface of the recording medium 1301 and minute spots of the ink are formed in the peripheral portion, less white haze and color unevenness are generated, even in an image region where much ink is imparted, such as a shadow portion or a solid portion, and images with excellent homogeneity of color are formed. As shown in FIG. 13, in a case where the recording medium 1301 has permeability to the ink and liquid composition, penetration of the ink components and the components of liquid composition into the inside of the recording medium in this embodiment is not always prevented but penetration to some extent is allowed.

Further, the liquid composition reacts with the colorant in the ink to form pores having a pore size of a certain size in the inside of the aggregate when the fine particle aggregates 1309 are formed in the vicinity of the surface of the recording medium. The colorant 1305 that existed in the ink alone penetrates into the inside of the pores of the fine particle aggregates 1309 while it is migrating into the inside of the recording medium and adsorbed in the vicinity of the inlet of the pores or inner walls thereof in an ideal monomolecular state, so that a larger amount of the colorant can remain in the vicinity of the surface of the recording medium. This provides a recorded article having more excellent coloring property.

The inventors have made extensive studies on the mechanism of this phenomenon and as a result they have found that more highly controlling the particle size distribution of the fine particles in the liquid composition greatly contributes to improvement of characteristics important for proceeding toward practicality of the technique according to the present invention. Accordingly, the inventors have made extensive studies on the fine particles in the liquid composition as to how to determine the particle size distribution thereof that shows significant correlations with, for example, the storage stability of the liquid composition and characteristics of the recording head, such as wiping resistance. As a result, it revealed that determination of only the average particle diameter measured by using a dynamic scattering method or the like might in some cases fail to find significant correlations with the above-mentioned characteristics. In this regard the inventors took into consideration the possibility that the average particle diameter could not exactly express actual particle size distribution of the fine particles in the liquid composition and attempted to introduce a parameter that can more exactly express the actual particle size distribution. Specifically, after additional studies the inventors have found that in a particle size distribution obtained from a frequency distribution when analyzing the intensity of scattering measured by a dynamic light scattering method according to the Marquadt analysis method using a histogram method, particle diameters corresponding to 10% and 90% of cumulative intensity of scattering obtained by accumulating the values starting from the side of smallest particle diameter each being 10 nm or more and 300 nm or less and the average particle diameter being 30 to 200 nm show significant correlations with the above-mentioned characteristics. The present invention has been accomplished based on these findings.

Figure 14A:
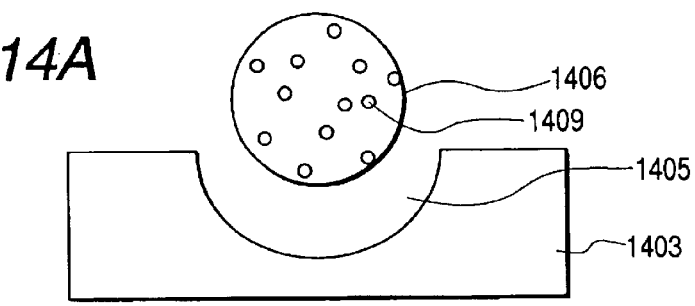
FIGS. 14A, 14B, 14C and 14D are schematic flow charts showing the step of forming a colored portion of the ink-jet recording image of the present invention.

FIGS. 14A to 14D are outline cross-sectional views of a colored portion 1400 obtained by a method of forming a colored portion on a recording medium according to one embodiment of the present invention and a schematic view illustrating the process of forming it. In FIGS. 14A to 14D, reference numeral 1401 denotes a portion mainly comprising a reaction product between an ink and a liquid composition, for example, a reaction product between a colorant and fine particles, (hereinafter abbreviated as "reaction portion"), which corresponds to the main image portion IM in FIG. 13. 1402 denotes a portion formed by bleeding of the ink that did not substantially participate in the reaction with the liquid composition to the periphery of the reaction portion 1401 (hereinafter abbreviated as "ink bleeding portion"), which corresponds to the peripheral portion IS in FIG. 13. The colored portion 1400 is formed, for example, as follows. Note that 1405 in FIG. 14A schematically expresses the space or air-gap between the fibers of the recording medium. As described hereinbelow, according to the method of forming a colored portion on a recording medium according to the present invention by using the liquid composition of the present invention, a recorded article with very high image density and high saturation can stably be obtained. The reason for this may be considered to be attributable to the synergism of the mechanisms listed below.

Figure 14B:
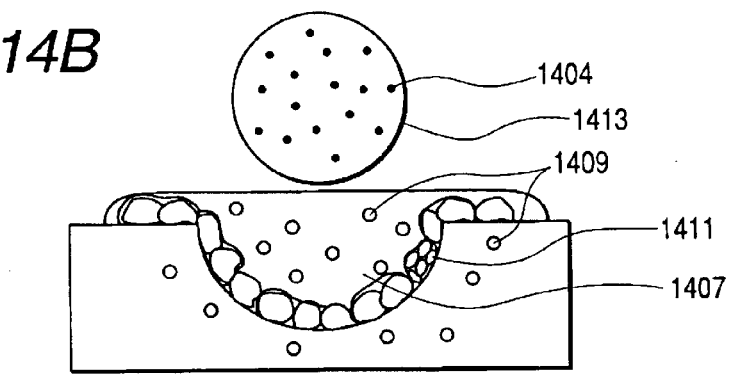

Firstly, when the liquid composition 1406 containing fine particles 1409 reactive with the colorant is imparted as droplets to the recording medium 1403 as shown in FIG. 14A, a liquid pool 1407 of the liquid composition is formed on the surface of the recording medium as shown in FIG. 14B. Within the liquid pool 1407, the fine particles 1409 in the vicinity of the surface of the fibers of the recording medium 1403 physically or chemically adsorb on the surface of the fibers of the recording medium. On this occasion, some of the fine particles may form aggregates 1411 from the fine particles per se due to an unstable dispersion state. On the other hand, at portions remote from the fibers of the recording medium within the liquid pool 1407, the fine particles 1409 may be considered to maintain the original uniform dispersion state.

Figure 14C:
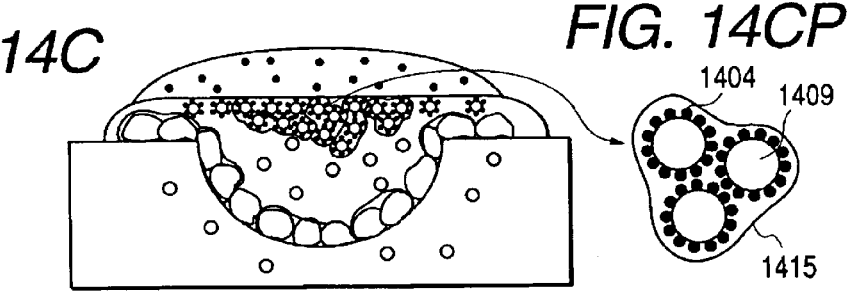
Figure 14D:
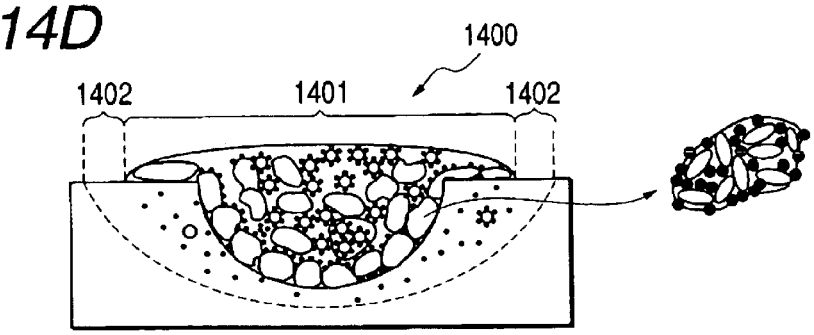

Then, when the ink 1413 containing the colorant 1404 was imparted as droplets to the recording medium 1403, first the colorant 1404 in the ink chemically adsorbs on the fine particles 1409 on the boundary between the ink 1413 and the liquid pool 1407 (cf., FIG. 14C). Since this reaction is a reaction between the liquids (liquid-liquid reaction), it may be considered that the colorant 1404 uniformly adsorbs on the surface of the fine particles 1409 in a monomolecular state as shown in FIG. 14CP. That is, it may be considered that on the surface of the fine particles 1409, the colorant 1404 does not form aggregates with itself, or does so only in small amounts, if any. As a result, a large number of fine particles 1409 having adsorbed thereon the colorant 1404 in a monomolecule state are formed on the surface layer portion of the reaction portion 1401. This caused the colorant 1404 to remain in a monomolecular state on the surface layer that gives the greatest influence on the coloring property of images, so that the formed images have high image density and high saturation.

Further, it is considered that the dispersion state of fine particles 1409 having adsorbed on the surface thereof such a colorant 1404 turns unstable so that the fine particles aggregate with each other. Here, the formed aggregates 1415 maintain the colorant 1404 in a monomolecular state also in the inside thereof as shown in FIG. 14CP. The existence of such aggregates 1415 enables formation of recording images with high image density and high saturation in the method of forming a colored portion on the recording medium of the present invention.

Further, a portion of unreacted colorant 1404 diffuses in the liquid pool 1407 and adsorbs on the surface of the unreacted fine particles 1409. In this manner, the reaction between the colorant 1404 and the fine particles 1409 further proceeds in the inside of the liquid pool 1407 so that images with higher image density and high saturation can be formed. On the other hand, the aggregates 1411 of the fine particles formed on the surface of the fibers of the recording medium 1403 as earlier described may have the function of inhibiting the penetration of the liquid phase of the liquid pool 1407 into the inside of the recording medium. This makes it possible that in the liquid pool 1407, the fine particles 1409 in the liquid composition that has been prevented from penetrating and the colorant 1404 can coexist in larger amounts, with the result that the probability in which the colorant 1404 and the fine particles 1409 contact with one another is increased so that the reaction can proceed relatively uniformly and sufficiently. This enables formation of more uniform images with excellent image density and saturation.

Further, when the liquid composition 1406 shown in FIG. 14A is imparted on the recording medium 1403 or the ink 1413 is imparted in the liquid pool 1407 of the liquid composition shown in FIG. 14B, a change in the dispersion medium in which the fine particles 1409 are dispersed makes the dispersion of the fine particles 1409 unstable and some of the fine particles 1409 may cause aggregation between the fine particles 1409 before the colorant 1404 adsorbs on fine particles. The term "change in the dispersion medium" as used herein means generally observed changes when two or more different liquids are mixed, for example, changes in pH and solids content in the liquid phase, composition of the liquid medium (solvent), dissolved ion concentration and the like physical properties. It may be considered that when the liquid composition contacts the recording medium or ink, these changes abruptly and combinedly occur to destroy the stability of dispersion of the fine particles to generate aggregates 1415. The aggregates 1415 may bring about the effects of bridging the gap between the fibers and of making the fine particles 1409 having adsorbed thereon the colorant 1404 remain closer in the vicinity of the surface of the recording medium 1403.

The aggregates 1415 formed within the liquid pool 1407 may include those that can adsorb on the recording medium 1403 or those that can migrate in the liquid phase (having flowability). Those having flowability form a larger mass of aggregates since the colorant adsorbs in a monomolecular state on the surface of the fine particle aggregates 1415 in the same manner as the reaction process between the colorant 1404 and fine particles 1409 as described above. This is believed to contribute to the improvement of the coloring property. That is, it may be considered that the large mass of the aggregates migrates along with the liquid phase when the latter penetrates along the fibers to bridge the space to smoothen the surface of the recording medium 1403, thus contributing to the formation of more uniform images with high image density.

It is apparent from the results described hereinbelow that the present invention can give rise to images having very high density and high color intensity. As described above, the reason for this may be that an ink and the liquid composition of the present invention imparted together on a recording medium such that they contact with each other in a liquid-liquid state allow the colorant 1404 in the ink to adsorb on the fine particles 1409, which is one of the constituent elements of the liquid composition, or on the fine particle aggregates 1415 in a monomolecular state and remain as it is in the vicinity of the surface of the recording medium 1403. Further, the colorant adsorbs in a monomolecular state and the fine particles remaining in the vicinity of the surface of the recording medium are fixed in this state to the surface of the recording medium, so that the fastness of the formed image, such as abrasion resistance, will be improved.

In the above, although the liquid composition and ink were imparted to the recording medium in the cited order, the order of imparting the ink and liquid composition to the recording medium is not limited particularly as far as the liquid-liquid reaction can be achieved. Therefore, the order in which first an ink is imparted and then the liquid composition is imparted may also be used.

Further, as shown in FIG. 14B, at least a portion of the fine particles 1409 in the liquid composition imparted to the recording medium may be considered to penetrate into the inside of the recording medium 1403 along with the penetration of the liquid medium as one of the constituent elements of the liquid composition penetrates into the inside of the recording medium. On the other hand, as clearly shown in FIG. 14D, it may well be considered that the colorant 1404 will adsorb or bond to the fine particles 1409 previously penetrated into the inside of the recording medium 1403 in a monomolecular state. Thus, in the inside of the recording medium, the fine particles 1409 on which the colorant 1404 adsorbs or bonds in a monomolecular state may be considered to contribute to the improvement of coloring property. Further, the penetration of such a liquid medium may be considered to improve the fixability of inks.

Further, the use of the liquid composition of the present invention allows pores having a certain size to be formed inside the aggregates upon the formation of the fine particle aggregates 1411 that are present in the vicinity of the surface of the above-mentioned recording medium. In the liquid pool 1407, the colorant 1404 not fully adsorbed by the fine particles 1409 during the penetration into the inside of the recording medium 1403, in some part may penetrate into the inside of the fine particle aggregates 1411 through the pores together with the liquid medium component. On this occasion, the colorant 1404 adsorbs in the vicinity of the inlets of pores or on the inner walls of the pores in the fine particle aggregates 1411 and only the solvent component penetrates into the inside of the recording medium 1403 so that as much as possible a colorant 1404 can be efficiently adsorbed on the surface or inside of the fine particle aggregates 1411 and allowed to remain in the vicinity of the surface of the recording medium. Further, in a case where the colorant 1404 is a dye, the pore diameter of the fine particle aggregate 1411 is about one to about several times the size of molecules of the colorant 1404 present in the ink so that there will scarcely occur aggregation between the "monomolecules" of the colorant 1404 adsorbed in the inside of the pores so that the formation of an ideal monomolecular state is possible. This significantly contributes to further improvement of coloring property so that recorded articles having a broader color reproduction range can be obtained.

In addition, as described above, it revealed that setting the average particle diameter and particle size distribution of the fine particles in the liquid composition to within specified ranges enables uniform formation of pores of the above-mentioned fine particle aggregates and decreases light scattering due to coarse particles, so that recorded articles with further reduced white haze or color unevenness and having an excellently broader color reproduction range can be obtained. At the same time, it has been found that on this occasion, the liquid composition is a homogeneous dispersion of the fine particle aggregates so that aggregation of the fine particles or thixotrophy is difficult to occur. In the environment of low temperature or high temperature, the liquid composition of the present invention is not only excellent in storage stability after a prolonged time but also excellent in the prevention of the clogging of ejecting head and further prevents the occurrence of flaws when wiping the surface of the head upon suction recovery and images having excellent durability and reliability can be formed.

The inventors have found that not only the fine particles 1409 contained in the liquid composition 1406 but also the composition of the liquid medium that constitutes the liquid composition and ink will influence the physical property of the pores of the fine particle aggregates 1411. They also have found that upon formation of fine particle aggregates using the liquid composition, the pore volume of the fine particle aggregate in a specified pore radius range has a very high correlation with image forming ability for forming an image on the recording medium. In the present invention, setting the pore radius and pore volume of the fine particle aggregate obtained by subjecting the liquid composition to a predetermined treatment in specified ranges is one of the more preferred embodiments.

Furthermore, the inventors' study has revealed that as described above, the present invention is constructed such that fine particles of liquid composition and the colorant in the ink are allowed to react in a liquid phase on the surface of the recording medium and hence the use of anionic or cationic aqueous ink as an ink as well as an aqueous liquid composition containing fine particles in a dispersion state whose surface has been charged to the opposite polarity to that of the aqueous ink as the liquid composition to be used in combination with the ink can give rise to particularly good results. That is, for example, in a case where the colorant in the ink is anionic, cationic fine particles may be used as the fine particles in the liquid composition, which results in very efficient adsorption of the colorant on the surface of the fine particles in the liquid composition. On the contrary, when it is attempted to achieve adsorption of the colorant on the same level as that attained by the present invention by using a coated paper for ink-jet, a large amount of cationic porous fine particles is required and it is indispensable to form a thick ink-receiving layer so thick as to cover the base paper. For this reason, use of a coated paper may result in deterioration of the texture of the recording medium. In contrast thereto, image formation by using the liquid composition of the present invention requires only a small amount of fine particles that constitutes the liquid composition, so that formation of good images having no sense of incompatibility in texture between the printed portion and non-printed portion without deteriorating the texture of the recording medium is possible.

Further, in contrast to the prior art described in (1) above in which the amount of remaining colorant itself on the surface of the recording medium is insufficient or to the prior art described in (2) above in which even if the amount of the remaining colorant on the surface of the recording medium is sufficient, neither sufficient color reproduction range nor sufficient saturation can be obtained due to the aggregation between the colorants, in the mechanism provided by the construction of the present invention, the colorant adsorbed on the surface of the fine particles will remain together with the fine particles on the surface of the recording medium and in addition the colorant maintains the monomolecular state, so that images with high coloring property can be obtained.

Further, the present invention may seem to resemble the method in which a liquid composition containing fine particles is extraneously added to the ink as exemplified in (3) above with respect to the prior art in that it forms images by imparting a liquid composition containing fine particles and an ink containing a colorant on the surface of the recording medium. However, as described above, in the present invention, the liquid composition and the colorant are intentionally reacted and the fine particles in the liquid composition are used as means for preventing the aggregation of colorant (formation of lake), whereas in the prior art described in (3) above, imparting the solution containing fine particles is intended to modify the surface state of the recording medium and hence is quite different from the present invention. In other words there is disclosed in the prior art no concept of causing chemical reaction to occur between the fine particles in the liquid composition and the colorant in the ink. Moreover, there is a clear difference in quality between the recorded articles obtained by the conventional recording technique and the recorded article obtained by the present invention, presumably attributable to a difference in mechanism therebetween. According to the present invention, images with excellent density and saturation and also excellent in image characteristics such as fixability can be obtained.

Hereinafter, the constituent components of the liquid composition of the present invention, constituent components of ink used in combination with the liquid composition, and a measurement method used in the present invention will be described in detail.

First, the definitions of cationic ink or anionic ink as used herein will be described. When reference is made to the ionic properties of an ink, it is well known in the art that the ink itself is not charged and it is in itself neutral. The "anionic" ink or "cationic" ink as used herein refers to an ink that contains a component or components, for example, a colorant, that has an anionic group or a cationic group and that is adjusted so that such a group can behave as an anionic group or cationic group in the ink. Also, the same is true with respect to the anionic or cationic liquid composition.

Liquid Composition

First the liquid composition of the present invention will be described.

Fine Particle Aggregate

As earlier described with respect to the mechanism of recording, in a case where the liquid composition of the present invention is used in image formation, specified fine particles contained therein form fine particle aggregates in the vicinity of the surface of the recording medium. In the inside of such aggregates are formed pores of certain sizes. Then, the colorant present alone in the ink while the ink is penetrating into the inside of the recording medium is also penetrating into the inside of the pores of the fine particle aggregates and adsorbs in the vicinity of the inlets of pores or inner walls thereof in an ideal monomolecular state, so that the colorant will remain in the vicinity of the surface of the recording medium in larger amounts, so that recording articles having more excellent coloring property can be obtained.

Therefore, it is preferred that the liquid composition of the present invention be constructed such that the fine particle aggregates can be formed with suitable pores when forming an image. Here, the pores formed from the fine particles contained in the liquid composition can be measured by the following method. That is, fine particle aggregates obtained from the liquid composition containing at least fine particles and a solvent are measured with respect to pore volume in a specified pore radius range by the method described below, and by controlling such a value to be within a suitable range, the above-mentioned mechanism of recording functions to make it possible to form good images. In measuring the physical properties of the fine particle aggregates, first the liquid composition as a subject of the measurement is pretreated by the following procedures:

(1) A liquid composition containing fine particles is dried at 120° C. for 10 hours in an atmospheric environment to evaporate substantially all the solvent to dry it;

(2) The temperature of the dried product as described above is elevated from 120° C. to 700° C. in 1 hour and then calcined at 700° C. for 3 hours; and (3) After the calcination, the calcined product is slowly returned to ambient temperature and the calcined product is pulverized, for example, by using an agate mortar to form powder.

Here, the reason for practicing the above-mentioned pretreatment is that fine particle aggregates are formed from the liquid composition by drying and the solvent component in the liquid composition is completely removed by calcination to make the inside of pores void to form space therein.

In the present invention, as a method of measuring the pore radius and pore volume of pores of the fine particle aggregates, a nitrogen adsorption/desorption method may be advantageously used. It is realized that in the case where it is constructed so that the sizes of pores of the fine particle aggregates measured by this method are such that the pore volume at a pore radius in the range of 3 to 30 nm is 0.4 ml/g or more and the pore volume at a pore radius in the range of greater than 30 nm is 0.1 ml/g or less, the adsorption of the colorant advantageously occurs due to the penetration of the colorant and solvent component into the inside of the pores of the aggregates and good coloring property is maintained so that formation of good images is possible.

Therefore, measurement of pore capacities at a pore radius in the range of 3 to 30 nm and at a pore radius of greater than 30 nm for fine particle aggregates formed when the liquid composition to be measured is subjected to the pretreatment as described above is effective as a measurement method of determining the color developing performance of images formed by using the liquid composition. As the measurement method for the physical properties of pores in such ranges, a method in which a nitrogen absorption/desorption method is used is most preferred. The pore radius and pore volume can be obtained by the method of Barrett et al. (J. Am. Chem. Soc., Vol. 73, 373, 1951) after deaeration under vacuum of the pretreated liquid composition sample at 120° C. for 8 hours and measurement by a nitrogen adsorption/desorption method. According to a further preferred measurement method, the pore volume of the pores formed in the fine particle aggregates is measured at a pore radius in a range of 3 to 20 nm and at a pore radius of greater than 20 nm. These ranges are preferable for the measurement of color developing performance since when the dyes are used as the colorant further increased coloring property can be obtained in these ranges.

Pore Radius and Pore Volume of Fine Particle Aggregates

As described above, it may be considered that the pore radius of the fine particle aggregates is preferably in the range of 3 to 30 nm in view of quick penetration of the colorant and adsorption of the colorant in the vicinity of inlets and inner walls of pores and of prevention of aggregation of the colorant in the inside of the pores. In addition, in order to incorporate the colorant in an amount enough to contribute to an increase in coloring property, the pore needs to have a certain capacity simultaneously. Furthermore, it may be considered that an increase in pore volume leads to an increase in the number of pores in the fine particle aggregate and hence not only the amount of adsorption of the colorant into the inside of the pores but also the amount of adsorption of the colorant in the vicinity of the inlets of the pores increases.

Therefore, from these points of view, the liquid composition suitably used in the present invention preferably has a pore volume of 0.4 ml/g or more at a pore radius in a range of 3 to 30 nm and a pore volume of 0.1 ml/g or less at a pore radius of greater than 30 nm when the pores in the fine particle aggregates are measured by the above-mentioned method. That is, when constructing the liquid composition of the present invention, setting the pore radius and pore volume of the pores in the fine particle aggregate to the above-mentioned ranges makes adsorption of the colorant more efficient due to the penetration of the colorant and solvent component into the inside of the pores of the fine particle aggregates, thus achieving a still further increase in coloring property.

As a more preferred range, the liquid composition of the present invention is constructed such that the pore volume at a pore radius in a range of 3 to 20 nm is 0.4 ml/g or more, and the pore volume at a pore radius of greater than 20 nm is 0.1 ml/g or less. Presence of many pores having a pore radius in a range of 3 to 20 nm further increases the coloring property so that images having a broader color reproduction range can be formed. The pore radius and pore volume of the pores of the fine particle aggregates formed from the liquid composition change depending on not only the chemical species, shape and size of the fine particles contained but also solvent species and other additives and their component ratios and hence it may be considered that by controlling these conditions, the state in which fine particle aggregates are formed can be controlled.

Action of Fine Particle

Actions desired for fine particles contained in the liquid composition of the present invention, by which the present invention is characterized include (1) and (2) below. These actions may be achieved by one or two or more kinds of fine particles.

(1) When mixed with an ink, the colorant can be adsorbed on the surface without deteriorating the coloring property that the colorant inherently has.

(2) When mixed with an ink, or imparted on a recording medium, the dispersion stability is decreased so that fine particles remain on the surface of the recording medium.

A preferred property of the fine particle to satisfy (1) above includes, for example, the ionicity of the fine particle being of opposite polarity to that of the ionicity of the colorant used in combination therewith. Use of fine particles having such a property allows the colorant to electrostatically adsorb on the surface of the fine particles. For example, when the colorant used in an ink is anionic, cationic fine particles are used. On the contrary, when the colorant is cationic, anionic fine particles are used. Factors for colorant adsorption other than the ionicity described above include size and weight or configuration of the surface of the fine particles. For example, porous fine particles having many pores on the surface thereof have unique adsorption characteristics and may adsorb colorants in a good manner depending on a plurality of factors such as the size, configuration, and the like of the pores.

The action as described in (2) above is caused by the interaction of the fine particles with the ink or recording medium. Therefore, this may be achieved by each construction. For example, the fine particle may have such a property that it has ionicity opposite to that of the components of the ink composition or the components of the recording medium. Coexistence of an electrolyte in the ink or liquid composition influences the dispersion stability of the fine particles. In the present invention, it is desirable to arrange such that either one of the effects (1) and (2) described above can be instantaneously obtained when the ink and liquid composition are mixed. Further, it is more preferred to arrange such that both of the effects (1) and (2) described above can be instantaneously obtained when the ink and liquid composition are mixed.

Average Particle Diameter and Particle Size Distribution of Fine Particle

The liquid composition of the present invention is characterized by average particle diameter and particle size distribution of fine particles dispersed in the liquid composition. Specifically, it is characterized by the use of fine particles having an average particle diameter of fine particles measured by a dynamic light scattering method being in a range of 30 to 200 nm with a 10% cumulative value of scattering intensity being 10 nm or more and 90% cumulative value being 300 nm or less. Here, the term "average particle diameter" refers to a value obtained by Cumulant analysis method according to which a scattering intensity distribution attributable to fine particles detected by a dynamic light scattering method is applied to normal distribution to calculate average particle diameter. The particle size distribution as used herein is obtained from a frequency distribution by analyzing scattering intensity detected by a dynamic light scattering method by a Marquadt analysis method, which uses a histogram method. The particle size distribution of fine particles is obtained from particle diameters corresponding to 10% and 90% of cumulative intensity when accumulating scattering intensity starting from the smallest particle diameter. These measurements may be performed advantageously by using an apparatus that can measure particle size distribution by a dynamic light scattering method, such as an electrophoretic light scattering photometer ELS-8000 (trade name, manufactured by Otsuka Electronics Co., Ltd.). The above-mentioned analysis treatment may be performed by utilizing the attached software.

The liquid composition of the present invention has an improved dispersion stability because the average particle diameter and particle size distribution of the constituent fine particles are in the ranges described above so that aggregation or sedimentation of fine particles, development of thixotropy and the like are difficult to occur even when stored at low temperature and high temperature environments for a long time. Further, the liquid composition of the present invention contains less coarse particles with a size exceeding 300 nm, so that the occurrence of flaws on the recording head when wiping the surface of the recording head at the time of continuous printing and suction recovery can be effectively prevented, so that the durability of the recording head can be significantly improved.

Further, since in the case of liquid composition of the present invention, the fine particles constituting it have uniform particle size so that the pores of the fine particle aggregates formed on the recording medium as earlier described tend to be uniform and light scattering by coarse particles occurs to a less extent, so that the use of the liquid composition of the present invention together with an ink in image formation allows efficient adsorption of the colorant and the improved coloring efficiency, thus enabling formation of recording images having a broader color reproduction range. Furthermore, since the adsorption of the colorant on fine particles or fine particle aggregate takes place in a more uniform state, good images with respect to homogeneity, color unevenness, stripy unevenness, etc. can be obtained also in solid image portions where not only primary color but also secondary color are applied in large amounts. That is, it may be considered that using the liquid composition of the present invention in which the fine particle has an average particle diameter in a range of 30 to 200 nm and a 10% cumulative value of 10 nm or more and a 90% cumulative value of 300 nm or less, results in formation of fine particle aggregate that is preferable for forming images having good coloring property as described above, particularly preferably those having a pore volume of 0.4 ml/g or more at a pore radius in a range of 3 to 30 nm and a pore volume of 0.1 ml/g or less at a pore radius in a range of greater than 30 nm, more preferably those having a pore volume of 0.4 ml/g or more at a pore radius in a range of 3 to 20 nm and a pore volume of 0.1 ml/g or less at a pore radius in a range of greater than 20 nm.

A more preferred range of the average particle diameter and particle size distribution of the fine particles dispersed in the liquid composition of the present invention is a range of 50 to 120 nm with the 10% cumulative value of scattering intensity being 20 nm or more and 90% cumulative value being 250 nm or less. In these ranges, the liquid composition of the present invention can form images having more improved reliability and image characteristics as described above and at the same time is excellent in the prevention of the clogging in the nozzles of the recording head.

Hereinafter, as preferred embodiments of the liquid composition of the present invention, liquid compositions containing cationic and anionic ionic fine particles, respectively, will be specifically described.

Cationic Liquid Composition

The cationic liquid composition includes, for example, a liquid composition containing fine particles having a cationic group on the surface thereof and acid, the fine particles being stably dispersed. A preferred cationic liquid composition suitable in the present invention includes, for example, a liquid composition that contains acid and has a pH adjusted to 2 to 7 or a zeta potential of +5 to +90 mV.

pH and Zeta Potential

Here, the zeta potential of the liquid composition will be described. First, explanation is made on the basic principle of zeta potential. Generally, in a system in which a solid is dispersed in a liquid and in a case where free charges exist on the surface of the solid phase, a charged layer of the opposite charge will appear in the liquid phase in the vicinity of the solid phase boundary so as to maintain electrical neutrality. This is called electric double layer and a potential difference due to the electric double layer is called zeta potential. If the zeta potential is positive (+), the surface of the fine particle is cationic while it is negative (−), the surface of the fine particle is anionic. Generally, higher absolute value means more intense electrostatic repulsive force between the fine particles, and such a liquid composition is said to have good dispersibility. At the same time the ionicity of the surface of the fine particle is considered to be high. That is, in the case of cationic fine particles, higher zeta potential means higher cationicity, which means greater power for attracting the anionic compounds in the ink.

Further, the inventors of the present invention have made extensive studies on the relationship between the zeta potential of the liquid composition used for image formation and the image quality of the formed image and as a result they have found that when the liquid composition having a zeta potential in the range of +5 to +90 mV is used, a colored portion formed on the recording medium exhibits a particularly excellent coloring characteristic. Although the reason for this phenomenon is not clear enough, presumably that the cationicity of the fine particles is suitable prevents the occurrence of abrupt aggregation of the anionic compound (anionic colorant) so that the anionic compound can adsorb on the surface of the fine particles thinly and uniformly, which prevents the colorant from forming macro lakes, resulting in that the color developing characteristic inherent to the colorant can be exhibited in a better condition. Further, it may be considered that in the cationic liquid composition of the present invention, the fine particles come to be in an unstable dispersion state while exhibiting weak cationicity even after adsorbing the anionic compound on the surface of the fine particles, thereby the fine particles while becoming aggregated readily adsorb on the surface of anionic substance such as cellulose fiber present in the recording medium so that the fine particles can readily remain in the vicinity of the surface of the recording medium.

It may be considered that as a result, excellent effects described below will be obtained. That is, the use of the liquid composition of the present invention can give rise to color developing characteristics that are excellent as good as a print on a coated paper for ink-jet, achieving less white haze or color unevenness even in an image region where much ink is imparted, such as a shadow portion or a solid portion, and images with excellent color homogeneity. Further, since anionic compounds such as colorant very efficiently adsorb on the surface of the fine particles to develop a color as compared with a print on a coated paper, the imparting amount of cationic fine particles may be reduced. Accordingly, in particular, when printing on a plain paper, good images having excellent abrasion resistance in the printed portion can be obtained without deteriorating the texture of the paper. As for a more preferred range of zeta potential, for example, in the case where a liquid composition containing cationic fine particles having a zeta potential in a range of +10 to +85 mV is used, the boundary between dots of a solid print becomes indistinct and a still further reduction in stripy unevenness due to the scanning of the head can be achieved. Further, the use of a liquid composition containing cationic fine particles having a zeta potential in a range of +15 to +65 mV can provide images having very excellent coloring property regardless of the kind of paper to be used.

The pH of the cationic liquid composition of the present invention is preferably in a range of 2 to 7 around 25° C. in consideration of storage stability and adsorption of anionic compound. In this pH range, the liquid composition when mixed with anionic ink does not considerably decrease the stability of the anionic compound, thus causing no strong aggregation between the anionic compounds, so that a decrease in saturation of the recorded image or providing obscure images can be effectively prevented. Further, within this range, the state of dispersion of cationic fine particles is good so that the storage stability and ejecting stability upon ejecting from recording heads of the liquid composition can be maintained in good conditions. Further, when the liquid composition is mixed with an ink, the anionic substance fully absorbs on the surface of the cationic fine particles so that excessive penetration of the colorant into the inside of the recording medium can be prevented and ink-jet recorded articles having excellent coloring property can be obtained. A more preferred range of pH is pH 3 to 6. In this range, corrosion of recording heads due to prolonged storage can be very effectively prevented and at the same time the abrasion resistance of the printed portion is further increased.

Cationic Fine Particles

Next, the components that constitute the cationic liquid composition of the present invention will be described. The cationic fine particles referred to as a first component must in a state of being dispersed in the liquid composition have cationicity on the surface of the fine particles themselves to achieve the above-mentioned action effects. By making the surface of the particles cationized, when the liquid composition is mixed with an anionic ink, the cationic surface of the fine particles allows quick adsorption of the anionic colorant on the surface of the particles and prevents excessive penetration of the colorant into the inside of the recording medium, so that ink-jet recorded articles with high image density can be obtained. On the contrary, in a case where the surface of the fine particles is not cationic and the fine particles are present in the liquid composition separately from cationic compound, the colorant aggregates around the cationic compound to deteriorate the coloring property of the colorant itself so that the coloring property of a level of a coated paper is difficult to realize. For this reason, the fine particles used in the liquid composition of the present invention have to have a cationic surface. However, not only fine particles that are inherently cationic but also those fine particles that are inherently electrostatically anionic or neutral may be suitably used as a constituent material of the liquid composition of the present invention as far as they are cationized by some treatment on the surface thereof.

The cationic fine particles suitably used in the present invention can fully achieve the object of the present invention as far as they can form pores in the aggregate of the fine particles formed on a recording medium so that the kind of the material of fine particle is not particularly limited. Specific examples of such a material include, for example, silica, alumina, alumina hydrates, titania, zirconia, boria, silica-boria, ceria, magnesia, silica-magnesia, calcium carbonate, magnesium carbonate, zinc oxide, hydrotalcite, etc., fine particles of complexes of these materials, organic fine particles, inorganic-organic complex fine particles, etc., these being cationized. In the liquid composition of the present invention, they can be used singly or two or more of them may be used in combination.

Among those described above, fine particles made of alumina hydrates, are preferred particularly because they have positive charges on the surface of the particles. Further, the use of alumina hydrates showing a boehmite structure upon X-ray diffraction is preferred in consideration of excellent coloring property, color homogeneity, storage stability, etc. The alumina hydrates are defined by the following general formula:

$$Al_2O_{3-n}(OH)_{2n} \cdot mH_2O$$

wherein n is 0 or one of integers of from 1 to 3 and m is 0 to 10, preferably 0 to 5. The expression of "$mH_2O$" in many cases indicates detachable water phase that does not participate in the formation of crystal lattices and hence m may take a value other than integers. However, m and n must not be 0 (zero) simultaneously.

Generally, the crystal of alumina hydrate having a boehmite structure is a laminar compound with its (020) plane forming a macro plane and presents a unique diffraction peak in the X-ray diffraction pattern. In addition to complete boehmite, it may take a structure of a so-called pseudoboehmite, which contains excessive water between the layers in the (020) plane. The X-ray diffraction pattern of the pseudoboehmite shows a broader diffraction peak than that of the complete boehmite.

Since boehmite and pseudoboehmite cannot be distinguished clearly one from another, so that in the present invention the both are collectively referred to as alumina hydrate having a boehmite structure (hereinafter, simply referred to as "alumina hydrate"). The spacing of lattice plane (020) and crystal thickness in the direction of (020) can be obtained by measuring peaks appearing at a diffraction angle of 2θ=14–15° and performing calculations by using the diffraction angle 2θ and half-value width B, in accordance with the formula of Bragg for the spacing of lattice plane and the formula of Scherrer for the crystal thickness. The spacing of (020) plane can be used as a guide for hydrophilicity/hydrophobicity of alumina hydrates. The method of producing alumina hydrates used in the present invention is not particularly limited and any method that can produce alumina hydrates having a boehmite structure may be used. For example, the alumina hydrates can be produced by a known method such as hydrolysis of aluminum alkoxides, hydrolysis of sodium aluminate, etc.

In terms of X-Ray diffraction analysis amorphous alumina hydrate can be used after subjecting it to heat treatment at 50° C. or higher in the presence of water to convert it so as to have a boehmite structure as disclosed in JP 56-120508 A. Particularly preferably used is a method in which acid is added to a long chain aluminum alkoxide to effect hydrolysis/deflocculation to obtain an alumina hydrate. Herein, long aluminum alkoxide means an alkoxide having, for example, 5 carbon atoms or more. Further, the use of alkoxide having 12 to 22 carbon atoms is preferred since removal of alcohol component and control of the shape of alumina hydrate are facilitated during the production process as described later.

As the acid to be added to the long chain aluminum alkoxide as described above, one or two or more acids may be used freely selected from organic acids and inorganic acids. In consideration of the reaction efficiency of hydrolysis and shape control and dispersibility of the obtained alumina hydrates, it is most preferable to use nitric acid. Subsequent to this step, hydrothermal synthesis may be performed to control the particle diameter. When performing hydrothermal synthesis by using a dispersion of alumina hydrate containing nitric acid, the nitric acid in the aqueous solution is incorporated as nitrate radical on the surface of the alumina hydrate, so that the water dispersibility of the hydrate can be improved. Further, addition of acid to an alumina hydrate slurry as appropriate to adjust the pH after the hydrothermal synthesis and subsequent concentration thereof can prepare a very stable alumina hydrate slurry having a high solids content. In a case where such a slurry is used, a liquid composition having excellent dispersion stability of alumina hydrate fine particles can be prepared without a need for extraneous addition of the acids described hereinbelow.

The method of producing alumina hydrates by the hydrolysis of the above-mentioned long chain aluminum alkoxide, as compared with the method of producing alumina hydrogel or cationic alumina, has an advantage that impurities such as various kinds of ion are difficult to contaminate. Further, the use of a long chain aluminum alkoxide, as compared with the case where a short chain aluminum alkoxide such as aluminum isopropoxide is used, has an advantage that dealcoholization of a long chain alcohol subjected to the hydrolysis in alumina hydrate can be completely performed. In the above-noted method, it is preferred to set the pH of the solution at the time of initiating the hydrolysis to below pH 6. A pH above 8 is not preferable since the finally obtained alumina hydrate becomes crystalline.

As the alumina hydrate to be used in the present invention, alumina hydrate containing a metal oxide such as titanium dioxide may also be used as far as it shows a boehmite structure upon X-ray diffraction analysis. The content ratio of a metal oxide such as titanium dioxide is preferably 0.01 to 1.00 weight % based on the alumina hydrate since optical density increases and more preferably it is 0.13 to 1.00 weight %. The use of such an alumina hydrate increases the adsorption rate of the colorant so that oozing or beading is unlikely to occur. Furthermore, the above-mentioned titanium dioxide must be such that the valence number of titanium is +4. The content of titanium dioxide can be examined by an inductively coupled plasma (ICP) mass spectrophotometry after dissolving it in boric acid. The distribution of titanium dioxide in the alumina hydrate and the electronic number of titanium can be analyzed by use of electron spectroscopy for chemical analysis (ESCA).

For example, the surface of alumina hydrate is etched with argon ion for 100 seconds and 500 seconds and a change in the content of titanium can be examined. Titanium dioxide comes to act as a catalyst when the valence number of titanium decreases to below +4 so that decrease in weatherability of the obtained printout and yellowing of the printed part may tend to occur.

The titanium dioxide may be contained only in the vicinity of the surface of the alumina hydrate or in the inside of thereof as well. Also, the content of titanium dioxide may vary from the surface to the inside thereof. Presence of the titanium oxide only in the close vicinity of the surface of the alumina hydrate is more preferable since the electric characteristics of the alumina hydrate can be readily maintained.

The method of producing alumina hydrate containing titanium dioxide is preferably a method in which a mixed solution of aluminum alkoxide and titanium alkoxide is hydrolyzed as described in, for example, "Science of Surfaces" (Ed. by Kenji Tamaru, p. 327, 1985, published by Japan Scientific Societies Press). As other methods, it can be produced by addition of an alumina hydrate as seeds of crystal growth upon the hydrolysis of the mixed solution of aluminum alkoxide and titanium alkoxide.

Alumina hydrates containing instead of titanium dioxide, oxides of silica, magnesium, calcium, strontium, barium, zinc, boron, germanium, tin, lead, zirconium, indium, phosphorus, vanadium, niobium, tantalum, chromium, molybdenum, tungsten, manganese, iron, cobalt, nickel, ruthenium, etc. may be used. For example, alumina hydrates containing silica has the effect of improving the abrasion resistance of the printed part.

The alumina hydrate suitably used in producing the liquid composition of the present invention has a spacing of (020) plane in a range of 0.614 to 0.626 nm. In this range, the alumina hydrate particles in the liquid composition have good dispersion stability so that a liquid composition that is excellent in storage stability and ejecting stability can be obtained. Although the reason for this phenomena has not been made clear yet, it is presumed that the alumina hydrate whose spacing of (020) plane is in the above-mentioned range has a balance of hydrophobicity and hydrophilicity of the alumina hydrate in a proper range, so that the liquid composition has improved dispersion stability as a result of improved dispersion stability attributable to a proper degree of repulsion between the particles in the liquid composition and an improved balance of wetting inside the ejecting port.

The alumina hydrate that can be used in the present invention is preferably one that has a crystal thickness in a range of 4.0 to 10.0 nm in the (020) plane thereof. In this range, the cationic fine particles have excellent transparency and colorant adsorbability. According to the inventors' finding, the spacing of the (020) plane and the crystal thickness in the (020) plane are correlated to each other so that if the spacing in the (020) plane is in the above-mentioned range, the crystal thickness in the (020) plane can be adjusted to be in the range of 4.0 to 10.0 nm.

Further, the alumina (aluminum oxide) prepared by heat treatment, such as calcination of the above-mentioned alumina hydrate, metallic aluminum, aluminum salts or the like similarly has positive charge so that such can be advantageously used. Alumina includes those having crystal forms of $\alpha$, $\gamma$, as well as $\delta$, $\chi$, $\eta$, $\rho$, $\beta$ and the like type and any of them may be used as far as it is stably dispersed in water in the form where the surface is maintained in a cationic state. Among them, alumina of the $\gamma$ type has an active surface and a high adsorbing power for the colorant and readily forms a stable dispersion of relatively fine particles so that the liquid composition containing such is excellent in coloring property, storage stability, ejection stability, etc., and therefore it is preferably used.

Physical Properties and Shape of Pores of Cationic Fine Particle

In order to efficiently form pores in the fine particle aggregate that are formed on a recording medium and at the same time to efficiently adsorb the colorant on the surface of the fine particles per se, the above-mentioned cationic fine particles used in the present invention preferably have an optimum pore radius by the above-mentioned nitrogen adsorption/desorption method in a range of 2 to 12 nm and a total pore volume of 0.3 ml/g or more. More preferably, the cationic fine particles have an optimum pore radius by the above-mentioned nitrogen adsorption/desorption method in a range of 3 to 10 nm and a total pore volume of 0.3 ml/g or more since the pores in the fine particle aggregate that are formed on a recording medium tend to be efficiently formed in the intended pore radius range.

The above-mentioned fine particles used in the present invention having a BET specific surface area in a range of 70 to 300 $m^2/g$ are preferred since they have sufficient adsorption points at which the colorant adsorbs on the surface of the fine particles per se so that they tend to efficiently maintain the colorant as remaining in a monomolecular state in the vicinity of the surface of the recording medium, thus contributing to the improvement of the coloring property.

Further, the shape of the fine particles used in the present invention can be determined by dropping a dispersion of the fine particles in deionized water on a collodion membrane to prepare a sample for measurement and observing the sample on a transmission electron microscope. In the present invention, in forming pores in the aggregates upon formation of fine particle aggregate on a recording medium, fine particles having a nonspherical shape, such as needle, plate, or rod or necklace in which spherical primary particles are connected to each other with a certain directional property to form a secondary particle may be advantageously used.

According to the inventors' finding, the fine particles of plate-like shape are more preferred since they have better dispersibility in water in that of fine particles of needle- or hair-bundle-like (filamentous) shape and when fine particle aggregates are to be formed, the orientation of fine particles is at random to form pores having an increased capacity. The term "hair-bundle-like" as used herein refers to a state in which needle-like fine particles gather with contacting each other side by side like a bundle of hair. In particular, among the alumina hydrates that can be used in the present invention, pseudoboehmite is generally known to include those having filamentous and other shapes as described in the above literature (Rocek J., et al., Applied Catalysis, Vol. 74, pp. 29–36, 1991).

The aspect ratio of the plate-like particles can be obtained by the method described in JP 5-16015 B. Generally, an aspect ratio is indicated by a ratio of the diameter to the thickness of a particle. Here, the term "diameter" means a diameter of a circle having the same area as the projectile area of a particle of alumina hydrate observed under a microscope or an electron microscope. "Slenderness ratio" is expressed as a ratio of the maximal diameter and the minimal diameter when observed in the same way as in the case of the aspect ratio. In the case of hair-bundle-shape particles, the method for obtaining an aspect ratio is performed by assuming that individual needle-like alumina hydrate particles forming hair-bundle-like shape as cylinders, obtaining respective diameters of upper and lower circles and length of each cylinder and calculating ratios of the diameter to length. The most preferable shape of alumina hydrate is one having an average aspect ratio in a range of 3 to 10 in the case of plate-like particles and in the case of hair bundle-like particles, one having an average aspect ratio of from 3 to 10 is preferred. If the aspect ratio is in the above-mentioned range, when fine particle aggregates are formed, space is readily formed between the particles and a porous structure can be readily formed.

The content of the cationic fine particles as described above in the liquid composition of the present invention may be determined to be in an optimal range as appropriate according to types of substances to be used. A range of 0.1 to 40% based on mass is a preferred range in achieving the object of the present invention and a more preferred range is from 1 to 30 mass % and further preferably 3 to 15 mass %. In such ranges, images with excellent coloring property can be stably obtained regardless of the kind of paper and the liquid composition has particularly excellent storage stability and ejection stability.

Acid

As earlier described, the liquid composition of the present invention preferably contains acid and is adjusted to pH 2 to 7. The acid, which is a second component, ionizes the surface of the cationic fine particles to increase the surface potential thereof, thereby improving the dispersion stability of the fine particles in the liquid and playing the functions of improving adsorbability of the anionic compound (anionic colorant) in the ink and adjusting the viscosity of the liquid composition. The acid used in the present invention is not particularly limited so long as desired pH, zeta potential or physical property such as dispersibility of fine particles can be obtained when used in combination with the cationic fine particles, and those freely selected from the inorganic acids and organic acids described below may be used.

Specific examples of the inorganic acid include, for example, hydrochloric acid, sulfuric acid, sulfurous acid, nitric acid, nitrous acid, phosphoric acid, boric acid, and carbonic acid, and specific examples of the organic acid include, for example, carboxylic acids, sulfonic acids and amino acids as described below.

The carboxylic acids include, for example, formic acid, acetic acid, chloroacetic acid, dichloroacetic acid, trichloroacetic acid, fluoroacetic acid, trimethylacetic acid, methoxyacetic acid, mercaptoacetic acid, glycolic acid, propionic acid, butyric acid, valeric acid, caproic acid, caprylic acid, capric acid, lauric acid, myristic acid, palmitic acid, stearic acid, oleic acid, linolic acid, linoleic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, p-nitrobenzoic acid, oxalic acid, malonic acid, succinic acid, glutaric acid, adipic acid, tartaric acid, maleic acid, fumaric acid, citric acid, phthalic acid, isophthalic acid, terephthalic acid, salicylic acid, p-hydroxybenzoic acid, anthranilic acid, m-aminobenzoic acid, p-aminobenzoic acid, o-methoxybenzoic acid, m-methoxybenzoic acid, p-methoxybenzoic acid, etc.

The sulfonic acids include, for example, benzenesulfonic acid, methylbenzenesulfonic acid, ethylbenezenesulfonic acid, dodecylbenzenesulfonic acid, 2,4,6-trimethylbenzenesulfonic acid, 2,4-dimethylbenzenesulfonic acid, 5-sulfosalicylic acid, 1-sulfonaphthalene, 2-sulfonaphthalene, hexanesulfonic acid, octanesulfonic acid, dodecanesulfonic acid, etc.

The amino acids include, for example, glycine, alanine, valine, α-aminobutyric acid, γ-aminobutyric acid, β-alanine, taurine, serine, ε-amino-n-caproic acid, leucine, norleucine, phenylalanine, etc.

In the liquid composition of the present invention, these acids may be used singly or two or more of them may be used in combination. Among the acids, those having a primary dissociation constant pKa in water of 5 or less are used particularly preferably since they are particularly excellent in the dispersion stability of the cationic fine particles and the adsorbability of the anionic compound. Specifically, such acids include hydrochloric acid, nitric acid, sulfuric acid, phosphoric acid, acetic acid, formic acid, oxalic acid, lactic acid, citric acid, maleic acid, malonic acid, etc.

In the liquid composition of the present invention, it is preferred that the mixing ratio of the cationic fine particles (A) to acid (B) in the liquid composition is A:B=200:1 to 5:1, more preferably 150:1 to 8:1, based on weight be used in order to improve the dispersion stability of the cationic fine particles and the adsorbability of the anionic compound on the surface of the fine particles.

Other Constituent Components

Next, other components constituting the cationic liquid composition of the present invention will be specifically described. The cationic liquid composition of the present invention contains the cationic fine particles as an essential component and preferably acid such as that described above. In addition, it usually contains water as a liquid medium. Further, it may contain water-soluble organic solvents and other additives as a liquid medium.

The organic solvents that can be used on this occasion include, for example, amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, 1,2,6-hexanetriol, thiodiglycol, hexylene glycol and diethylene glycol; lower alkyl ethers of polyhydric alcohol such as ethylene glycol methyl ether, diethylene glycol monomethyl ether, and triethylene glycol monomethyl ether; monohydric alcohols such as ethanol, isopropyl alcohol, n-butyl alcohol, and isobutyl alcohol; and other organic solvents such as glycerol, N-methyl-2-pyrrolidone, 1,3-dimethylimidazolidinone, triethanolamine, sulfolane, dimethyl sulfoxide, etc. Examples of humectant include nitrogen-containing compounds such as urea, thiourea, ethylene urea, alkylurea, alkylthiourea, dialkylurea, and dialkylthiourea; and sugars such as glucitol, mannitol, and inositol. The content of the above-described water-soluble organic solvents and humectant is not particularly limited. For example, it is preferably in a range of 5 to 60%, and more preferably in a range of 5 to 40% based on the total mass of the liquid composition.

The liquid composition of the present invention may be further blended with additives such as viscosity modifiers, pH adjusters, preservatives, various kinds of surfactant, antioxidants, and evaporation accelerators, water-soluble cationic compounds, binder resins, etc. as appropriate. Selection of surfactants is particularly important in adjusting the penetrability of the liquid composition into the recording medium. As the surfactant, primary, secondary and tertiary amine salt type compounds, specifically, hydrochloric acid salts, acetic acid salts of laurylamine, coconut amine, stearylamine, rosin amine, etc.; quaternary ammonium salt type compounds, specifically lauryltrimethylammonium chloride, cetyltrimethylammonium chloride, benzyltributylammonium chloride, benzalkonium chloride, etc.; pyridinium salt type compounds, specifically, cetylpyridinium chloride, cetylpyridinium bromide, etc.; imidazoline type cationic compounds, specifically, 2-heptadecenyl-hydroxyethylimidazoline, etc.; higher alkylamine ethylene oxide adducts, specifically, cationic surfactants such as dihydroxyethylstearylamine, etc., amphoteric surfactants exhibiting cationicity in a certain pH range may be used. Specific examples thereof include in addition to amino acid type amphoteric surfactants; R—NH—CH2—CH2—COOH type compounds; betaine type compounds, specifically, carboxylic acid salt type amphoteric surfactants such as stearyldimethylbetaine and lauryldihydroxyethylbetaine, amphoteric surfactants of sulfate type, sulfonate type, phosphate type, etc. Further, examples of nonionic surfactant include, for example, polyoxyethylene alkyl ethers, polyoxyethylene alkyl esters; acetylene alcohols; acetylene glycols, etc. In the present invention, one or two or more of these selected as appropriate from these may be used. Among them, in particular acetylene alcohols and acetylene glycols are preferably used. That is, these surfactants can improve the penetrability of the liquid composition into plain paper while they can prevent foaming of the liquid composition and quickly destroy the foams, if any. Although the use amount of the surfactants may vary depending on the surfactant to be used, use of from 0.05 to 5 mass % based on the total amount of the liquid composition of a surfactant is desirable since sufficient penetrability is secured therewith.

The water-soluble cationic compound may be freely selected and added for further imparting the cationicity of the liquid composition or the like purpose as far as the effects of the present invention are not injured.

The binder resin may be used in combination for further improving the abrasion resistance of the cationic fine particles or the like objects so long as the texture of the recording medium as well as the storage stability and ejection stability of the liquid composition are not deteriorated. For example, those freely selected from water-soluble polymers such as polyvinyl alcohol, gelatin, polyvinylpyrrolidone, polyethylene oxide, casein, starch, and carboxymethylcellulose, emulsions of copolymers such as polyacrylic acid, polyurethane and polyvinyl acetate, latexes of SBR, NBR, etc. may be used.

Surface Tension of Liquid Composition

It is more preferable that the liquid composition of the present invention be colorless or white. However, its color may be adjusted so as to conform to the color of the recording medium. Further, preferred ranges of various physical properties of the liquid composition as described above include a surface tension of from 10 to 60 mN/m (dyn/cm), more preferably from 10 to 40 mN/m (dyn/cm) and a viscosity of from 1 to 30 mPa·s (cP).

Anionic Liquid Composition

Next, the anionic liquid composition of the present invention will be described. The anionic liquid composition is characterized by including fine particles having anionic group on the surface thereof, stably dispersed therein as an essential constituent component. Further, those that contain a base and the pH is adjusted to 7 to 12 and those that have a zeta potential of from −5 to −90 mV are preferred.

pH and Zeta Potential

As a result of extensive studies, the present inventors have found that the liquid composition whose zeta potential is in a range of −5 to −90 mV exhibits particularly excellent coloring property on a recording medium since the cationic compound (for example, cationic colorant) in the ink particularly efficiently adsorbs on the surface of the anionic fine particles. The reason for this is not clear but presumably, like in the case of the cationic liquid composition as earlier explained, the fine particles may have a proper anionicity so that the cationic compound will not tend to rapidly aggregate but adsorb thinly and uniformly on the surface of the fine particles, thereby preventing the colorant from forming a huge lake, thus allowing the colorant to exhibit the inherent coloring characteristics thereof to a better extent. Further, in the case of the anionic liquid composition of the present invention, it may be considered that the liquid composition will become in a state of poor dispersion stability after adsorption of the cationic compound on the surface of the anionic fine particles and a change in concentration upon the penetration of the solvent component into the recording medium causes the fine particles to aggregate with each other on the recording medium, thus allowing the fine particles to readily remain in the vicinity of the surface of the recording medium.

As a result, excellent effects as described below may be obtained. That is, the use of the liquid composition of the present invention can give rise to coloring characteristics that are as good as will be obtained on a coated paper for ink-jet, less white haze or color unevenness even in an image region where much ink is imparted, such as a shadow portion or a solid portion, and images with excellent color homogeneity. Further, since anionic compounds such as colorant very efficiently adsorb on the surface of the fine particles to develop a color as compared with that on a coated paper, the imparting amount of anionic fine particles may be reduced. In particular, when printing on a plain paper, good images having excellent abrasion resistance in the printed portion can be obtained without deteriorating the texture of the paper. As for a more preferred range of zeta potential, for example, in the case where a liquid composition containing anionic fine particles having a zeta potential in a range of −10 to −85 mV is used, the boundary between dots of a solid print becomes indistinct and a further reduction in stripy unevenness due to the scanning of the head can be achieved. Further, the use of a liquid composition containing anionic fine particles having a zeta potential in a range of −15 to −65 mV can provide images having very excellent coloring property regardless of the kind of paper to be used.

The pH of the anionic liquid composition of the present invention is preferably in a range of 7 to 12 in the vicinity of 25° C. in consideration of storage stability and adsorbability of the anionic compound. In this pH range, the liquid composition when mixed with cationic ink does not considerably decrease the stability of the cationic compound, thus causing no strong aggregation between the cationic compounds, so that a decrease in saturation of the recorded image or providing obscure images can be effectively prevented. Further, within this range, the state of dispersion of anionic fine particles is good so that the storage stability and ejection stability upon ejecting from recording heads of the liquid composition can be maintained in good conditions. Further, when the liquid composition is mixed with an ink, the cationic substance fully adsorb on the surface of the anionic fine particles so that excessive penetration of the colorant into the inside of the recording medium can be prevented and ink-jet recorded articles having excellent coloring property can be obtained. A more preferred range of pH of the liquid composition is pH 8 to 11. In this range, corrosion of recording heads due to prolonged storage can be very effectively prevented and at the same time the abrasion resistance of the printed portion is further increased.

Anionic Fine Particle

Next, the components that constitute the anionic liquid composition of the present invention will be described. The anionic fine particles referred to as a first component are preferable, in a state of being dispersed in the liquid composition, to have anionicity on the surface of the fine particles themselves. When the liquid composition is mixed with a cationic ink, the anionic surface of the fine particles allows adsorption of the cationic colorant on the surface of the particles and prevents excessive penetration of the colorant into the inside of the recording medium, so that ink-jet recorded articles with high image density can be obtained. On the contrary, in a case where the surface of the fine particles is not anionic and the fine particles are present in the liquid composition separately from the anionic compound, the colorant aggregates around the anionic compound to deteriorate the coloring property of the colorant itself so that the coloring property of a level of a coated paper is difficult to realize. For this reason, the fine particles used in the liquid composition of the present invention have to have an anionic surface. However, not only fine particles that are inherently anionic but also those fine particles that are inherently electrostatically cationic or neutral may be suitably used as a constituent material of the liquid composition of the present invention as far as they are anionized by some treatment on the surface thereof.

The anionic fine particles suitably used in the present invention can fully achieve the object of the present invention as far as they can form pores in the aggregate of the fine particles formed on a recording medium so that the kind of the material of fine particle is not particularly limited. Specific examples of such a material include, for example, silica, titania, zirconia, boria, silica-boria, ceria, magnesia, silica-magnesia, calcium carbonate, magnesium carbonate, zinc oxide, etc., fine particles of complexes of these, organic fine particles, inorganic-organic complex fine particles, etc., these being anionized. In the liquid composition of the present invention, they can be used singly or two or more of them may be used in combination.

Physical Properties and Shape of Pores of Anionic Fine Particle

In order to efficiently form pores in the fine particle aggregate that are formed on a recording medium and at the same time to efficiently adsorb the colorant on the surface of the fine particles per se, the above-mentioned anionic fine particles used in the present invention preferably have an optimum pore radius as measured by the above-mentioned nitrogen adsorption/desorption method in a range of 2 to 12 nm and a total pore volume of 0.3 ml/g or more. More preferably, the cationic fine particles have an optimum pore radius by the above-mentioned nitrogen adsorption/desorption method in a range of 3 to 10 nm and a total pore volume of 0.3 ml/g or more since the pores in the fine particle aggregate that are formed on a recording medium tend to be efficiently formed in the intended pore radius range.

The above-mentioned anionic fine particles used in the present invention having a BET specific surface area in a range of 70 to 300 $m^2/g$ are preferred since they have sufficient adsorption points at which the colorant adsorbs on the surface of the fine particles so that they tend to efficiently maintain the colorant as remaining in a monomolecular state in the vicinity of the surface of the recording medium, thus contributing to the improvement of the coloring property.

Further, the shape of the anionic fine particles used in the present invention can be determined by dropping a dispersion of the fine particles in deionized water on a collodion membrane to prepare a sample for measurement and observing the sample on a transmission electron microscope. In the present invention, in forming pores in the aggregates upon formation of fine particle aggregate on a recording medium, fine particles having a nonspherical shape of fine particle, such as needle, plate, or rod or necklace in which spherical primary particles are connected to each other with a certain directional property to form a secondary particle may be advantageously used.

The content of the anionic fine particles as described above in the liquid composition of the present invention may be determined to be in an optimal range as appropriate. A range of 0.1 to 40% based on weight is a preferred range in achieving the object of the present invention and a more preferred range is from 1 to 30 weights and further preferably 3 to 15 weight %. In such a range, images with excellent coloring property can be stably obtained regardless of the kind of paper and the liquid composition has particularly excellent storage stability and ejecting stability.

Base

As earlier described, the anionic liquid composition of the present invention preferably contains a base and is adjusted to pH 7 to 12. The base, which is a second component, ionizes the surface of the cationic fine particles to increase surface potential thereof, thereby improving the dispersion stability of the fine particles in the liquid and playing the functions of improving adsorbability of the cationic compound (cationic colorant) in the ink and adjusting the viscosity of the liquid composition. The base preferably used in the present invention is not particularly limited as far as desired pH, zeta potential and dispersibility of the fine particles can be obtained as physical properties when used in combination of the anionic fine particles and those freely selected from the inorganic compounds and organic compounds described below may be used.

Specific examples of the base that can be used include sodium hydroxide, lithium hydroxide, sodium carbonate, ammonium carbonate, ammonia, sodium acetate, ammonium acetate, morpholine, and alkanolamines such as monoethanolamine, diethanolamine, triethanolamine, ethylmonoethanolamine, n-butylmonoethanolamine, dimethylethanolamine, diethylethanolamine, ethyldiethanolamine, n-butyldiethanolamine, di-n-butylethanolamine, monoisopropanolamine, diisopropanolamine, and triisopropanolamine, and the like. Among them, the bases having a primary dissociation constant in water of pKb of 5 or less are used particularly preferably since they are particularly excellent in the dispersion stability of the anionic fine particles and the adsorbability of the cationic compound (cationic colorant).

In the anionic liquid composition of the present invention, it is preferred that the mixing ratio of the anionic fine particles (A) to base (B) in the liquid composition is A:B= 200:1 to 5:1, more preferably 150:1 to 8:1, based on weight be used in order to improve the dispersion stability of the anionic fine particles and the adsorbability of the cationic compound on the surface of the fine particles.

Other Constituent Components

Next, other components constituting the anionic liquid composition of the present invention will be specifically described. The anionic liquid composition of the present invention contains the anionic fine particles as essential component and preferably a base such as that described above. In addition, it usually contains water as a liquid medium. Further, it may contain water-soluble organic solvents and other additives, for example, viscosity modifiers, pH adjusters, preservatives, various kinds of surfactant, antioxidants, and evaporation accelerators, water-soluble anionic compounds, binder resins, etc. as appropriate. The surfactant includes, for example, anionic surfactants such as fatty acid salts, higher alcohol sulfate salts, liquid fatty oil sulfate salts, and alkyl aryl sulfonate salts; and nonionic surfactants such as polyoxyethylene alkyl ethers, polyoxyethylene alkyl esters, polyoxyethylene sorbitan alkyl esters, acetylene alcohols, and acetylene glycols. In the present invention, one or two or more of these selected as appropriate may be used. Among them, in particular acetylene alcohols and acetylene glycols are preferably used. That is, these surfactants can improve the penetrability of the liquid composition into plain paper while they can prevent the foaming of the liquid composition and quickly destroy the foams, if any. Although the optimal amount of the surfactants may vary depending on the surfactant to be used, if the amount thereof in the anionic liquid composition is in a range of 0.05 to 5 mass % based on the total mass of the liquid composition, sufficient penetrability can be imparted to the liquid composition so that it is desirable to adjust the amount of the surfactant within this range as appropriate.

Surface Tension of Liquid Composition

It is more preferred that the anionic liquid composition of the present invention be colorless or white. However, its color may be adjusted so as to conform to the color of the recording medium. Further, preferred ranges of various physical properties of the liquid composition as described above include a surface tension of from 10 to 60 mN/m (dyn/cm), more preferably from 10 to 40 mN/m (dyn/cm) and a viscosity of from 1 to 30 mPa·s (cP).

Method for the Production of Liquid Composition

The liquid composition containing the above-mentioned fine particles according to the present invention can be produced by a method selected from those methods generally employed in dispersion. Specifically, to set the average particle diameter and particle size distribution of the fine particles in the liquid composition to the above-mentioned ranges, respectively, dispersion treatment by using a roll mill, sand mill, homogenizer, ultrasonic homogenizer, or ultra-high pressure emulsifier (for example, Nanomizer (trade name)) and classification treatment by using centrifugation, ultrafiltration or the like are preferably used. The use of these treating means can make uniform the dispersion particle size of the fine particles in the liquid composition.

Aqueous Ink

Anionic Ink

Next, a aqueous anionic ink used upon constituting the ink set of the present invention in combination with the cationic liquid composition of the present invention as earlier described will be described. The term "ink set" as used herein refers to a combination of the cationic liquid composition described above and at least one anionic ink containing an anionic substance (anionic colorant). Further, a combination of at least one ink obtained by excluding the liquid composition of the present invention from the ink set is called "ink subset". The anionic ink used in the present invention preferably contains an anionic compound in combination (this also being called an anionic colorant in the present invention) in the case where a water-soluble dye containing anionic group or a pigment is used as the colorant. The above-described anionic ink may further contain water, water-soluble organic solvents and other components such as viscosity modifiers, pH adjusters, preservatives, surfactants, antioxidants, etc. as constituent components, as needed. Hereinafter, each constituent component of the ink will be described.

Water-soluble Dye

The water-soluble dye having an anionic group used in the present invention is not particularly limited as far as it is selected from, for example, the water-soluble acid dyes, direct dyes, and reactive dyes described in the Color Index. Those not described in the Color Index may also be used without limitation as far as they have anionic groups, for example, a sulfonic group, a carboxyl group, etc. The water-soluble dyes referred to herein include also those dyes whose solubility is pH dependent.

Pigment

As another embodiment, the water-soluble anionic ink may be an ink that uses pigment and an anionic compound instead of the water-soluble dye having an anionic group as described above and also water, water-soluble organic solvents, and other components, for example, viscosity modifiers, pH adjusters, preservatives, surfactants, antioxidants, etc., as needed. Here, the anionic compound may be a dispersant of the pigment or when the dispersant of the pigment is not anionic, an anionic compound other than the dispersant may be added. Of course, when the dispersant is an anionic compound, another anionic compound may be further added.

No particular limitation is imposed on the pigments usable in the present invention. However, for example, the following pigments are preferably used. First, as carbon black used in black pigment inks, preferably used is one produced in accordance with the furnace process or channel process and having a primary particle diameter of from 15 to 40 $\mu$m, a specific surface area of from 50 to 300 $m^2$/g as measured by the BET method, an oil absorption of from 40 to 150 ml/100 g as determined by using DBP, a volatile matter of from 0.5 to 10 weight %, and a pH of from 2 to 9.

Examples of commercially available carbon black having such properties include No. 2300, No. 900, MCF88, No. 40, No. 52, MA7, MA8 and No. 2200B (all, products of Mitsubishi Chemical Industries Limited), RAVEN 1255 (product of Columbian Carbon Japan Limited), REGAL 400R, REGAL 660R and MOGUL L (all, products of CABOT Co.), and Color Black FW1, Color Black FW18, Color Black S170, Color Black S150, Printex 35 and Printex U (all, products of Degussa AG). Those newly prepared for the practice of the present invention may also be used.

Examples of pigments used in yellow inks include C.I. Pigment Yellow 1, C.I. Pigment Yellow 2, C.I. Pigment Yellow 3, C.I. Pigment Yellow 13, C.I. Pigment Yellow 16, C.I. Pigment Yellow 83, C.I. Pigment Yellow 74, C.I. Pigment Yellow 128, C.I. Pigment Yellow 134, C.I. Pigment Yellow 93, and C.I. Pigment Yellow 134.

Examples of pigments used in magenta inks include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112 and C.I. Pigment Red 122.

Examples of pigments used in cyan inks include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4 and C.I. Vat Blue 6, and C.I. Pigment Violet 19.

With respect to each color, those newly prepared for the practice of the present invention may also be used.

Dispersing Agent for Pigment

The dispersant for pigment usable in the present invention may be any water-soluble resin as far as it has the function of stably dispersing the pigment in water or an aqueous medium attributable to the presence of an anionic group. In particular, preferred is a resin having a weight average molecular weight in a range of 1,000 to 30,000, more preferably in a range of 3,000 to 15,000. Specifically, block copolymers, graft copolymers or random copolymers or salts thereof consisting of two or more monomers selected from hydrophobic monomers such as styrene, styrene derivatives, vinylnaphthalene, vinylnaphihalene derivatives, aliphatic alcohol esters of α,β-ethylenically unsaturated carboxylic acids, or acrylic acid, acrylic acid derivatives, maleic acid, maleic acid derivatives, itaconic acid, itaconic acid derivatives, fumaric acid and fumaric acid derivatives. These resins are alkali-soluble type resins that are soluble in aqueous solutions having dissolved therein bases.

Further, homopolymers or salts thereof consisting of hydrophilic monomers may be used. Still further, water-soluble resins such as polyvinyl alcohol, carboxymethylcellulose, naphthalenesulfonic acid-formaldehyde condensation products may be used. However, the use of the alkali-soluble resins is more advantageous in that the dispersion can be adjusted to have a low viscosity and it is readily dispersed. It is preferred that the above-mentioned water-soluble resins may be preferably used in a range of 0.1 to 5 weight % based on the total weight of the ink.

Such pigment and water-soluble resin as described above are dispersed or dissolved in an aqueous medium to produce pigment inks usable in the present invention. The aqueous medium preferably used in the pigment type inks according to the present invention is a mixed solvent of water and a water-soluble organic solvent. As the water, it is preferable to use ion-exchanged water (deionized water) instead of tap water containing various ions.

When the dispersant is not an anionic polymer, it is necessary to further add an anionic compound to the above-described pigment-containing inks. Examples of anionic compounds preferably used in the present invention include low-molecular weight anionic surfactants described below in addition to high-molecular weight substances such as the alkali-soluble resins described in the item of [Dispersing agent for pigment].

Specific examples of low molecular anionic surfactant include disodium lauryl sulfosuccinate, disodium polyoxyethylene lauroyl ethanolamide ester sulfosuccinate, disodium polyoxyethylene alkyl sulfosuccinate, carboxylated polyoxyethylene lauryl ether sodium salt, carboxylated polyoxyethylene tridecyl ether sodium salt, sodium polyoxyethylene lauryl ether sulfate, triethanolamine polyoxyethylene lauryl ether sulfate, sodium polyoxyethylene alkyl ether sulfate, sodium alkylsufate, triethanolamine alkylsulfate, etc. However, the present invention should not be limited thereto. Suitable use amount of the anionic substances exemplified as above is in a range of 0.05 to 10 weight %, more preferably from 0.05 to 5 weight %, based on the total weight of the ink.

Self-dispersing Type Pigment

Further, as the pigment usable in the anionic ink, also self-dispersing type pigments that can be dispersed in water or an aqueous medium without having to use any dispersant may be used. The self-dispersing type pigment includes those pigments having at least one anionic hydrophilic group bonded to the surface of the pigment directly or through another atomic group. Also, it includes pigments in which the anionic hydrophilic group is at least one selected from the hydrophilic groups described below and further those in which the other atomic group is an alkylene group having 1 to 12 carbon atoms, a phenylene group which may have a substituent, or a naphthylene group which may have a substituent group:

—COOM, —SO₃M, —SO₂NH₂, —PO₃HM, —PO₃M₂

(wherein M represents a hydrogen atom, an alkali metal, ammonium, or an organic ammonium).

The pigment anionically charged by the introduced hydrophilic group on the surface thereof described above has excellent dispersibility in water due to the repulsion of ions, so that when contained in an aqueous ink, it maintains a stable dispersion state without addition of dispersants. In particular, the case where the pigment is carbon black is preferred.

Components Added to Ink

In addition to the components described above, surfactants, defoaming agents, preservatives and the like may be added to an ink in order to prepare an ink having desired physical properties as needed. Furthermore, commercially available water-soluble dyes and the like may be added to the ink.

The surfactant includes anionic surfactants such as fatty acid salts, higher alcohol sulfate salts, liquid fatty oil sulfate salts, and alkyl aryl sulfonate salts; and nonionic surfactants such as polyoxyethylene alkyl ethers, polyoxyethylene alkyl esters, polyoxyethylene sorbitan alkyl esters, acetylene alcohols, and acetylene glycols. One or two or more of these selected as appropriate from these may be used. Among the surfactants described above, in particular acetylene alcohols and acetylene glycols are preferred. That is, these surfactants can improve the penetrability of the liquid composition into plain paper while they can prevent the foaming of the liquid composition and quickly destroy the foams, if any. Although the use amount of the surfactants may vary depending on the addition amount of the dispersant to be used, the use of from 0.01 to 5 weight % based on the total mass of the liquid composition of a surfactant is desirable. On this occasion, it is preferred that the addition amount of the surfactant be determined so that the surface tension of the ink at 25° C. is preferably 10 mN/m (dyn/cm) or more, more preferably 20 mN/m (dyn/cm) or more, further preferably 30 mN/m (dyn/cm) or more and also 70 mN/m or less. This is because such formulation as described above can effectively prevent the occurrence of printing slippage (deviation of the impact point of ink droplets) due to the wetting of the tip of nozzles in the ink-jet recording system used in the present invention.

Such a pigment ink as described above is prepared in the following manner. A pigment is first added to an aqueous medium containing at least a resin as a dispersant and water, and the mixture is stirred. A dispersion treatment is then conducted in accordance with a dispersing technique described below, and as needed, a centrifugal treatment is carried out to obtain a desired dispersion. Such components as mentioned above are then added to the dispersion, and the resultant mixture is stirred to prepare an ink.

When the alkali-soluble resin is used, it is necessary to add a base for dissolving the resin in the dispersion. The amine or base for dissolving the resin must be added in an amount at least once as much as the amount of an amine or base determined by calculation from the acid value of the resin. This amount of the amine or base is determined in accordance with the following equation:

Amount (g) of amine or base=[(acid value of the resin)×(molecular weight of the amine or base)×(amount of the resin)(g)]/ 5600

It is effective for improving the dispersion efficiency of the pigment to conduct premixing for at least 30 minutes before the aqueous medium containing the pigment is subjected to the dispersion treatment. This premixing serves to improve the wettability of the surface of the pigment and facilitate adsorption of the dispersant on the pigment surface.

Preferable examples of the base added to the dispersion in the case where the alkali-soluble resin is used include organic amines such as monoethanolamine, diethanolamine, triethanolamine, aminomethylpropanol and ammonia, and inorganic bases such as potassium hydroxide and sodium hydroxide.

On the other hand, any dispersing machine routinely used may be employed as a dispersing machine used for preparing the pigment ink in the present invention. Examples thereof include ball mills, sand mills, etc. Of these mills, a high-speed sand mill may preferably be used. Examples thereof include Super Mill, Sand Grinder, Beads Mill, Agitator Mill, Grain Mill, Dynol Mill, Pearl Mill Coball Mill (all, trade names), etc.

To the inks according to the present invention, may be added various kinds of additives such as water-soluble organic solvents, surfactants, pH adjusters, rust preventives, mildewproofing agents, antioxidants, evaporation accelerators, chelating agent and water-soluble polymers in addition to the above-described components, as needed.

A liquid medium dissolving or dispersing the above-described colorant used in the present invention is preferably a mixture of water and a water-soluble organic solvent. Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones such as acetone; ethers such as tetrahydrofuran and dioxane; polyalkylene glycols such as polyethylene glycol and polypropylene glycol; alkylene glycols the alkylene group of which has 2 to 6 carbon atoms, such as ethylene glycol, propylene glycol, butylene glycol, triethylene glycol, 1,2,6-hexanetriol, thiodiglycol, hexylene glycol and diethylene glycol; lower alkyl ethers of polyhydric alcohols, such as glycerin, ethylene glycol monomethyl (or monoethyl) ether and diethylene glycol monomethyl (or monoethyl) ether; cyclic amide compounds such as N-methyl-2-pyrrolidone, 1,3-dimethyl-2-imidazolidinone, sulfolane, dimethyl sulfoxide, 2-pyrrolidone and ε-caprolactam; and imide compounds such as succinimide.

The content of the water-soluble organic solvent in each ink is generally within a range of 1 to 40 wt %, preferably from 3 to 30 wt % based on the total weight of the ink. In the case where the content of water in the ink is within a range of 30 to 95 wt %, the solubility of the colorant is satisfactory, and the increase in viscosity of the resulting ink is inhibitted, and the fixability of the ink is fully satisfied.

The anion inks according to the present invention may also be used for general water-soluble writing utensils, but are particularly suitable for use in an ink-jet recording system of a type in which an ink is ejected by the bubbling phenomenon of the ink caused by thermal energy. This recording system has a feature that the ejecting of the ink becomes extremely stable, and no satellite dots generate. In this case, the thermal physical properties (for example, the specific heat, the coefficient of thermal expansion, the heat conductivity, etc.) of the inks may however be controlled in some cases.

Cationic Ink

Next, an aqueous cationic ink constituting the ink set of the present invention in combination with the anionic liquid composition as earlier described will be described. The term "ink set" as used herein refers to a combination of the liquid composition of the present invention and at least one kind of ink containing a cationic substance (cationic colorant). Further, a combination of at least one kind of ink obtained by excluding the liquid composition of the present invention from the ink set is called "ink subset". The cationic ink used in the present invention preferably contains a cationic compound in combination (this combination also being called a cationic colorant in the present invention) in the case where a water-soluble dye containing cationic group or a pigment is used as the colorant. The above-described ink used in the present invention may further contain water, water-soluble organic solvents and other components such as viscosity modifiers, pH adjusters, preservatives, surfactants, antioxidants, etc. as constituent components, as needed. Hereinafter, each constituent component of the ink will be described.

Water-soluble Dye

The water-soluble dye having a cationic group used in the present invention is not particularly limited as far as it is selected from, for example, the water-soluble dyes described in the Color Index. Those not described in the Color Index may also be used without limitation as far as they have a cationic group. Note that the water-soluble dyes referred to herein also include those dyes whose solubility is pH dependent.

Pigment

As another embodiment, the ink used in the present invention may be an ink that uses pigment and a cationic compound instead of the water-soluble dye having a cationic group as described above and also water, water-soluble organic solvents, and other components, for example, viscosity modifiers, pH adjusters, preservatives, surfactants, antioxidants or the like, as needed. Here, the cationic compound may be a dispersant for the pigment or when the dispersant of the pigment is not cationic, a cationic compound other than the dispersant may be added. Of course, when the dispersant is a cationic compound, another cationic compound may be further added. The pigments usable in the present invention are not particularly limited and the pigments described in the item of the anionic ink can be preferably used.

Dispersing Agent for Pigment

As a dispersant for pigment contained in the inks used in the present invention, any water-soluble resin may be used as long as it has the function of stably dispersing the pigment in water or an aqueous medium due to presence of a cationic group. Specific examples thereof may be a polymer obtained by polymerization of a vinyl monomer and at least a portion of the polymer obtained has cationicity. Examples of the cationic monomer to constitute a cationic moiety include salts of tertiary amine monomers and quaternarized compounds derived therefrom as described below.

N,N-Dimethylaminoethyl methacrylate [$CH_2=C(CH_3)-COO-C_2H_4N(CH_3)_2$]

N,N-Dimethylaminoethyl acrylate [$CH_2=CH-COO-C_2H_4N(CH_3)_2$]

N,N-Dimethylaminopropyl methacrylate [$CH_2=C(CH_3)-COO-C_3H_6N(CH_3)_2$]

N,N-Dimethylaminopropyl acrylate [$CH_2=CH-COO-C_3H_6N(CH_3)_2$]

N,N-Dimethylacrylamide [$CH_2=CH-CON(CH_3)_2$]

N,N-Dimethylmethacrylamide [$CH_2=C(CH_3)-CON(CH_3)_2$]

N,N-Dimethylaminoethylacrylamide [$CH_2=CH-CONHC_2H_4N(CH_3)_2$]

N,N-Dimethylaminoethylmethacrylamide [$CH_2=C(CH_3)-CONHC_2H_4N(CH_3)_2$]

N,N-Dimethylaminopropylacrylamide [$CH_2=CH-CONHC_3H_6N(CH_3)_2$]

N,N-Dimethylaminopropylmethacrylamide [$CH_2=C(CH_3)-CONHC_3H_6N(CH_3)_2$] and the like.

Compounds for forming salts with the tertiary amines include hydrochloric acid, sulfuric acid, acetic acid, etc. The compounds used for quaternarization include methyl chloride, dimethyl sulfate, benzyl chloride, epichlorohydrin, etc. Among these, methyl chloride, dimethyl sulfate, etc. are preferred in preparing dispersants used in the present invention. The tertiary amines salts and quaternary ammonium compounds as described above behave as cations in water and under neutralized conditions they are stably dissolved in the acidic region. The content of these monomers in the copolymer is preferably in a range of 20 to 60 wt %.

Other monomers used for constituting the above-mentioned polymer dispersants include, for example, a 2-hydroxyethyl methacrylate, acrylate esters having a hydroxyl group such as acrylate esters having a long ethylene oxide chain in the side chain, hydrophobic monomers such as styrene monomers, and water-soluble monomers soluble in water in the vicinity of pH 7 such as acrylamides, vinyl ethers, vinylpyrrolidones, vinylpyridines, and vinyloxazolidines. The hydrophobic monomers that can be used include styrene, styrene derivatives, vinylnaphthalene, vinylnaphthalene derivatives, alkyl esters of (meth) acrylates, acrylonitrile, etc. In the polymer dispersant obtained by the copolymerization, the water-soluble monomer is used preferably in a range of 15 to 35 wt % in order to stabilize the resultant copolymer in the aqueous solution and the hydrophobic monomer is used preferably in a range of 20 to 40 wt % in order to increase the effect of dispersing in the pigment of the copolymer.

Self-dispersing Type Pigment

Cationically charged pigments include those pigments in which a hydrophilic group bonded directly or through another atomic group is bonded to at least one quaternary ammonium selected from the groups described below. However, the present invention should not be limited thereto.

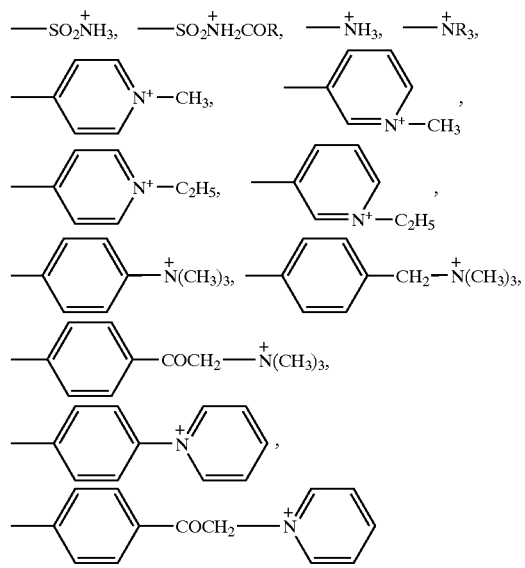

In the above formulae, R represents a linear or branched alkyl group having 1 to 12 carbon atoms, substituted or unsubstituted phenyl group or a substituted or unsubstituted naphthyl group.

The above-mentioned cationic group may have a counter ion, for example, $NO_3-$ or $CH_3COO-$.

The method of producing the self-dispersing pigments cationically charged by the introduced hydrophilic groups described above will be explained taking as an example a method of bonding an N-ethylpyridyl group of the structure shown below. In this case, such a method includes a method in which the pigment is treated with 3-amino-N-ethylpyridinium bromide.

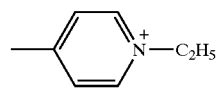

As described above, the pigment cationically charged by introduction of hydrophilic groups on the surface of the pigment have excellent water dispersibility attributable to the repulsion of ions so that even when they are contained in aqueous inks, they can maintain the state of a stable dispersion without addition of dispersants. In particular, the case in which the pigment is carbon black is preferred.

Additive Components in Ink

Besides the above components, a surfactant, antifoaming agent, antiseptic and the like may be suitably added to the pigment inks according to the present invention, as needed, in order to provide them as inks having desired physical properties. A commercially available water-soluble dye or the like may also be added.

As the surfactant, primary, secondary and tertiary amine salt type compounds, specifically, hydrochloric acid salts, acetic acid salts, etc. of laurylamine, coconut amine, stearylamine, rosin amine, etc.; quaternary ammonium salt type compounds, specifically lauryltrimethylammonium chloride, cetyltrimethylammonium chloride, benzyltributylammonium chloride, benzalkonium chloride, etc.; pyridinium salt type compounds, specifically cetylpyridinium chloride, cetylpyridinium bromide, etc.; imidazoline type cationic compounds, specifically 2-heptadecenyl-hydroxyethylimidazoline, etc.; higher alkylamine ethylene oxide adducts, specifically, cationic surfactants such as dihydroxyethylstearylamine, etc., amphoteric surfactants exhibiting cationicity in a certain pH range may be used. Specific examples thereof include amino acid type amphoteric surfactants; R—NH—$CH_2$—$CH_2$—COOH type compounds; betaine type compounds, specifically carboxylic acid salt type amphoteric surfactants such as stearyldimethylbetaine and lauryldihydroxyethylbetaine, amphoteric surfactants of sulfate type, sulfonate type, phosphate type, etc. Examples of nonionic surfactant include, for example, polyoxyethylene alkyl ethers, polyoxyethylene alkyl esters; acetylene alcohols; acetylene glycols, etc. In the present invention, one or two or more of these selected as appropriate from these may be used. Among them, in particular acetylene alcohols and acetylene glycols are preferably used. That is, these surfactants can improve the penetrability of the liquid composition into plain paper while they can prevent foaming of the liquid composition and quickly destroy the foams, if any. Although the use amount of the surfactants may vary depending on the surfactant to be used, use of from 0.05 to 5 mass % based on the total amount of the liquid composition of a surfactant is desirable since sufficient penetrability is secured therewith.

The cationic inks according to the present invention may desirably be controlled so as to have, as their own physical properties at 25° C., a surface tension of 10 mN/m or more, more preferably 20 mN/m, and 70 mN/m or less, further a range of 30 to 68 mN/m, and a viscosity is of 15 mPa·s (cP) or lower, more preferably 10 mPa·s (cP) or lower, and further preferably 5 mPa·s (cP) or lower from the viewpoints of making the ink penetrability of printed images when printed on plain paper or the like preferable, and at the same time making the matching of the inks with a head for ink-jet recording preferable.

Concentration of Soluble Ink

The mass concentration of the components of colorants contained in the anionic and cationic inks may be selected as appropriate depending on the kind of the colorants such as aqueous dyes, pigments, and self-dispersing pigments. Preferably, it is in a range of 0.1 to 20 mass % , and particularly 0.1 to 12 mass % based on the mass of the ink. In the case of mass concentration of the components of colorants being in a range of 0.3 to 7 mass % , if the relationship between the concentration of fine particle in the liquid composition and the concentration of colorants in the ink based on mass is such that 1.2 parts or less, particularly 1.0 part or less of the colorant is present per 1 part of the fine particle, images formed under recording conditions using an ordinary two-liquid system have very excellent coloring property.

Method of Forming Colored Portion on the Recording Medium

Next a method of forming a colored portion on the recording medium of the present invention will be described below. The method of forming a colored portion on the recording medium of the present invention comprises (i) a step of imparting an anionic or cationic aqueous ink containing a colorant to a recording medium, and (ii) a step of imparting a liquid composition containing fine particles whose surface is charged with an opposite polarity to that of the ink in a state of dispersion to the recording medium, wherein the aqueous ink and the liquid composition contact with each other in liquid states on the surface of the recording medium. Hereinafter, methods of imparting the liquid composition and aqueous ink constituted as described above to the recording medium will be explained.

The method of forming a colored portion on the recording medium of the present invention includes the step (ii) of imparting the liquid composition as described above to the recording medium and the step (i) of imparting an anionic or cationic aqueous ink containing a colorant to the recording medium. On this occasion the liquid composition is imparted to a colored portion-forming region of the recording medium or to and near the colored portion-forming region of the recording medium so that the aqueous ink and the liquid composition can contact with each other in a liquid state. The term "colored portion-forming region" as used herein refers to a region where dots of an ink adhere and the term "near the colored portion-forming region" refers to a region outside the colored portion-forming region and remote therefrom by 1 to 5 dots.

In the method of forming a colored portion on a recording medium according to the present invention, the liquid composition of the present invention as described above and an aqueous ink may be imparted to a recording medium in any method as long as they contact with each other in a liquid state on the recording medium. Therefore the order of imparting the liquid composition and ink to the recording medium is not questioned. For example, either performing first the step (ii) and then the step (i) or performing first the step (i) and then the step (ii) may be adopted. It is preferred to perform the step (i), then the step (ii) and further the step (i) again. In a case where the liquid composition is imparted to the recording medium first, the time interval from imparting the liquid composition to imparting the ink is not particularly limited. In order for the liquid composition and ink to contact with each other in a liquid state, it is preferred that the ink is imparted onto the recording medium substantially simultaneously or within several seconds.

Recording Medium

The recording medium used in the method of forming a colored portion on the recording medium of the present invention is not particularly limited and so-called plain paper such as copy paper and bond paper conventionally used may be suitably used. Of course, coated paper and transparent paper for OHP that are prepared specially for ink-jet recording may also be suitably used. Further, general wood-free paper or glossy paper may be suitably used.

Method of Imparting Liquid Composition

The method of imparting the liquid composition of the present invention may include a method of imparting the liquid composition over the entire surface of the recording medium by using, for example, sprays or rollers. However, it is preferred that the imparting is effected by an ink-jet system which can impart a liquid composition selectively and uniformly onto a colored portion-forming region only or the colored portion-forming region and in the vicinity thereof only. In this case, various types of ink-jet recording system may be used. Particularly preferred is a system in which droplets of the liquid composition are ejected by using bubbles generated by thermal energy.

Ink Jet Recording Apparatus

Next, the ink-jet recording apparatus of the present invention will be described. The ink-jet recording apparatus of the present invention comprises an ink-containing unit containing an anionic or cationic aqueous ink containing a colorant, a first recording unit provided with an ink-jet head for ejecting the ink, a liquid composition of the present invention as described above, preferably a liquid composition containing fine particles whose surface has an opposite polarity to that of the ink in a dispersed state, and a second recording unit provided with an ink-jet head for ejecting the liquid composition.

These will be hereinafter described.

FIG. 1 is a schematic perspective view showing an example of a general construction of an ink-jet printer to which the present invention is applied. In FIG. 1, reference numeral 1 denotes a cartridge constituting a print head for ejecting ink to perform printing and reference numeral 2 denotes a cartridge constituting a liquid composition ejecting head for ejecting a liquid composition. In the illustrated example, four cartridges 1 for printing that use ink of different colors and one cartridge 2 for ejecting a liquid composition are used. Each cartridge 1 for printing has a structure in which an ink tank portion is provided in its upper part and an ink ejecting portion (printing portion) is provided in its lower part. The cartridge 2 for ejecting a liquid composition has a structure in which a liquid composition tank portion is provided in its upper part and a liquid composition ejecting portion is provided in its lower part. Moreover, connectors for receiving a driving signal and the like are provided in these cartridges 1 and 2. Reference numeral 3 denotes a carriage.

The four head cartridges for printing (print heads) 1 for performing printing with ink of different colors, respectively, and one head cartridge for ejecting a liquid composition (liquid composition ejecting head) 2 are positioned and mounted on the carriage 3. In addition, a connector holder for transmitting a signal and the like for driving each print head 1 and the liquid composition ejecting head 2 are provided in the carriage 3. The head cartridges 1 and 2 are electrically connected via the connect holder.

Each print head 1 stores ink of different colors, for example, yellow (Y), magenta (M), cyan (C) and black (B), respectively. In this figure, head cartridges for printing (print heads) 1Y, 1M, 1C and 1B for ink of yellow, magenta, cyan and black are mounted from the left in the figure, and the head cartridge for ejecting a liquid composition (liquid composition ejecting head) 2 storing the liquid composition is mounted in the right end. In FIG. 1, reference numeral 4 denotes a scanning rail that extends in a main scanning direction of the carriage 3 and slidably supports the carriage and reference numeral 5 denotes a driving belt for transmitting a driving force for reciprocating the carriage 3. In addition, reference numerals 6 and 7 as well as 8 and 9 are conveying roller pairs that are arranged in front and back of a print position by the print head and nips and conveys a recording medium 10, respectively. The recording medium 10 such as paper is guided to and supported by a platen (not shown), which regulates a print surface to be flat, in a pressed contact state in the part of the print position. At this point, ejection port forming surfaces of the head cartridges (heads) 1 and 2 mounted on the carriage 3 protrude downward from the carriage 3 and are placed between the rollers for conveying a recording medium 7 and 9 to oppose each other in parallel with the recording medium 10 that is in pressed contact with the guiding surface of the platen (not shown).

A recovery unit 11 is disposed in the vicinity of a home position set in a left side of an ink-jet printer deviating from its printing area in this figure. In the recovery unit 11, four caps 12 corresponding to the four print heads (head cartridges) 1Y, 1M, 1C and 1B and one cap 13 corresponding to the one liquid composition ejecting head (head cartridges) 2 are provided in its vertical direction such that they can move up and down. Then, when the carriage 3 is in the home position, the caps 12 and 13 corresponding to the ejection port forming surfaces of the heads 1 and 2 are brought in pressed contact with them, whereby ejection ports of the respective heads 1 and 2 are sealed (capped). Thickening and fixing of ink due to evaporation of an ink solvent inside the ejection port are prevented and occurrence of a ejection failure is prevented by the capping.

In addition, the recovery unit 11 is provided with a suction pump 14 communicating with the respective caps 12 and a suction pump 15 communicating with the cap 13. These pumps 14 and 15 are used for capping the ejection port forming surfaces of the print heads 1 and the liquid composition ejecting head 2 by the caps 12 and 13 and executing suction recovery processing if an ejection failure occurs in the print heads 1 and the liquid composition ejecting head 2. Moreover, two wiping members (blades) 16 and 17 consisting of an elastic member such as rubber are provided in the recovery unit 11. The blade 16 is held by a blade holder 18 and the blade 17 is held by a blade holder 19.

In the schematic view of the present invention, the blade holders 18 and 19 are moved up and down by a blade lifting mechanism (not shown) that is driven utilizing movement of the carriage 3, respectively, whereby the blades 16 and 17 move up and down between a position to which they protrude (rise) in order to wipe off ink and foreign bodies deposited on the ejection port forming surfaces of the heads (cartridges) 1 and 2 (wiping position) and a position to which they retreat (fall), which is a standby position. In this case, the blade 16 for wiping the print heads 1 and the blade 17 for wiping the liquid composition ejecting heads 2 are configured such that they are independent of each other and can move up and down individually.

Then, when the carriage 3 moves from the right side in FIG. 1 (printing area side) to the home position side or when the carriage 3 moves from the home position side to the printing area side, the blade 16 abuts the ejection port forming surface of each print head 1 and the blade 17 abuts the ejection port forming surface of the liquid composition ejecting head 2. As a result, a wiping operation of these ejection port forming surfaces is performed by their relative movement.

Figure 2:
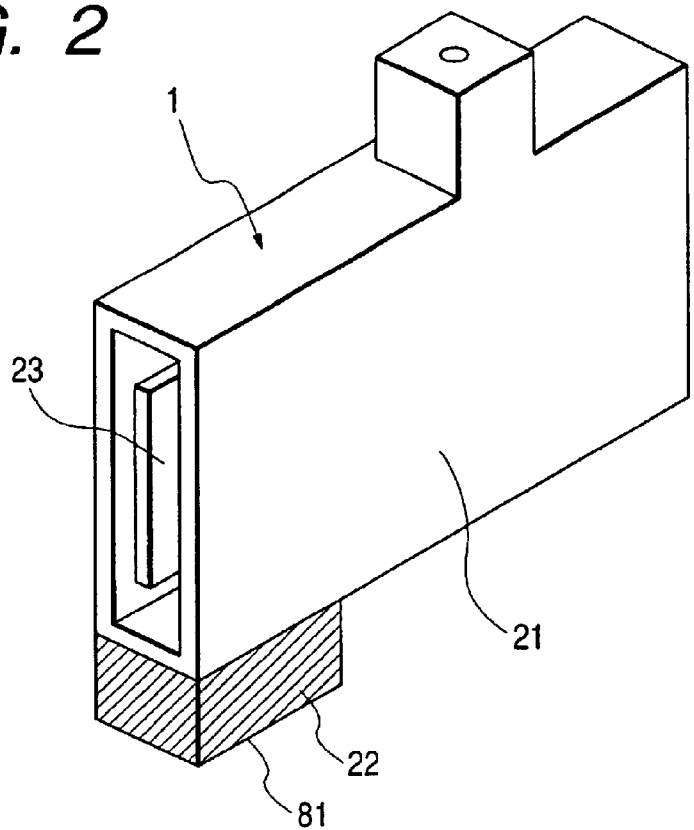
FIG. 2 is a schematic perspective view showing a head cartridge in the apparatus shown in FIG. 1.

FIG. 2 is a schematic perspective view showing the print head (cartridge) 1 that has a structure in which an ink ejecting portion and an ink tank are integrated. Further, the liquid composition ejecting head 2 has a configuration that is substantially the same as the printer head 1 except that liquid to be stored and used is a liquid composition. In FIG. 2, the printer head 1 has an ink tank portion 21 in its upper part and an ink ejecting portion (print head portion) 22 in its lower part. Moreover, the print head 1 has a head side connector 23 for receiving a signal and the like for driving the ink ejecting portion 22 and, at the same time, outputting an ink remaining amount detection signal. This connector 23 is provided in a position parallel with the ink tank portion 21. The print head 1 has an ejection port forming surface 81 on a bottom surface side (recording medium 10 side) in FIG. 2. A plurality of ejection ports are formed on the ejection port forming surface 81. An ejection energy generating element for generating energy required for ejecting ink is disposed in a liquid path part communicating to each ejection port.

The print head (head cartridge) 1 is ink-jet printing means for ejecting ink to perform printing and is constituted by a replaceable ink-jet cartridge in which the ink ejecting portion 22 and the ink tank 21 are integrated. This print head 1 is ink-jet printing means for utilizing thermal energy to eject ink and is provided with an electrothermal converter. In addition, the print head 1 utilizes a pressure change, which is caused by growth and contraction of bubbles by film boiling caused by thermal energy applied by the electrothermal converter, to eject ink from the ejection ports and perform printing.

Figure 3:
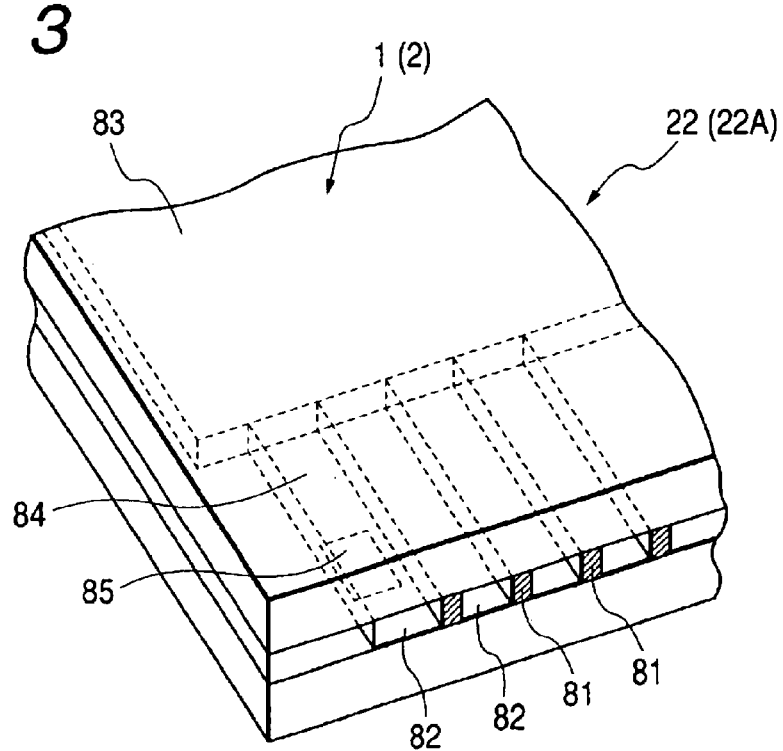
FIG. 3 is a partial perspective view schematically showing the structure of an ink ejecting portion in the head cartridge shown in FIG. 1.

FIG. 3 is a partial perspective view schematically showing a structure of the ink ejecting portion 22 (liquid composition ejecting portion 22A) of the print head 1 (liquid composition ejecting head 2). In FIG. 3, on the ejection port forming surfaces 81 opposing the recording medium 10 (such as a print sheet) with a predetermined gap (e.g., approximately 0.5 to 2.0 mm) between them, a plurality of ejection ports 82 are formed at a predetermined pitch and electrothermal converters (heating resistors or the like) 85 for generating energy for ejecting are disposed along a wall surface of each liquid path 84 communicating to a common liquid chamber 83 and each ejection port 82. The plurality of ejection ports 82 are arranged in a positional relation to be lined up in a direction crossing the moving direction (main scanning direction) of the print head 1. In this way, the print head 1 is configured so that it drives (energizes) the corresponding electrothermal converter 85 based on an image signal or an ejecting signal, film-boils ink in the liquid paths 84 and ejects ink from the ejection ports 82 by a pressure generated at that point. Here, as a member constituting an ink tank holding ink and a tank holding a liquid composition (for ease of description, this tank is also referred to as an ink tank), which are provided in the print head cartridges 1 and 2, a material excellent in chemical resistance is preferably used because it contacts with ink and a liquid composition. As a material that satisfies these requirements and is generally available, there are resin materials such as polyolefin resin, polyvinyl chloride, polyvinylidene chloride, silicone resin, ethylene-vinyl acetate copolymer, ABS resin, polyacetals, nylon, unsaturated polyester resin, PET and aramide resin, and synthetic rubber such as styrene butadiene rubber (SBR), butadiene rubber, chloroprene, nitrile rubber, butyl rubber, EPDM, urethane rubber, silicone rubber, acrylic rubber, epichlorohydrin rubber and fluorine rubber. In these resins and rubbers, many additive assistants such as a stabilizer, a UV absorbent, and an antioxidant are added in an appropriate amount according to an object in addition to chemicals constituting them.

These additive components may be eluted into ink or a liquid composition and the eluted components may react with components of the ink or the liquid composition to generate an insoluble material. Among other things, fatty acid and fatty acid derivatives may be eluted into ink or a liquid composition to precipitate again by a change in environment such as temperature to form an insoluble material, or a dissolved ion and an insoluble material contained in the ink or the liquid composition may react with each other to generate an insoluble material of fatty acid salt to clog a filter or an ejection port and prevent flow of ink. In order to prevent precipitation of an insoluble material itself from such a member and precipitation thereof due to a reaction of an insoluble material and a component in ink or a liquid composition, it is preferable in inhibiting the precipitation to take a measure such as reducing an additive content in a resin component forming an ink tank, selection of a material that is not easily eluted, change of a solvent composition of a liquid composition and reducing a content of a reactive component in ink or a liquid composition.

Figure 4A:
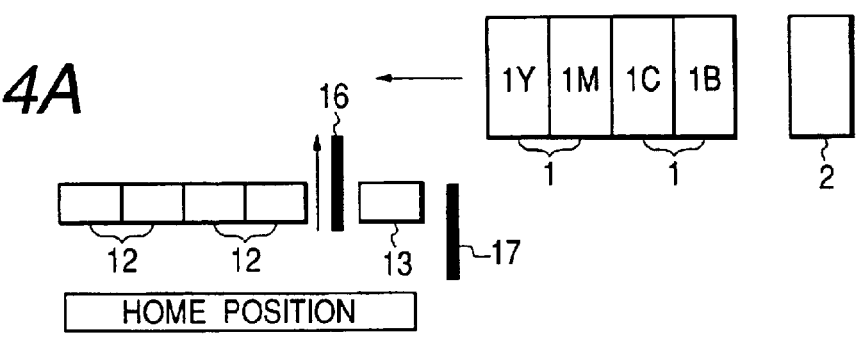
FIGS. 4A, 4B, 4C and 4D are schematic views showing the wiping action of the ink-jet printing apparatus shown in FIG. 1.

FIGS. 4A to 4D, 5A to 5D and 6A to 6D are schematic views showing a wiping operation of the ink-jet printer described above. FIGS. 4A to 4D show the case in which the carriage 3 moves from the printing area side to the home position side. As shown in FIG. 4A, the print heads 1 and the liquid composition ejecting head 2 on the carriage 3 move from the right side (printing area side) to the home position.

Figure 4B:
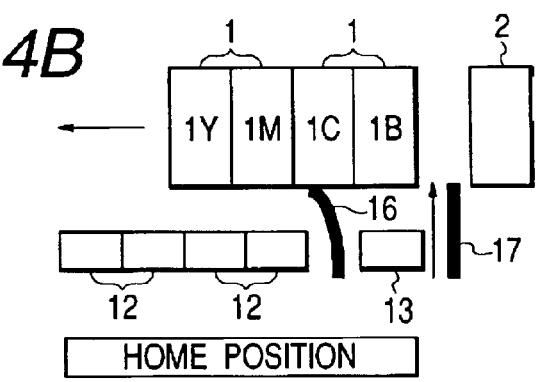

Then, as shown in FIG. 4B, first, the blade 16 for ink present between the cap for ink 12 and the cap for a liquid composition 13 rises and sequentially wipes the print head 1Y, 1M, 1C and 1B following the movement of the carriage 3.

Figure 4C:
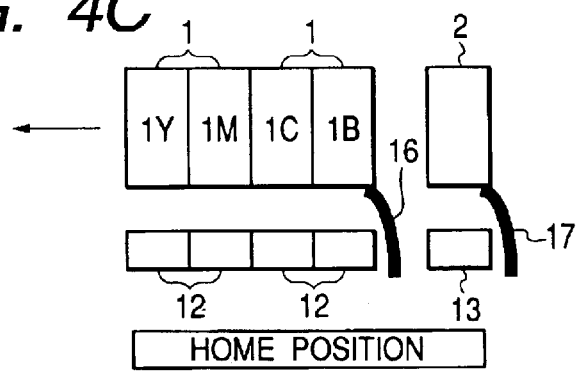
Figure 4D:
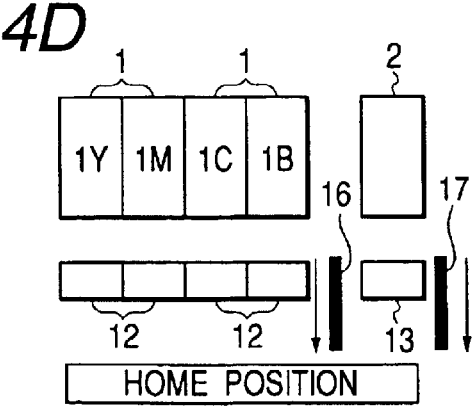

Moreover, as shown in FIG. 4C, after each print head 1 passes over the blade for a liquid composition 17, the blade for a liquid composition 17 is caused to rise to simultaneously wipe the ejection port forming surface of the liquid composition ejecting head 2 as shown in FIG. 4D. After the blade for ink 16 finishes wiping the fourth print head 1 and the blade for a liquid composition 17 finishes wiping the liquid composition ejecting head 2, the blades 16 and 17 come down and stand by in a stand-by position. Although it is constructed so that the wiping by the blades 16 and 17 is executed when the carriage 3 moves from the right side (printing area side) in FIG. 1 to the home position side where the recovery unit 11 is located in FIG. 4, a wiping direction is not limited to this and the wiping may be performed when the carriage 3 moves from the home position side to the right side (printing area side) as shown in FIG. 5.

Figure 5A:
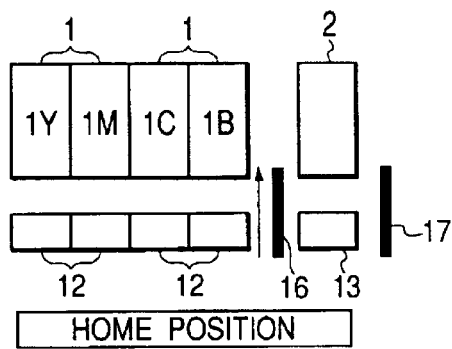
FIGS. 5A, 5B, 5C and 5D are schematic views showing the wiping action of the ink-jet printing apparatus shown in FIG. 1, FIG. 5A showing the elevation of each blade, FIG. 5B showing the movement of each head from the home position to the print region side, FIG. 5C showing the lowering of a blade for a liquid composition, and FIG. 5D showing the wiping of the print head and the lowering of the blade for ink.
Figure 5B:
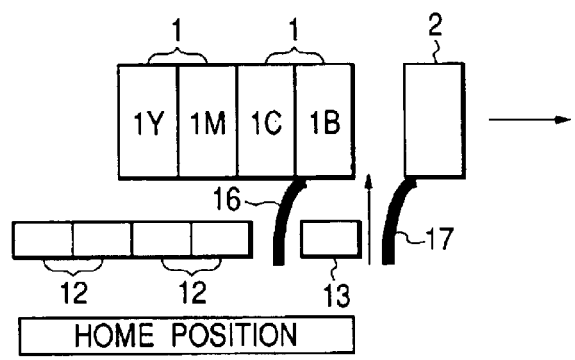
Figure 5C:
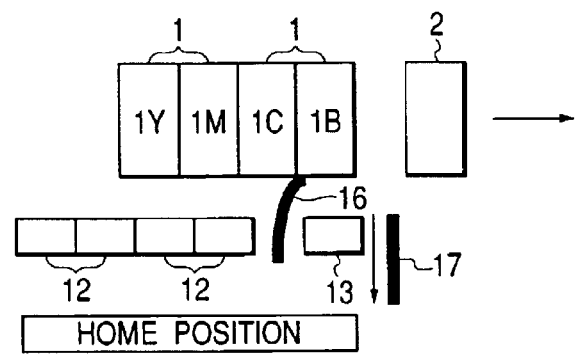
Figure 5D:
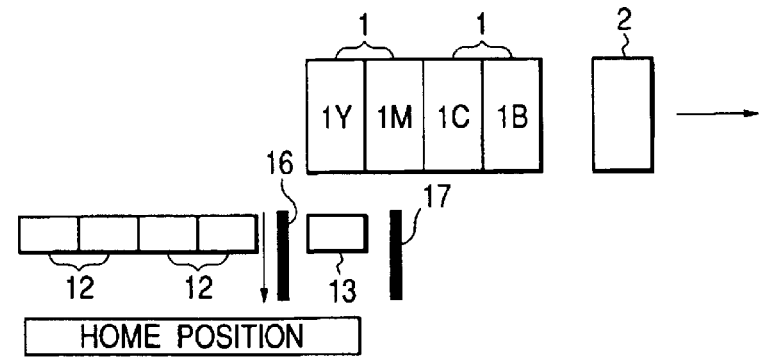

In FIG. 5A, the blade for ink 16 and the blade for a liquid composition 17 are simultaneously caused to rise and the carriage 3 is caused to move in the right direction (to the printing area side), whereby the print heads 1 and the liquid composition ejecting head 2 are simultaneously wiped as shown in FIG. 5B. Simultaneously with wiping of the liquid composition ejecting head 2 being finished, only the blade for a liquid composition 17 is caused to come down and stand by. The blade for ink 16 performs wiping of the remaining print heads 1 in that state as shown in FIG. 5C. Finally, as shown in FIG. 5D, when wiping of all the print heads 1 is finished, the blade for ink 16 is caused to come down to finish a series of wiping operations. By employing the wiping direction as described in FIGS. 5A to 5D, droplets that have been removed by the wiping and deposited on the blades 16 and 17 are scattered to a conveying portion of the recording medium 10 by elasticity of the blades. As a result, danger of unintentionally contaminating the recording medium 10 can be eliminated.

Figure 6A:
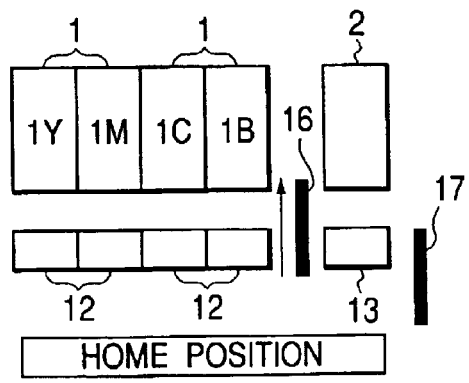
FIGS. 6A, 6B, 6C and 6D are schematic views showing the wiping action of the ink-jet printing apparatus shown in FIG. 1, FIG. 6A showing the elevation of the blade for ink, FIG. 6B showing the movement of each head from the home position to the print region side and the wiping of the print head, FIG. 6C showing the movement of each head from the print region side to the home position, the waiting of the blade for ink and the elevation of the blade for the liquid composition, and FIG. 6D showing the movement of each head to the home position side and the wiping of the liquid composition-ejecting head.
Figure 6B:
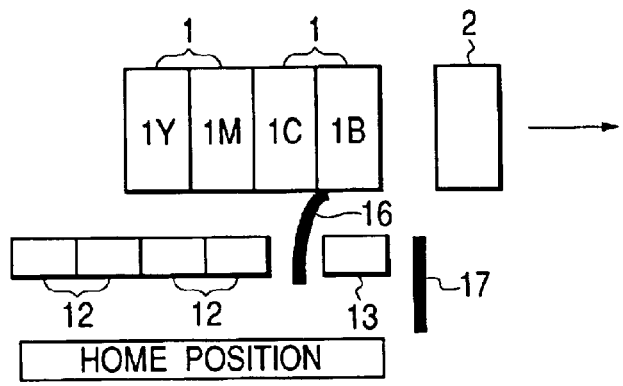
Figure 6C:
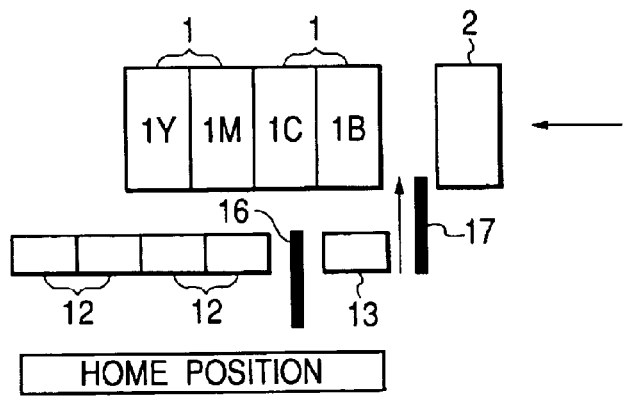
Figure 6D:
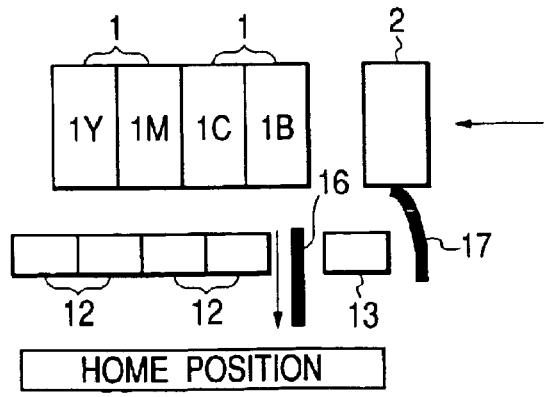

Moreover, as shown in FIGS. 6A to 6D, a wiping direction of the print heads 1 and a wiping direction of the liquid composition ejecting head 2 may be set differently. In FIGS. 6A to 6D, for example, as shown in FIGS. 6A and 6B, the print heads 1 may be wiped by the blade for ink 16 when the carriage 3 moves from the home position side to the right side (printing area side) and only the liquid composition ejecting head 2 may be wiped by the blade for a liquid composition 17 when the carriage 3 moves from the printing area side to the home position side. By employing such wiping directions, inconvenience (danger) of ink scattered by elasticity of the blade 16 depositing on the liquid composition ejecting head 2 or, to the contrary, a liquid composition scattered by elasticity of the blade 17 depositing on the print heads 1 can be eliminated or significantly reduced.

In addition, in FIG. 1, the caps 12 for the print heads 1 and the cap 13 for the liquid composition ejecting head 2 are separately provided to be independent from each other (be used exclusively). Moreover, the suction pumps 14 and 15 connected to the caps 12 and 13 are independently provided for the print heads 1 and the liquid composition ejecting head 2 to be separately used (exclusively used). Consequently, waste liquid of ink and a liquid composition can be disposed without causing the ink and the liquid composition having reactivity with the ink in the caps 12 and 13 and the pumps 14 and 15. As a result, high reliability can be maintained.

Figure 7:
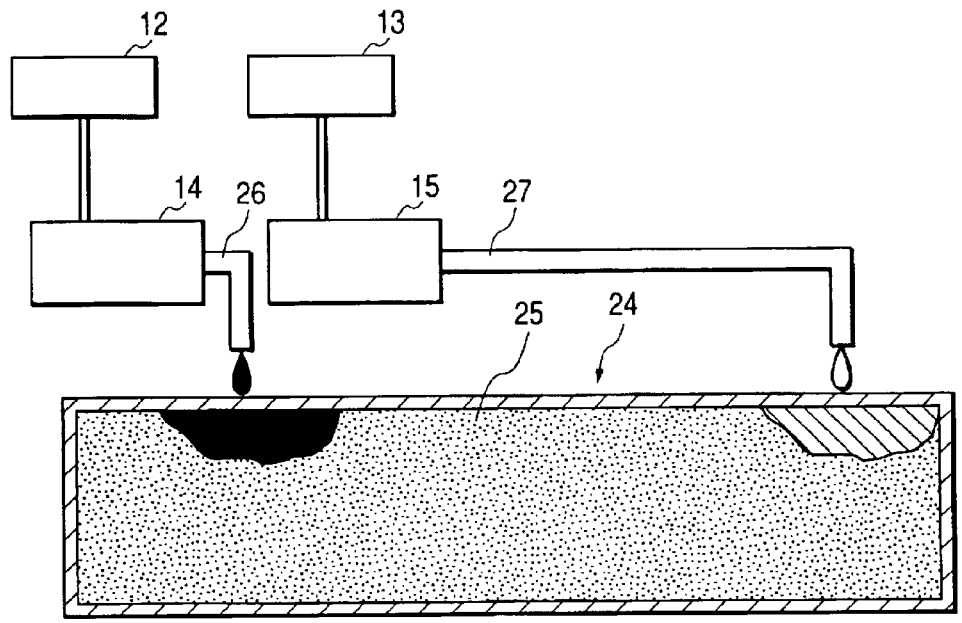
FIG. 7 is a schematic view showing a waste liquid recovering system of the ink-jet printing apparatus shown in FIG. 1.

FIG. 7 is a schematic view showing a collection system for collecting ink and a liquid composition ejected from the pumps 14 and 15 into a waste ink tank. In FIG. 7, waste ink suctioned from the print heads 1 by the suction pump 14 communicating with the cap 12 and waste liquid suctioned from the liquid composition ejecting head 2 by the suction pump 15 communicating with the cap 13 are collected and stored in a waste liquid tank 24 through courses independent from each other such that they leak to the outside of the printer.

The waste liquid tank 24 is filled with a porous absorbent 25 in its inside and is configured to absorb and hold waste liquid in the absorbent 25. The waste liquid tank 24 is provided in a printer main body. In FIG. 7, a waste ink conduit 26 from the suction pump 14 for the print head 1 and a waste liquid conduit 27 from the suction pump 15 for the liquid composition ejecting head 2 are connected to positions distant from each other at both ends of the waste liquid tank 24. In this way, since a liquid composition and ink in the waste liquid tank 24 come into contact with each other for the first time in a state in which the liquid is sufficiently absorbed in the absorbent 25, it is possible to sufficiently secure an amount of liquid that the porous absorbent 25 can absorb and hold.

Figure 8:
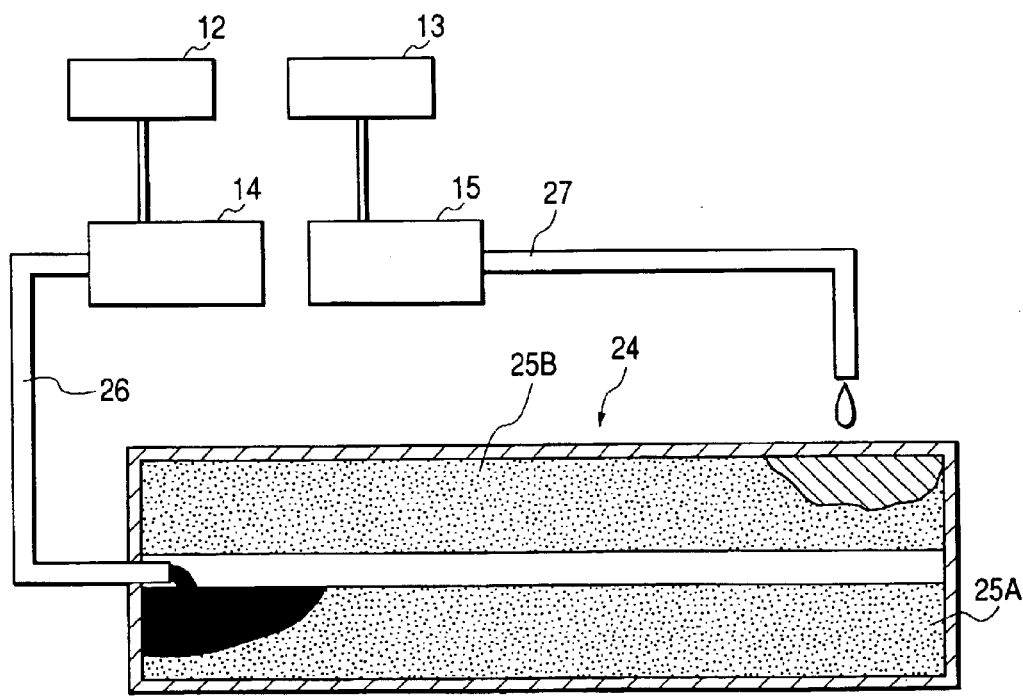
FIG. 8 is a schematic view showing a partially modified example of the waste liquid recovering system shown in FIG. 7.
Figure 9:
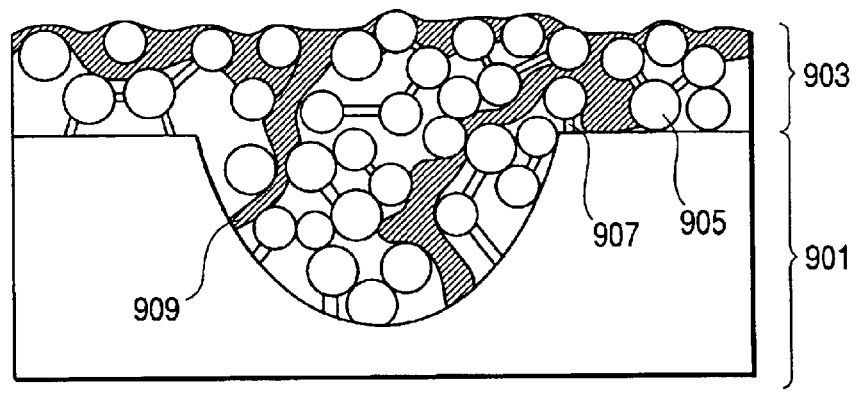
FIG. 9 is a schematic cross-sectional view illustrating the state of the colored portion when ink-jet recording is performed on a coated paper.

FIG. 8 is a schematic view showing a waste liquid collection system that is configured to dispose the absorbent 25 in the waste liquid tank 24 in upper and lower two stages, cause an absorbent 25A in the lower stage to absorb ink and cause an absorbent 25B in the upper stage to absorb a liquid composition. According to the configuration of FIG. 8, even if the ink absorbent 25A in the lower stage overflows, since dyes in ink react to be fixed in the absorbent 25B in the upper stage by the absorbent 25B in the upper stage and a liquid composition absorbed therein, the ink never leaks and contaminates the inside and the outside of the printer.

In addition, an ink-jet recording apparatus of another form is characterized by comprising an ink storing portion that stores anion or cation aqueous ink containing colorants, a liquid composition storing portion that stores the liquid composition of the present invention, preferably a liquid composition containing particulates, whose surface is charged in a polarity opposite to that of the aqueous ink, in a scattered state, and an ink-jet head for independently ejecting the aqueous ink stored in the ink storing portion and the liquid composition stored in the liquid composition storing portion. These will be hereinafter described.

Figure 10:
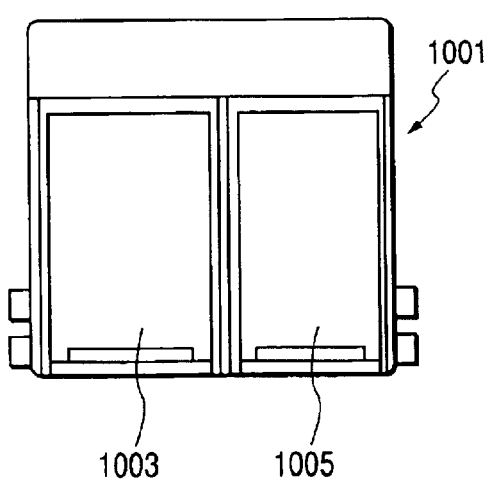
FIG. 10 is a view showing an outline of one embodiment of an ink cartridge of the present invention.
Figure 11:
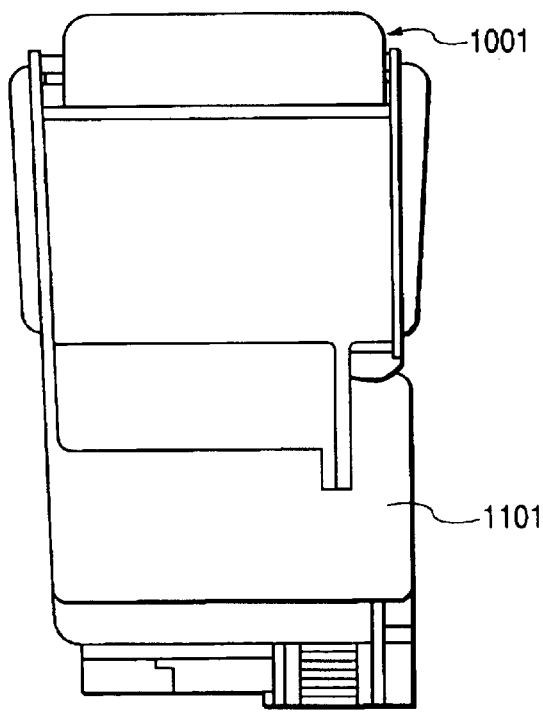
FIG. 11 is a view showing an outline of a recording head to which the ink cartridge shown in FIG. 10 is attached.

FIG. 10 shows an example of such a cartridge 1001. Reference numeral 1003 in the figure denotes an ink storing portion in which ink is stored and 1005 denotes a liquid composition storing portion in which a liquid composition is stored. The cartridge is made detachably attachable to a recording head 1101 for ejecting each of ink and a liquid composition and, at the same time, is configured such that a liquid composition and ink are supplied to the recording head 1101 in a state in which the cartridge 1001 is mounted on the recording head 1101.

Figure 15:
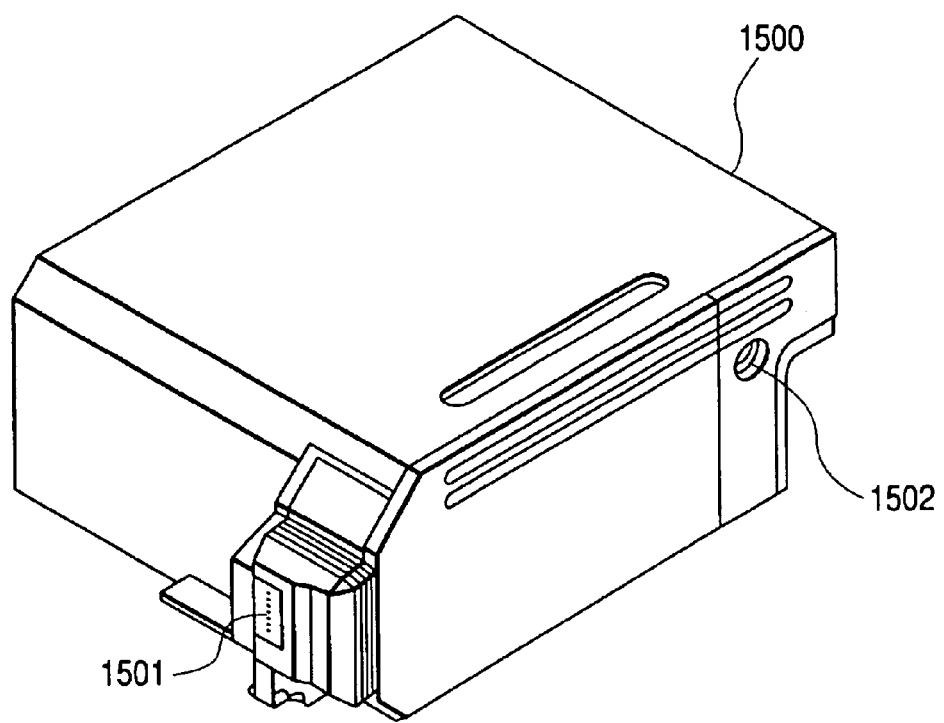
FIG. 15 is a perspective view showing a recording unit.

As the ink-jet recording apparatus used in the present invention, not only the above-mentioned one having the head and the ink cartridge as separate bodies but also one having an integrated head and ink cartridge as shown in FIG. 15 is preferably used.

In FIG. 15, reference numeral 1500 denotes a recording unit that houses an ink storing portion storing ink, for example, an ink absorbent and is configured to eject ink in the ink absorbent from a head portion 1501 having a plurality of orifices as ink droplets. As a material of the ink absorbent, for example, polypropylene and polyurethane can be used. Reference numeral 1502 denotes an air communicating port for communicating the inside of the recording unit with the air.

Figure 12:
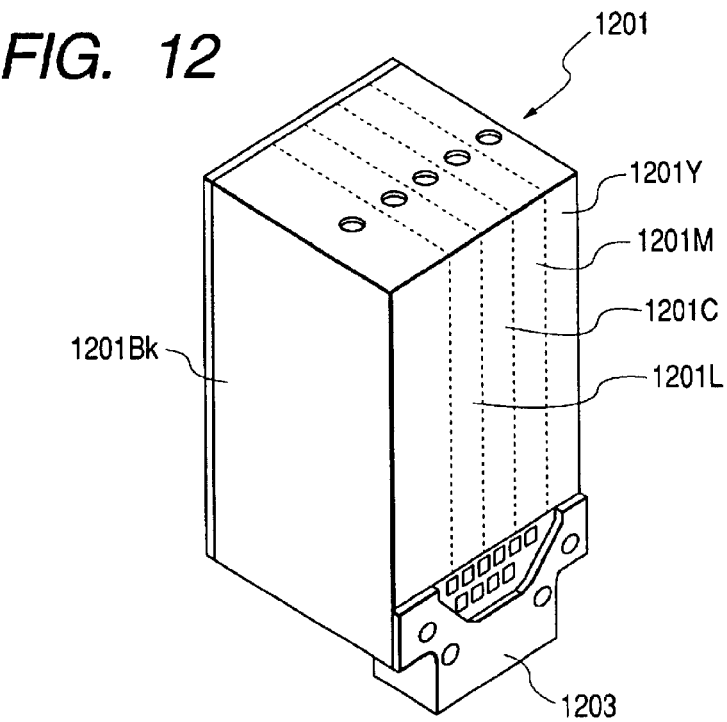
FIG. 12 is a view showing an outline of one embodiment of a recording unit of the present invention.

As another form of a recording unit used in the present invention, there is a recording unit that stores ink and a liquid composition in respective storing portions in one ink tank and is integrally provided with a recording head for ejecting each of the ink and the liquid composition. More specifically, as shown in FIG. 12, there is a recording unit 1201 provided with a recording head 1203 that stores a liquid composition in a storing portion 1201L, black ink in a storing portion 1201Bk, and color inks of yellow, cyan and magenta in color ink storing portions 1201Y, 1201M and 1201C, respectively, and divides ink channels such that ink of each color can be separately ejected.

Figure 16:
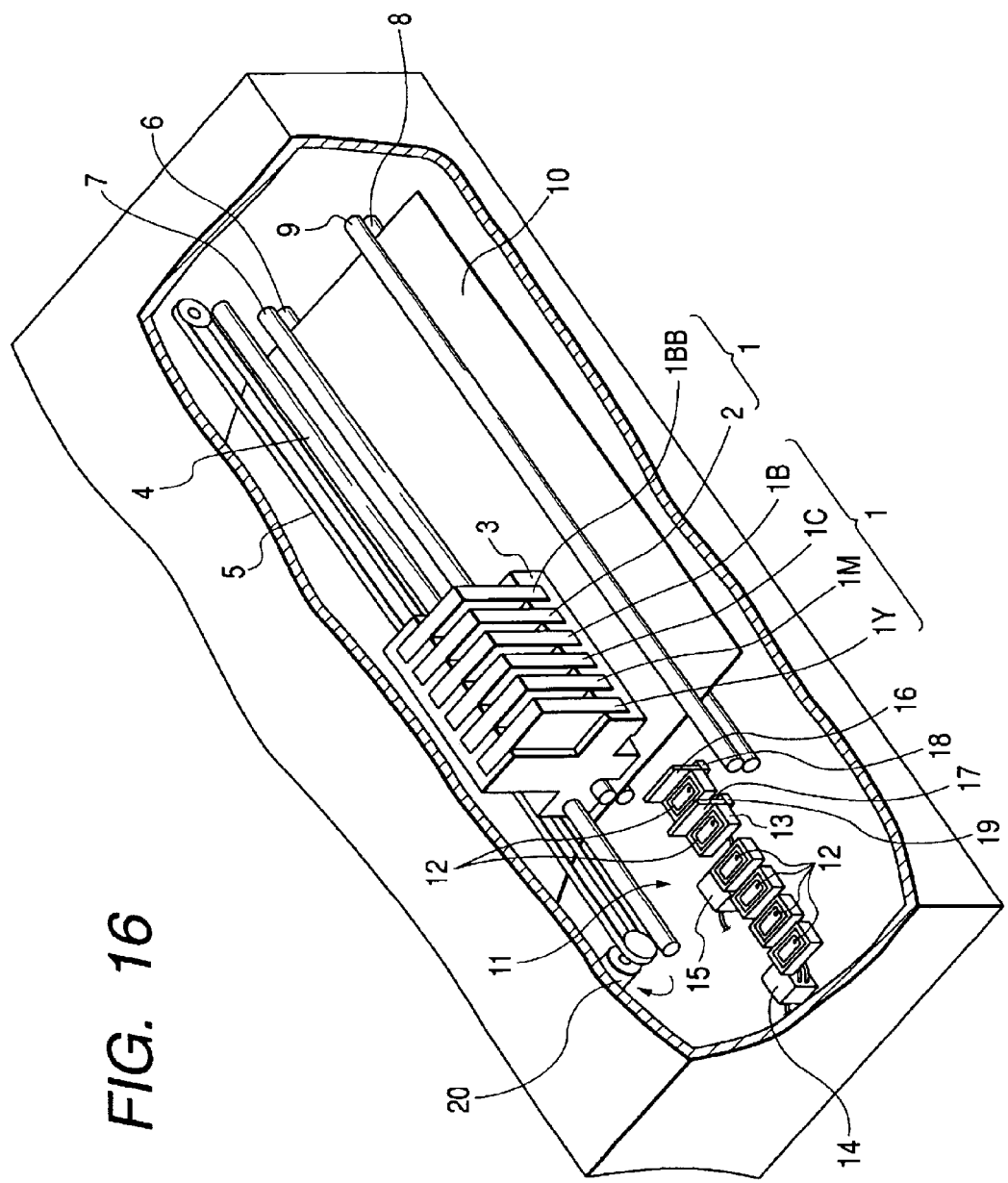
FIG. 16 is a partially broken perspective view schematically showing one embodiment of the ink-jet printing apparatus of the present invention.

FIG. 16 is a schematic perspective view showing a general configuration of another embodiment of the ink-jet printer in accordance with the present invention. In FIG. 16, reference numeral 4 denotes a scanning rail that extends in a main scanning direction of the carriage 3 and slidably supports the carriage and reference numeral 5 denotes a driving belt for transmitting a driving force for reciprocating the carriage 3. In addition, reference numerals 6 and 7 as well as 8 and 9 are conveying roller pairs that are arranged in front and back of a print position by the print head and nips and conveys a printing material 10, respectively. The printing material 10 such as paper is guided to and supported by a platen (not shown), which regulates a print surface to be flat, in a pressed contact state in the part of the print position. At this point, ejection port forming surfaces of the head cartridges (heads) 1 and 2 mounted on the carriage 3 protrude downward from the carriage 3 and are placed between the rollers for conveying a recording medium 7 and 9 to oppose each other in parallel with the recording medium 10 that is in pressed contact with the guiding surface of the platen (not shown).

In FIG. 16, a total of six head cartridges are positioned and mounted on the carriage 3. In this embodiment, a print head of yellow 1Y, a print head of magenta 1M, a print head of cyan 1C, a print head of black 1B, a liquid composition ejecting head 2 and a second print head of black 1BB are arranged in this order from an illustrated left end to right side on the carriage 3. The liquid composition ejecting head 2 ejects a liquid composition having reactivity with a colorant in ink to the recording medium 10. In addition, the second print head of black 1BB at the right end is a print head that uses black ink to be used at the time of sub-scanning printing or the like in a reciprocating printing. That is, the liquid composition ejecting head 2 is disposed next to (on the right of) the black print head 1B in the above-mentioned each embodiment and the print head of black 1BB is disposed next to (on the right of) it.

In FIG. 16, a recovery unit 11 is disposed on the left side of the printing area. In the recovery unit 11, caps 12 for capping the print heads 1Y, 1M, 1C and 1B are sequentially arranged corresponding to the arrangement four print heads (head cartridges) 1Y, 1M, 1C and 1B and one cap 13 corresponding to the arrangement of the head cartridges 1 and 2, a cap 13 for capping the liquid composition ejecting head 2 is arranged next to (on the right of) it, and a cap for capping the second black print head 1BB is further arranged next to (on the right of) it. Each cap is provided such that it can move up and down in the vertical direction. When the carriage 3 is in the home position, the caps 12 and 13 corresponding to the ejection port forming surfaces of the heads 1 and 2 are brought in pressed contact with them, respectively, whereby ejection ports of the heads 1 and 2 are sealed (capped). As a result, thickening and fixing of ink due to evaporation of an ink solvent inside the ejection port are prevented and occurrence of an ejection failure is prevented.

In addition, the recovery unit 11 is provided with a suction pump 14 communicating with the caps 1 and 2 and a suction pump 15 communicating with the cap 13. These pumps 14 and 15 are used for capping the ejection port forming surfaces of the print head 1 and the liquid composition ejecting heads 2 by the caps 12 and 13 and executing suction recovery processing if an ejection failure occurs in the heads 1 and 2. Moreover, a blade 17 for the liquid composition ejecting head 2 is arranged between the cap 13 for a liquid composition in the fifth position from the left end and the cap 12 for black ink in the sixth position (right end). A blade 16 for each print head 1 is arranged on the right side (printing area side) of the cap 12 at the right end. Then, the blade 17 is held by a blade holder 19 and the blade 16 is held by a blade holder 18. In this form, the blade holders 18 and 19 are moved up and down by a blade lifting mechanism (not shown) that is driven utilizing movement of the carriage 3, respectively, whereby the blades 16 and 17 move up and down between a position to which they protrude (rise) in order to wipe out ink and foreign bodies deposited on the ejection port forming surfaces of the heads 1 and 2 (wiping position) and a position to which they retard (standby position). In this case, the blade 16 for wiping the print head 1 and the blade 17 for wiping the liquid composition ejecting heads 2 are configured such that they are independent of each other and can move up and down individually.

FIGS. 17A to 17F are schematic views showing a wiping operation of the ink-jet printer. As shown in FIG. 17A, after the blade for print heads 16 protrudes (rises), each head mounted on the carriage 3 moves from the right side (printing area side) to the home position side. As shown in FIG. 17B, the blade for print heads 16 that has risen sequentially wipes the print heads 1 following the leftward movement of the carriage 3. Then, as shown in FIG. 17C, at the point when the liquid composition ejecting head 2 reaches the front (right) of the blade for print heads 16, the blade 16 retracts (comes down) to the standby position and contact of the blade 16 and the liquid composition ejecting head 2 is prevented.

Moreover, at the point when the carriage 3 moves leftward and the liquid composition ejecting head 2 passes over the blade 6 for print heads 16, as shown in FIG. 17D, both the blades 6 for print heads 16 and the blade for a liquid composition ejecting head 17 are caused to protrude (rise). Then, following the leftward movement of the carriage 3, as shown in FIG. 17E, wiping of the liquid composition ejecting head 2 by the blade 17 and wiping of the print head 1BB by the blade 16 are simultaneously performed. After the wiping of all the heads 1 and 2 is finished, as shown in FIG. 17F, both the blades 16 and 17 are caused to retract (come down) and stand by in the standby position.

Although the wiping by the blades 16 and 17 is executed when the carriage 3 moves from the printing area side (right side) to the home position side where the recovery unit 11 is located in the embodiment shown in FIGS. 16 and 17A to 17F, a wiping direction is not limited to this and the wiping may be performed when the carriage 3 moves from the home position side to the right side (printing area side).

The ink-jet printer of FIG. 16 is configured such that it can eject the liquid composition in accordance with the present invention having reactivity with a colorant in ink from the liquid composition ejecting head 2 to the recording medium 10 and cause the liquid composition to contact with ink ejected from each print head 1 to form a recorded product. The colorant in the ink reacts with the liquid composition on the recording medium 10, whereby the colorant in the ink adheres to surfaces of particulates in a monomolecular state and an image is formed by the particulates. As a result, an image excellent in coloring property and uniformity of colors can be obtained.

Although, in the recording apparatus used in the present invention, the ink-jet recording apparatus for causing thermal energy to act on ink or a liquid composition to eject ink droplets is described as an example above, an ink-jet recording apparatus of a piezoelectric system using piezoelectric elements can be utilized in the same manner.

Incidentally, the ink-jet recording apparatus in accordance with the present invention is not limited to the ink-jet recording apparatus having the above-mentioned configuration, and may be an ink-jet recording apparatus that has a configuration as disclosed in, for example, JP 10-146991 A and in which an operating direction of a wiping blade of a head is different from that in the above-mentioned ink-jet recording apparatus.

EXAMPLES

The present invention will hereinafter be described more specifically by the following Examples and Comparative Examples. Incidentally, all designations of "part" or "parts" and "%" as will be used in the following examples mean part or parts and % based on mass unless expressly noted.

First, preparation of the liquid composition of the present invention will be explained.

After each component shown hereinafter is mixed and dissolved, the mixture was filtered under pressure through a membrane filter (trade name: Fluoropore Filter, manufactured by Sumitomo Electric Co., Ltd.) having a pore size of 1 μm to obtain liquid compositions A to D of the present invention.

Synthesis Example of Alumina Hydrate

Aluminum dodexide was prepared by the method described in U.S. Pat. No. 4,242,271. Then, the aluminum dodexide was hydrolyzed by the method described in U.S. Pat. No. 4,202,870 to produce alumina slurry. To the obtained alumina slurry was added water until the solids content of alumina hydrate reached 8.2%. The alumina slurry had a pH of 9.7. 3.9% nitric acid solution was added to adjust the pH and aged under the conditions shown in Table 1 to obtain colloidal sols. The colloidal sols were spray-dried at 83° C. to prepare alumina hydrates A to D. The alumina hydrates A to D were each positively charged on the surfaces in water and presented cationicity. The alumina hydrates A to D were dispersed in deionized water and dropped on a collodion membrane to prepare samples for measurement, observation of which under a transmission electron microscope revealed that all the samples were fine particles having a plate-like shape.

TABLE 1

| Aging conditions for obtaining colloidal sol | | | | |
|---|---|---|---|---|
| | Alumina hydrate | | | |
| | A | B | C | D |
| pH before aging | 5.0 | 5.5 | 5.9 | 5.9 |
| Aging temperature (° C.) | 150 | 100 | 120 | 100 |
| Aging time (hour) | 20 | 8 | 12 | 6 |
| Aging apparatus | Autoclave | | Oven | |

<Composition of Liquid Composition A>

| | |
|---|---|
| Glycerin | 7.5 parts |
| Diethylene glycol | 7.5 parts |
| Alumina hydrate A | 10.0 parts |
| Nitric acid | 0.3 parts |
| Water | 74.7 parts |

The above components were mixed in an emulsifier TK Robomix (manufactured by Tokushu Kika Kogyo Co., Ltd.) at 3,000 rpm for 30 minutes and then subjected to dispersion treatment for 10 minutes by using an ultrasonic homogenizer US-600T (manufactured by Nippon Seiki Co., Ltd.). The obtained dispersion was further subjected to centrifugation treatment (4,000 rpm for 15 minutes) to remove coarse particles, thereby obtaining liquid composition A.

<Composition of Liquid Composition B>

| | |
|---|---|
| 1,5-Pentanediol | 10.0 parts |
| Ethylene glycol | 7.5 parts |
| Alumina hydrate B | 10.0 parts |
| Nitric acid | 0.6 parts |
| Water | 71.9 parts |

The above components were mixed in an emulsifier disperser TK Robomix (manufactured by Tokushu Kika Kogyo Co., Ltd.) at 3,000 rpm for 30 minutes and then subjected to dispersion treatment for 30 minutes by using an ultrasonic homogenizer US-600T (manufactured by Nippon Seiki Co., Ltd.). The obtained dispersion was further subjected to centrifugation treatment (4,000 rpm for 15 minutes) to remove coarse particles, thereby obtaining liquid composition B.

<Composition of Liquid Composition C>

| | |
|---|---|
| Glycerin | 7.5 parts |
| Propylene glycol | 7.5 parts |
| Alumina hydrate C | 10.0 parts |
| Nitric acid | 0.5 parts |
| Water | 74.5 parts |

The above components were mixed in an emulsifier disperser TK Robomix (manufactured by Tokushu Kika Kogyo Co., Ltd.) at 3,000 rpm for 30 minutes and then subjected to dispersion treatment for 20 minutes by using an ultrasonic homogenizer US-600T (manufactured by Nippon Seiki Co., Ltd.). The obtained dispersion was further subjected to centrifugation treatment (4,000 rpm for 15 minutes) to remove coarse particles, thereby obtaining liquid composition C.

<Composition of Liquid Composition D>

| | |
|---|---|
| 2-Pyrrolidone | 7.5 parts |
| Ethylene urea | 7.5 parts |
| Alumina hydrate D | 10.0 parts |
| Nitric acid | 0.5 parts |
| Water | 74.5 parts |

The above components were mixed in an emulsifier disperser TK Robomix (manufactured by Tokushu Kika Kogyo Co., Ltd.) at 3,000 rpm for 30 minutes and then subjected to dispersion treatment for 15 minutes by using an ultrasonic homogenizer US-600T (manufactured by Nippon Seiki Co., Ltd.). The obtained dispersion was further subjected to centrifugation treatment (4,000 rpm for 15 minutes) to remove coarse particles, thereby obtaining liquid composition D.

Table 2 shows results of measurements of physical properties of the obtained liquid compositions A to D by the methods described below and results of evaluation of these compositions by the methods and evaluation standards described below.

(1) Average Particle Diameter and Particle Size Distribution of Fine Particles

After diluting with deionized water so that the fine particles had a solids content of 0.1%, the diluted liquid composition was dispersed by using an ultrasonic cleaner for 5 minutes and then measured of scattering intensity by using an electrophoresis scattering light meter (ELS-8000, manufactured by Otsuka Denshi Co., Ltd., liquid temperature: 25° C., using silica cell). The average particle diameter was obtained from the scattering intensity by the Cumulant analysis method by using the attached software. The particle size distribution was also obtained from the scattering intensity by obtaining frequency distribution of scattering intensity according to the Marquadt analysis method that uses a histogram method and 10% and 90% cumulant values were obtained by accumulating values of particle diameters of starting from the smallest particle size.

(2) pH

Each liquid composition measured of pH by using a pH meter (Castany pH meter D-14, manufactured by Horiba Seisakusho Co., Ltd.) at a liquid temperature of 25° C.

(3) Zeta Potential

After dispersing the liquid composition with deionized water so that it had a solids content of fine particles of 0.1%, it was measured of zeta potential by using a zeta potential meter (BI-ZETAplus, manufactured by Brookheaven Co., Ltd., liquid temperature: 20° C., using an acrylic resin-made cell).

(4) Tank Storage

After the liquid composition was packed in an ink tank for an ink-jet printer (BJF8500 (trade name) manufactured by Canon Inc.), the tank was stored standing in an incubator at 5° C. or 60° C. for 1 month. The change in liquid physical properties of the liquid composition in the tank and its ejecting property from a recording head when the ink tank was fitted to the ink-jet printer, were evaluated by the following standards.

A: No thixotropy occurred in the tank and the liquid composition had fluidity and good ejection stability.

B: Thixotropy occurred in the tank and ejecting property was unstable.

(5) Sedimentation Rate

After the liquid composition was packed in an ink tank for an ink-jet printer (BJF8500 (trade name) manufactured by Canon Inc.), the tank was stored standing in an incubator at 60° C. for 1 month. Then portions each corresponding to 5% of the tank capacity were extracted from the upper and lower parts of the ink. The concentration of the fine particles in these portions were determined by quantitative analysis of aluminum and the sedimentation rate was obtained according to the following equation.

Sedimentation rate (%)=100×[(concentration of upper tank)/(concentration of lower tank)]

(6) Wiping Durability

Using the apparatus as shown in FIG. 1, an ink tank having packed therein each liquid composition was attached to the recording head 2 to perform the wiping durability test. Specifically, as an ink-jet printer, modified version of BJF-8500 (trade name) manufactured by Canon Inc. was prepared, and each of the liquid compositions A–D were filled to tanks for the ink-jet printer respectively, and then each of the tanks was fitted to the ink-jet printer, and a wiping durability test for the recording head was conducted in turn. The evaluation was made according to the following standards.

- A: After 20,000 times or more of wiping action, no slippage or blurring of printing occurred and ejection stability was excellent;
- B: After 15,000 times or more of wiping action, no slippage or blurring of printing occurred and ejection stability was excellent;
- C: After 10,000 times or more of wiping action, no slippage or blurring of printing occurred and ejection stability was good; and
- D: After less than 10,000 times of wiping action, slippage or blurring of printing occurred and ejection was unstable.

(7) Clogging

The recording head as shown in FIG. 3 to which the ink tank filled with the liquid composition was attached, was detached from the recording apparatus as shown in FIG. 1 and left to stand for 2 weeks in an incubator at 35° C./Dry. Specifically, the liquid composition A was filled to a tank for an ink-jet printer (BJF8500 (trade name) manufactured by Canon Inc.), and the tank was fitted to the ink-jet printer by attaching it to the recording head of the ink-jet printer. After confirming that all the nozzles of the recording head worked, the recording head with the tank was detached from the ink-jet printer, and left to stand for two weeks at 35° C. and dry condition. Then, the recording head was attached again to the recording apparatus and suction recovery was performed. Clogging was evaluated by the number of suction recovery operations performed until the clogging of the recording head was solved. As to the liquid compositions B–D, the same evaluation test for clogging was conducted respectively.

- A: The clogging of the recording head was solved within two times of suction recovery.
- B: The clogging of the recording head was solved within 3–4 times of suction recovery
- C: The clogging of the recording head was not solved after 5 times or more of suction recovery

(8) Pore Radius and Pore Volume of Fine Particle Aggregate

Each liquid composition was treated by the following procedures and then the obtained powder sample was charged in a cell, which was deaerated under vacuum at 120° C. for 8 hours, followed by measurement by a nitrogen adsorption/desorption method by use of Omnisorp 1 manufactured by Quantachrome Co.

- (i) Liquid compositions A to D were dried in an atmospheric environment at 120° C. for 10 hours to evaporate almost all the solvent content to effect drying.
- (ii) The temperature of the dried product was elevated from 120° C. to 700° C. in 1 hour and calcined at 700° C. for 3 hours.
- (iii) After the calcination, the temperature of the calcined product was slowly returned to the ambient temperature and the calcined product was powdered by using an agate mortar.

TABLE 2

Physical properties of liquid compositions A to D and results of evaluation

| | | Kind of liquid composition | | | |
|---|---|---|---|---|---|
| | | A | B | C | D |
| Particle diameter and particle size distribution | Average particle diameter (nm) | 185 | 120 | 60 | 35 |
| | 10% Cumulative value (nm) | 120 | 75 | 23 | 12 |
| | 90% Cumulative value (nm) | 275 | 240 | 170 | 95 |
| pH | | 3.7 | 3.9 | 4.0 | 3.8 |
| Zeta Potential (mV) | | 41 | 40 | 39 | 42 |
| Pore volume (ml/g) | Pore radius in a rage of 3 to 30 nm | 0.89 | 0.76 | 0.59 | 0.34 |
| | Pore radius in a rage of 3 to 20 nm | 0.76 | 0.73 | 0.58 | 0.34 |
| | Pore radius in a range exceeding 30 nm | 0.01 | 0.003 | 0.003 | 0.001 |
| | Pore radius in a range exceeding 20 nm | 0.14 | 0.032 | 0.012 | 0.003 |
| Results of evaluation | Tank storage stability | A | A | A | A |
| | Sedimentation rate (%) | 59 | 62 | 73 | 79 |
| | Wiping durability | B | A | A | A |
| | Clogging | B | A | A | B |

Next, preparation of ink subsets 1 and 2 used in Examples and Comparative Examples of the present invention will be described.

Preparation of Ink Subset 1

The following respective components were well agitated and mixed into solutions, and the resultant solutions were then filtered under pressure through a membrane filter (Fluoropore Filter, trade name; product of Sumitomo Electric Industries, Ltd.) having a pore size of 0.45 μm, thereby obtaining dye inks Bk1, Y1, M1 and C1 having colors of black, yellow, magenta and cyan, respectively. A combination of these dye inks was named ink subset 1.

[Black Ink Bk1]

| | |
|---|---|
| C.I. Direct Black 195 | 2.5 parts |
| 2-Pyrrolidone | 10 parts |
| Glycerol | 5 parts |
| Isopropyl alcohol | 4 parts |
| Sodium hydroxide | 0.4 parts |
| Water | 78.1 parts. |

[Yellow Ink Y1]

| | |
|---|---|
| Project Fast Yellow 2 (Zeneca, Inc.) | 2.0 parts |
| C.I. Direct Yellow 86 | 1.0 part |
| Thiodiglycol | 8 parts |
| Ethylene glycol | 8 parts |
| Acetylenol EH (Kawaken Fine Chemicals Co., Ltd.) | 0.2 parts |
| Isopropyl alcohol | 4 parts |
| Water | 76.8 parts. |

[Magenta Ink M1]

| | |
|---|---|
| Project Fast Magenta 2 (Zeneca, Inc.) | 3 parts |
| Glycerol | 7 parts |
| Urea | 7 parts |
| Acetylenol EH (Kawaken Fine Chemicals Co., Ltd.) | 0.2 parts |

-continued

| | |
|---|---|
| Isopropyl alcohol | 4 parts |
| Water | 78.8 parts. |
| [Cyan Ink C1] | |
| C.I. Direct Blue 199 | 3 parts |
| Ethylene glycol | 7 parts |
| Diethylene glycol | 10 parts |
| Acetylenol EH (Kawaken Fine Chemicals Co., Ltd.) | 0.3 parts |
| Water | 79.7 parts. |

Preparation of Ink Subset 2

From the respective components shown below pigment dispersions were prepared and using them Black ink Bk2 was prepared. Further, yellow, magenta and cyan pigment inks Y2, M2, and C2 were obtained by using respective pigment dispersions obtained in the same manner as above except that the colorant was replaced. A combination of the pigment inks Bk2, Y2, M2 and C2 was named ink subset 2.

| | |
|---|---|
| [Black Ink Bk2] | |
| (Preparation of Pigment Dispersion) | |
| Styrene/acrylic acid/ethyl acrylate copolymer (acid number: 140, weight average molecular weight: 5,000) | 1.5 parts |
| Monoethanolamine | 1.0 part |
| Diethylene glycol | 5.0 part |
| Deionized water | 81.5 parts |

The above components were mixed and the temperature was elevated to 70° C. on a water bath to completely dissolve the resin portion. To this solution were added 10 parts of the newly prepared carbon black (MCF88, produced by Mitsubishi Chemical Co., Ltd.) and 1 part of isopropanol and the mixture was pre-mixed for 30 minutes. Dispersion treatment was performed under the following conditions.
Disperser: Sand grinder (manufactured by Igarashi Kikai Co., Ltd.)
  Pulverizing media: Zirconium beads, 1 mm in diameter
  Filling rate of pulverizing media: 50% (volume ratio)
  Pulverizing time: 3 hours
Further, centrifugation treatment (12,000 rpm, 20 minutes) was performed and coarser particles were removed to obtain a pigment dispersion.
Preparation of Black Ink Bk2

To the pigment dispersions described above were mixed components in composition ratios described below to prepare an ink containing a pigment. This was named Black Ink Bk2.

| | |
|---|---|
| pigment dispersion described above | 30.0 parts |
| Glycerol | 10.0 parts |
| Ethylene glycol | 5.0 parts |
| N-methylpyrrolidone | 5.0 parts |
| Ethyl alcohol | 2.0 parts |
| Deionized water | 48.0 parts |

Yellow Ink Y2

Yellow Ink Y2 containing pigments was prepared in the same manner as Black Ink Bk2 except that 10 parts of the carbon black used in preparing Black Ink Bk2 (MCF88, manufactured by Mitsubishi Chemical Co., Ltd.) was replaced by Pigment Yellow 74.
Magenta Ink M2

Magenta Ink M2 containing pigments was prepared in the same manner as Black Ink Bk2 except that 10 parts of the carbon black used in preparing Black Ink Bk2 (MCF88, manufactured by Mitsubishi Chemical Co., Ltd.) was replaced by Pigment Red 7.
Cyan Ink C2

Cyan Ink C2 containing pigments was prepared in the same manner as Black Ink Bk2 except that 10 parts of the carbon black used in preparing Black Ink Bk2 (MCF88, manufactured by Mitsubishi Chemical Co., Ltd.) was replaced by Pigment Blue 15.

Examples 1 to 8

The liquid compositions A to D of the present invention obtained as described above, ink subset 1 (Bk1, Y1, M1 and C1), and Ink subset 2 (Bk2, Y2, M2 and C2) were combined as shown in Table 3 below and printing was performed using these combinations (Examples 1 to 8).

TABLE 3

Ink sets used in Examples 1 to 8

| | Ink subset | Liquid composition |
|---|---|---|
| Example 1 | 1 | A |
| Example 2 | 1 | B |
| Example 3 | 1 | C |
| Example 4 | 1 | D |
| Example 5 | 2 | A |
| Example 6 | 2 | B |
| Example 7 | 2 | C |
| Example 8 | 2 | D |

The liquid compositions A to D and ink subsets 1 and 2 combined as described above were used. In the methods of forming a colored portion according to Examples 1 to 8, recording was performed on paper for PPC (manufactured by CANON INC.). On this occasion, as the ink-jet recording apparatus, a recording apparatus similar to that shown in FIG. 1 equipped with five recording heads as shown in FIG. 3 was used to form color images. Specifically, as the ink-jet printer, modified version of BJF8500 (trade name, manufactured by Canon Inc.) was prepared, the liquid composition and the inks of the respective Ink subset were filled to corresponding tanks for the ink-jet printer, and the tanks were fitted to the ink-jet printer. Then ink-jet color recording was performed with the ink-jet printer. On this occasion, the liquid composition was first adhered on a recording paper and then the ink was adhered thereon.

More specifically, 3-pass fine printing in which a printing region is scanned three times was performed. The liquid composition was printed on the positions of pixels where any one of inks selected from yellow, magenta, cyan and black was printed for each pass. That is, theoretical sum of printing data of yellow, magenta, cyan and black inks for each pass was used as printing data. Note that the kind of a fine mask at the time of fine printing is not particularly limited and known techniques may be utilized. Therefore, no detailed explanation is made herein.

The recording heads used here had a recording density of 600 dpi and were driven under conditions of driving frequency of 9.6 kHz. As for the ejecting amount per 1 dot when a 600-dpi head was used, heads having an ejecting amount of 15 ng/dot were used for yellow, magenta, cyan inks, and the liquid composition and a head having an ejecting amount of 30 ng/dot was used for black ink. Note that these recording conditions are the same for Examples and Comparative Examples throughout.

Comparative Examples 1 and 2

Using only ink subsets 1 and 2, printing was performed as shown in Table 4.

TABLE 4

Ink Sets used in Comparative Examples 1 and 2

|  | Ink subset | Liquid composition |
|---|---|---|
| Comparative Example 1 | 1 | None |
| Comparative Example 2 | 2 | None |

In recording using only ink subsets 1 and 2 (Comparative Examples 1 and 2), the recording head having a recording density of 600 dpi was used under driving condition of a driving frequency of 9.6 kHz. As for the ejecting amount per 1 dot when a 600-dpi head was used, heads having an ejecting amount of 15 ng/dot were used for yellow, magenta, and cyan inks and a head having an ejecting amount of 30 ng/dot was used for black ink, and recording was performed under the same conditions as in Examples 1 to 8.

Evaluation and Standards of Evaluation

For each recorded image obtained in Examples 1 to 8 and Comparative Examples 1 and 2 above, were evaluated by the following evaluation methods and evaluation standards. Table 5 summarizes results obtained.

Evaluation Method for Recorded Images (1) Color Developability

An RGB color chart of High definition XYZ CIELAB RGB Standard Image (SHTPP) (Edited by Committee for Preparing High Definition Standard Image, published by Image Electronics Society) was printed using a printer, and the color chart was measured by colorimetry. Evaluation of the coloring property was performed by calculating three-dimensional extension of color distribution (hereinafter, referred to as color region volume) by the method described in the manual attached to the above and making comparison. The image treatment for forming printed images was made under the same conditions. Colorimetry was performed after 24 hours from the printing under conditions of light source: D50. field of view: 2' by using GRETAG spectrolino. The evaluation standards are shown below. The ratios of color region volume to the printed image using only ink subsets (Comparative Examples 1 and 2) were used as standards for evaluation.

AAA: Color region volume ratio was 1.7 fold or more

AA: Color region volume ratio was 1.5 to less than 1.7 fold

A: Color region volume ratio was 1.4 to less than 1.5 fold

BB: Color region volume ratio was 1.2 to less than 1.4 fold

B: Color region volume ratio was 1.0 to less than 1.2 fold

C: Color region volume ratio was less than 1.0 fold.

Note that, separately, images were formed on coated paper for ink-jet (trade name: Color BJ Paper LC-101, manufactured by CANON INC.) by printing using ink subset 1. The ratio of color region volume to that of the printed article of Comparative Example 1 above was 1.3 fold.

(2) Homogeneity

Using the above printer, solid images of secondary colors, i.e., red, blue and green were printed and color homogeneity were visually evaluated with regard to white haze and color unevenness. The particularly heterogeneous color was selected as a target of evaluation. Evaluation standards were as follows.

A: Almost no white haze or color unevenness was generated.

B: Slight white haze and color unevenness were seen along the fibers of paper but on a practically acceptable level.

C: Considerable white haze and color unevenness were observed along the fibers of paper.

(3) Stripy Unevenness

Using the above printer, solid images of secondary colors, i.e., red, blue and green were printed and stripy unevenness was visually evaluated. On this occasion, the color of which considerable stripy unevenness was observed was selected as a target of evaluation. Evaluation standards were as follows.

A: Almost no stripy unevenness occurred.

B: Slight stripy unevenness was observed for each head scanning, but on a practically acceptable level.

C: Considerable white stripy unevenness was observed for each head scanning (4) Texture Using the printer as described above, solid images of yellow, magenta, cyan, and black inks were printed and the texture of the recording medium was visually evaluated. Evaluation standards were as follows.

A: No sense of incompatibility was felt in printed portion and nonprinted portion and the recording medium retained the texture of plain paper.

B: The texture was different between the printed portion and nonprinted portion or the recording medium as a whole gave a texture that was markedly different from that of plain paper.

TABLE 5

Results of evaluation

|  | Coloring property | Homogeneity | Stripy unevenness | Texture |
|---|---|---|---|---|
| Example 1 | AA | A | A | A |
| Example 2 | AAA | A | A | A |
| Example 3 | AAA | A | A | A |
| Example 4 | AA | A | A | A |
| Example 5 | AAA | A | A | A |
| Example 6 | AAA | A | A | A |
| Example 7 | AAA | A | A | A |
| Example 8 | AA | A | A | A |
| Comparative Example 1 | B | C | A | A |
| Comparative Example 2 | B | C | A | A |

Examples 9 to 15

To examine the influence of image quality depending on the kind of recording medium to be used, recording images of Examples 9 to 15 were formed through the printing in the same manner as the above examples using the liquid composition B and ink subset 1 prepared as described above on seven kinds of plain paper widely distributed under trade names 1) to 7) below for combinations of the liquid composition B and each of the four-color inks constituting the ink subset 1. The images are evaluated based on the evaluation standards. Table 6 below shows the results obtained.

Recording Medium

1) PB paper: manufactured by CANON INC.

2) Brilliant White paper: manufactured by CANON INC.

3) Great White Inkjet: manufactured by UNION CAMP CORPORATION

4) Jet Print: manufactured by Hammermill Co.
5) Xerox4024: manufactured by Xerox Corporation
6) Bright White Inkjet Paper: manufactured by Hewlett-Packard Company
7) RayJet: manufactured by Aussdat Ray Inc.

TABLE 6

Results of evaluation

| | Recording medium Used | Item of evaluation results | | | |
|---|---|---|---|---|---|
| | | Coloring property | Homogeneity | Stripy unevenness | Texture |
| Example 9 | 1) | AAA | A | A | A |
| Example 10 | 2) | AAA | A | A | A |
| Example 11 | 3) | AAA | A | A | A |
| Example 12 | 4) | AAA | A | A | A |
| Example 13 | 5) | AAA | A | A | A |
| Example 14 | 6) | AAA | A | A | A |
| Example 15 | 7) | AAA | A | A | A |

From the above results it was confirmed that in the method of forming a colored portion in Examples 9 to 15, images satisfactory for all of coloring property, homogeneity, stripy unevenness, and texture could be obtained regardless of the kind of recording medium as shown in Table 6.

Effect of the Invention

As described above, according to the present invention, liquid compositions, ink sets, methods of forming a colored portion on recording media, and ink-jet recording apparatus that can provide images with excellent coloring property and color homogeneity that are comparable to those obtained when printed on a coated print paper for ink-jet, maintaining the texture of plain paper, giving less stripy unevenness in solid image portion in printed portion and also excellent in reliability such as shelf life and durability of recording heads are provided.

What is claimed is:

1. A liquid composition for use in forming on a recording medium a colored portion together with an ink containing a colorant by imparting liquid composition to the recording medium, comprising at least a solvent and fine particles reactive with the colorant, wherein the fine particles in the liquid composition have an average particle diameter in a range of 30 to 200 nm when measured by a dynamic light scattering method, and a 10% cumulative value of scattering intensity is 10 nm or more, and 90% cumulative value of scattering intensity is 300 nm or less.

2. The liquid composition according to claim 1, wherein the fine particles in the liquid composition have an average particle diameter of from 50 to 120 nm when measured by a dynamic light scattering method, and a 10% cumulative value of scattering intensity is 20 nm or more, and 90% cumulative value of scattering intensity is 250 nm or less.

3. The liquid composition according to claim 1, wherein the ink is an anionic or cationic aqueous ink and wherein the liquid composition is aqueous and contains fine particles whose surface is charged in an opposite polarity to that of the aqueous ink in a dispersed state.

4. The liquid composition according to claim 1, wherein the fine particles adsorb the colorant in the ink on the surface thereof while preventing aggregation of the colorant in forming a colored portion.

5. The liquid composition according to claim 1, wherein the fine particles have a function of adsorbing the colorant in the ink on the surface thereof while maintaining the colorant in a monomolecular state when forming a colored portion.

6. The liquid composition according to claim 1, wherein the liquid composition has a zeta potential of from +5 to +90 mV.

7. The liquid composition according to claim 1, wherein the liquid composition further contains an acid and the pH thereof is adjusted to 2 to 7.

8. The liquid composition according to claim 7, wherein the acid has a primary dissociation constant pKa in water of 5 or less.

9. The liquid composition according to claim 1, wherein the liquid composition has a zeta potential of from −5 to −90 mV.

10. The liquid composition according to claim 1, wherein the liquid composition further contains a base and the pH thereof is adjusted to 7 to 12.

11. The liquid composition according to claim 10, wherein the base has a primary dissociation constant pKb in water of 5 or less.

12. An ink set comprising at least an ink containing a colorant and a liquid composition containing fine particles reactive with the colorant independently, wherein the liquid composition is the liquid composition according to claim 1.

13. The ink set according to claim 12, wherein the ink is an anionic or cationic aqueous ink and the liquid composition is an aqueous liquid composition containing fine particles whose surface is charged in an opposite polarity to that of the ink in a dispersed state.

14. The ink set according to claim 12, wherein the ink is at least one ink selected from the group consisting of yellow ink, magenta ink, cyan ink, black ink, red ink, blue ink and green ink.

15. The ink set according to claim 12, containing yellow ink, magenta ink and cyan ink respectively as the ink.

16. The ink set according to claim 12, containing yellow ink, magenta ink, cyan ink and black ink respectively as the ink.

17. The ink set according to claim 12, wherein the ink is anionic and wherein the zeta potential of the liquid composition is from +5 to +90 mV.

18. The ink set according to claim 12, wherein the ink is anionic, and wherein the liquid composition contains an acid and the pH thereof is adjusted to 2 to 7.

19. The ink set according to claim 18, wherein the acid contained in the liquid composition has a primary dissociation constant pKa in water of 5 or less.

20. The ink set according to claim 12, wherein the ink is cationic and wherein the zeta potential of the liquid composition is from −5 to −90 mV.

21. The ink set according to claim 12, wherein the ink is cationic, and wherein the liquid composition contains a base and the pH thereof is adjusted to 7 to 12.

22. The ink set according to claim 21, wherein the base contained in the liquid composition has a primary dissociation constant pKb in water of 5 or less.

23. The ink set according to claim 12, wherein the ink is anionic and wherein the ink contains an anionic compound.

24. The ink set according to claim 23, wherein the anionic compound comprises a water-soluble dye having an anionic group.

25. The ink set according to claim 23, wherein the anionic compound comprises a pigment having an anionic group on the surface thereof.

26. The ink set according to claim 23, wherein the ink contains a pigment and an anionic compound as a dispersant for the pigment.

27. The ink set according to claim 12, wherein the ink is cationic and wherein the ink contains a cationic compound.

28. A method of forming a colored portion on a recording medium, comprising at least the steps of:

(i) imparting an ink containing a colorant to the recording medium; and (ii) imparting the liquid composition according to claim 1 to the recording medium.

29. The method of forming a colored portion on a recording medium according to claim 28, wherein the ink is an anionic or cationic aqueous ink and wherein the liquid composition is aqueous and contains fine particles whose surface is charged in an opposite polarity to that of the ink in a dispersed state.

30. The method of forming a colored portion on a recording medium according to claim 28, wherein step (i) is performed after step (ii).

31. The method of forming a colored portion on a recording medium according to claim 28, wherein step (ii) is performed after step (i).

32. The method of forming a colored portion on a recording medium according to claim 28, wherein step (ii) is performed after step (i), and thereafter step (i) is performed again.

33. The method of forming a colored portion on a recording medium according to claim 28, wherein the step (i) of imparting the ink to the recording medium is performed by an ink-jet recording method to eject the ink from orifices in accordance with recording signals.

34. The method of forming a colored portion on a recording medium according to claim 33, wherein the ink-jet recording method is a method in which thermal energy is applied to the ink to eject it.

35. The method of forming a colored portion on a recording medium according to claim 28, wherein the step (ii) of imparting the liquid composition to the recording medium is performed by an ink-jet recording method to eject the liquid composition from orifices in accordance with recording signals.

36. The method of forming a colored portion on a recording medium according to claim 35, wherein the ink-jet recording method is a method in which thermal energy is applied to the liquid composition to eject it.

37. An ink-jet recording apparatus provided with an ink-container containing an ink comprising a colorant, a liquid composition-container containing a liquid composition, and an ink-jet head for ejecting the ink and the liquid composition respectively, wherein the liquid composition is that defined in claim 1.

38. The ink-jet recording apparatus according to claim 37, wherein the ink-jet head is a thermal ink-jet head that ejects a liquid by applying thermal energy.

39. A liquid composition according to claim 1, wherein the fine particles adsorb or bind the colorant in the ink on the surface thereof when the liquid composition and the ink are brought into contact with each other on the recording medium in a liquid state, the colorant that is adsorbed or bound to the fine particles maintaining the same molecular state as the colorant in the ink.

* * * * *

UNITED STATES PATENT AND TRADEMARK OFFICE
CERTIFICATE OF CORRECTION

PATENT NO.     : 6,821,328 B2
DATED          : November 23, 2004
INVENTOR(S)    : Hiroshi Tomioka et al.

It is certified that error appears in the above-identified patent and that said Letters Patent is hereby corrected as shown below:

Title page,
Item [56], References Cited, OTHER PUBLICATIONS, "Roček, et al.," reference, after "Roček, et al., Institute of Chemical Process Fundamentals, Czechoslovak Academy of" the word "Scienc e," should read -- Sciences, --.

Column 53,
Line 31, "(SHTPP)" should read -- (SHIPP) --.
Line 41, "D50." should read -- D50, --, and "2'" should read -- 2° --.

Signed and Sealed this

Nineteenth Day of July, 2005

JON W. DUDAS
*Director of the United States Patent and Trademark Office*